(12) United States Patent
Richards et al.

(10) Patent No.: US 10,862,777 B2
(45) Date of Patent: Dec. 8, 2020

(54) VISUALIZATION OF NETWORK HEALTH INFORMATION

(71) Applicant: Amazon Technologies, Inc., Seattle, WA (US)

(72) Inventors: Kenneth Grey Richards, Newcastle, WA (US); Schuyler David Thompson, Seattle, WA (US); Adam Siefker, Lynnwood, WA (US); Kevin Christopher Miller, Fairfax, VA (US); Meenakshi Rameshkumar, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 130 days.

(21) Appl. No.: 15/279,351

(22) Filed: Sep. 28, 2016

(65) Prior Publication Data

US 2018/0091392 A1   Mar. 29, 2018

(51) Int. Cl.
*H04L 12/26* (2006.01)
*H04L 12/46* (2006.01)
*H04L 29/12* (2006.01)

(52) U.S. Cl.
CPC ........ *H04L 43/045* (2013.01); *H04L 12/4633* (2013.01); *H04L 43/08* (2013.01); *H04L 12/4641* (2013.01); *H04L 43/14* (2013.01); *H04L 61/2007* (2013.01); *H04L 61/2038* (2013.01); *H04L 61/6068* (2013.01)

(58) Field of Classification Search
CPC ....... H04L 43/045; H04L 43/14; H04L 43/08; H04L 12/4641; H04L 61/1511; H04L 12/26; H04L 29/06; H04L 43/00; H04L 12/2602; H04L 41/22; H04L 12/4633; H04L 61/6068; H04L 61/2007; H04L 61/2038; H04L 43/04; H04L 12/46; H04L 29/12
USPC ............ 709/224; 340/16.1; 370/252; 714/39
See application file for complete search history.

(56) References Cited

U.S. PATENT DOCUMENTS

| | | | |
|---|---|---|---|
| 5,919,248 A | 7/1999 | Kahkoska et al. | |
| 6,006,016 A | * 12/1999 | Faigon ................ | G06F 11/2252 714/26 |
| 6,714,971 B2 | 3/2004 | Motoyama et al. | |
| 6,958,998 B2 | 10/2005 | Shorey | |
| 7,051,098 B2 | 5/2006 | Masters et al. | |
| 7,177,927 B1 | 2/2007 | Cahn | |

(Continued)

OTHER PUBLICATIONS

Amazon Web Services, "AWS Direct Connect" User Guide API Version, Oct. 22, 2013, pp. 1-42.

(Continued)

*Primary Examiner* — Tonia L Dollinger
*Assistant Examiner* — Mehulkumar J Shah
(74) *Attorney, Agent, or Firm* — Robert C. Kowert; Kowert, Hood, Munyon, Rankin & Goetzel, P.C.

(57) ABSTRACT

A determination is made that a graphical representation of network health state information pertaining to a client account of a provider network is to be provided. Using respective network metrics groups corresponding to several data sources, a network health state descriptor corresponding to a resource associated with the client account is generated. A data set usable to generate a graphical display of network health state information of the resource of the client account is transmitted.

23 Claims, 26 Drawing Sheets

(56) References Cited

U.S. PATENT DOCUMENTS

| | | | |
|---|---|---|---|
| 7,634,590 B2 | 12/2009 | Addleman et al. | |
| 7,634,682 B2 | 12/2009 | Black et al. | |
| 7,941,859 B2 | 5/2011 | Camenisch et al. | |
| 7,975,184 B2 | 7/2011 | Goff et al. | |
| 8,082,581 B2 | 12/2011 | Wu | |
| 8,209,749 B2 | 6/2012 | Babula et al. | |
| 8,261,341 B2 | 9/2012 | Stirbu | |
| 8,443,435 B1 | 5/2013 | Schroeder | |
| 8,539,593 B2 | 9/2013 | Tan et al. | |
| 8,543,734 B2 | 9/2013 | McDysan | |
| 8,559,441 B2 | 10/2013 | Miyabe | |
| 8,559,449 B2 | 10/2013 | Rao et al. | |
| 8,612,599 B2 | 12/2013 | Tung et al. | |
| 8,639,989 B1 | 1/2014 | Sorenson, III et al. | |
| 8,656,420 B2 | 2/2014 | Foster et al. | |
| 8,705,394 B2 | 4/2014 | Venkatachalapthy et al. | |
| 8,726,392 B1 | 5/2014 | McCorkendale et al. | |
| 8,805,971 B1* | 8/2014 | Roth | G06F 9/5072 709/220 |
| 8,856,869 B1 | 10/2014 | Brinskelle | |
| 8,869,286 B1 | 10/2014 | Liu | |
| 8,949,994 B2 | 2/2015 | Amit et al. | |
| 8,984,642 B2 | 3/2015 | Pistoia et al. | |
| 9,009,305 B1 | 4/2015 | Callau | |
| 9,032,077 B1 | 5/2015 | Klein et al. | |
| 9,075,997 B2 | 7/2015 | Artzi et al. | |
| 9,104,572 B1 | 8/2015 | Thompson et al. | |
| 9,164,864 B1 | 10/2015 | Novick et al. | |
| 9,626,262 B1 | 4/2017 | Vogel et al. | |
| 9,813,379 B1 | 11/2017 | Shevade et al. | |
| 2002/0099818 A1 | 7/2002 | Russell et al. | |
| 2003/0061340 A1 | 3/2003 | Sun et al. | |
| 2005/0021546 A1 | 1/2005 | Garcea et al. | |
| 2005/0228880 A1 | 10/2005 | Champlin | |
| 2005/0262269 A1 | 11/2005 | Pike | |
| 2006/0031461 A1 | 2/2006 | Mathur et al. | |
| 2007/0211730 A1 | 9/2007 | Cuthbert et al. | |
| 2007/0230361 A1 | 10/2007 | Choudhury | |
| 2008/0134046 A1 | 6/2008 | Gray et al. | |
| 2008/0181134 A1 | 7/2008 | Anerousis et al. | |
| 2008/0304421 A1 | 12/2008 | Ramasubramanian et al. | |
| 2008/0320123 A1 | 12/2008 | Houlihan et al. | |
| 2009/0138592 A1 | 5/2009 | Overcash et al. | |
| 2009/0276317 A1 | 11/2009 | Dixon et al. | |
| 2009/0327821 A1 | 12/2009 | Bauerle et al. | |
| 2010/0122175 A1 | 5/2010 | Gupta et al. | |
| 2010/0162036 A1 | 6/2010 | Linden et al. | |
| 2010/0275262 A1 | 10/2010 | Anand et al. | |
| 2011/0126059 A1 | 5/2011 | Klein | |
| 2011/0145836 A1 | 6/2011 | Wheeler et al. | |
| 2011/0238733 A1 | 9/2011 | Yoo et al. | |
| 2012/0072588 A1 | 3/2012 | Kamath et al. | |
| 2012/0182865 A1 | 7/2012 | Andersen et al. | |
| 2012/0311475 A1* | 12/2012 | Wong | G06F 11/3003 715/772 |
| 2013/0007261 A1* | 1/2013 | Dutta | G06F 11/324 709/224 |
| 2013/0031238 A1 | 1/2013 | Grossklas et al. | |
| 2013/0031424 A1 | 1/2013 | Srivastava et al. | |
| 2013/0157644 A1 | 6/2013 | Berg et al. | |
| 2013/0185436 A1 | 7/2013 | Carlin et al. | |
| 2013/0227355 A1 | 8/2013 | Dake et al. | |
| 2014/0075048 A1 | 3/2014 | Yuksel et al. | |
| 2014/0089493 A1 | 3/2014 | Bauer et al. | |
| 2014/0180738 A1 | 6/2014 | Phillipps et al. | |
| 2014/0280884 A1* | 9/2014 | Searle | H04L 43/0864 709/224 |
| 2014/0280892 A1* | 9/2014 | Reynolds | H04L 43/062 709/224 |
| 2015/0127816 A1 | 5/2015 | Kruglick | |
| 2015/0215433 A1 | 7/2015 | Leung et al. | |
| 2015/0268876 A1 | 9/2015 | Ahn et al. | |
| 2015/0295909 A1 | 10/2015 | Jethanandani et al. | |
| 2016/0042289 A1 | 2/2016 | Poola et al. | |
| 2016/0378615 A1 | 12/2016 | Cohen et al. | |
| 2017/0039120 A1 | 2/2017 | Ganesan et al. | |
| 2017/0123885 A1* | 5/2017 | Margalit | G06F 11/321 |
| 2017/0163511 A1 | 6/2017 | Montoya et al. | |
| 2017/0300708 A1 | 10/2017 | Gopshtein et al. | |
| 2017/0364973 A1 | 12/2017 | Van Biljon et al. | |
| 2017/0366417 A1 | 12/2017 | Karacali-Akyamac et al. | |
| 2018/0004539 A1 | 1/2018 | Liguori et al. | |
| 2018/0004954 A1 | 1/2018 | Liguori et al. | |
| 2018/0091392 A1 | 3/2018 | Richards et al. | |
| 2018/0091394 A1 | 3/2018 | Richards et al. | |
| 2018/0091401 A1 | 3/2018 | Richards et al. | |
| 2018/0091413 A1 | 3/2018 | Richards et al. | |
| 2018/0123939 A1 | 5/2018 | Raman et al. | |
| 2018/0191597 A1 | 7/2018 | Nageshappa et al. | |

OTHER PUBLICATIONS

Amazon Web Services, "Amazon Virtual Private Cloud", User Guide API Version, Oct. 1, 2013, pp. 1-143.
Chard Ryan et al, "Network Health and e-Science in Commercial Clouds", Future Generations Computer Systems, Elsevier Science Publishers, Amsterdam, NL, vol. 56, Jun. 23, 2015, pp. 595-604.
Amazon Web Services, "Best Practices for Deploying Amazon WorkSpaces—Network Access, Directory Services and Security", Jul. 1, 2016, Retrieved from URL: https://d1awsstatic.com/whitepapers/workspaces/Best_Practices_for_Deploying_Amazon_WorkSpaces.pdf, 45 pages.
International Search Report and Written Opinion from PCT/US2017/053614, dated Jan. 5, 2018, Amazon Technologies, Inc., pp. 1-11.
U.S. Appl. No. 15/279,346, filed Sep. 28, 2016, Kenneth Grey Richards.
U.S. Appl. No. 15/279,345, filed Sep. 28, 2016, Kenneth Grey Richards.
U.S. Appl. No. 15/279,347, filed Sep. 28, 2016, Kenneth Grey Richards.
Srikanth Kandula, et al., "The Nature of Datacenter Traffic: Measurements & Analysis", IMC'09, ACM, Nov. 4-6, 2009, pp. 202-208.
Albert Greenberg, et al., "VL2: A Scalable and Flexible Data Center Network", Sigcomm'09, ACM, Aug. 17-21, 2009, pp. 1-12.
U.S. Appl. No. 14/869,905, filed Sep. 29, 2015, David Sean Russell.
U.S. Appl. No. 14/869,907, filed Sep. 29, 2015, David Sean Russell.
U.S. Appl. No. 14/855,139, filed Sep. 15, 2015, Muhammad Wasiq et al.

* cited by examiner

VISUALIZATION OF NETWORK HEALTH INFORMATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

In many cases, customers of virtualized computing services may not have much control over the specific virtualization hosts selected for their virtual machines, or over the network paths that may be used for inbound and outbound traffic of their virtual machines. Instead, customers may rely on the provider of the virtualized computing service to select virtualization hosts and network paths that are capable of supporting the desired levels of performance, availability, and the like. From the customers' perspectives, various types of resources allocated for their use may sometimes appear to be "black boxes", with few tools available for detailed troubleshooting or analysis. As a result, when applications appear to be experiencing performance or functional problems, it may not be straightforward for the customers to quickly determine whether the problems result from infrastructure issues which are out of the customers' direct control, or whether the problems are caused by application bugs or customer-generated configuration errors.

Figure 1:
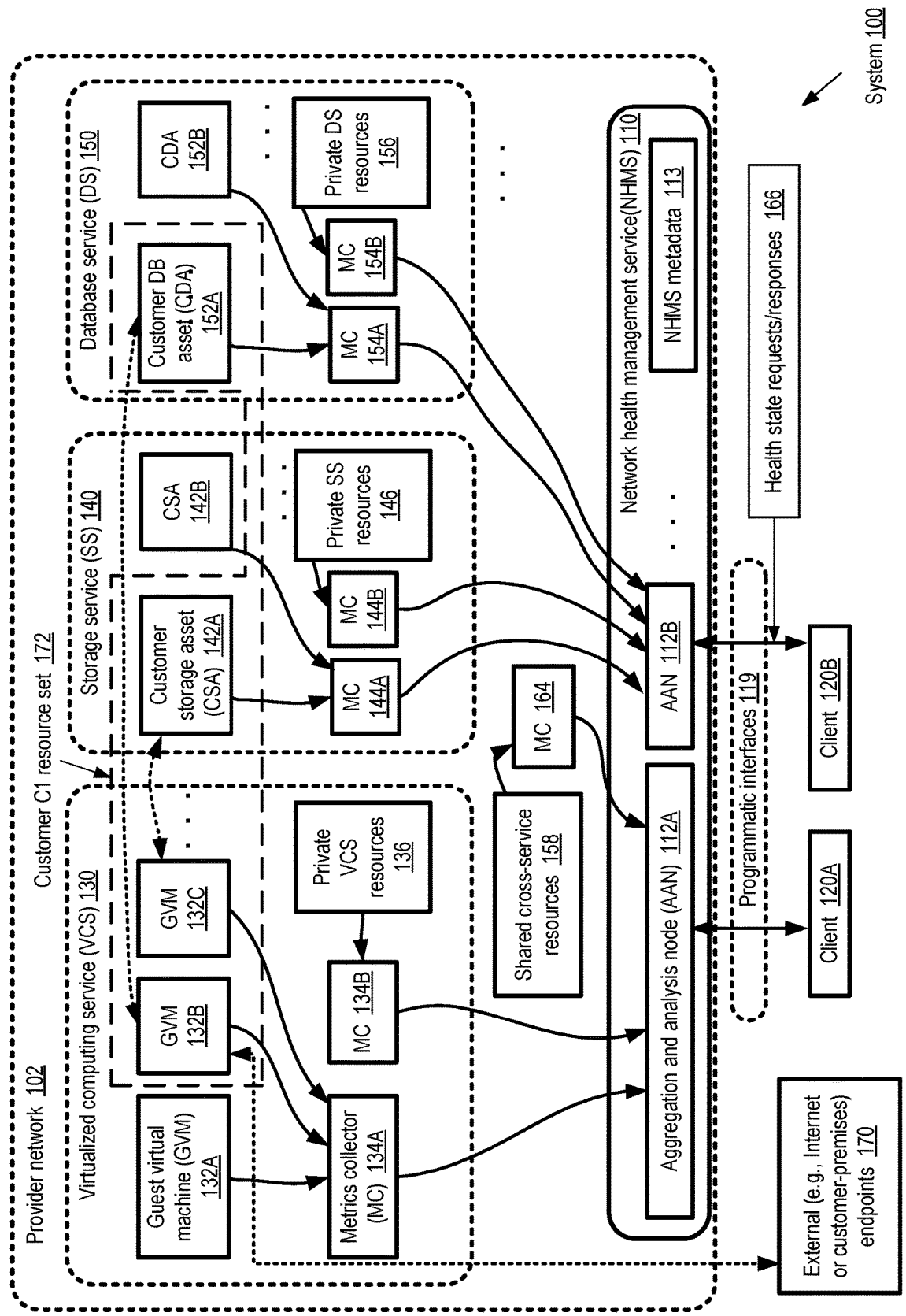
FIG. 1 illustrates an example system environment in which metrics from a variety of data sources may be aggregated to provide network health state information to customers of one or more provider network services via programmatic interfaces, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for operations performed at a network health management service of a provider network, including techniques for aggregating metrics collected from a variety of sources at different granularities to produce customized and easy-to-understand network health state information relevant to the particular sets of resources allocated to customers, are described. The terms "network health state" or "network health status" may be used herein to indicate information regarding the performance and availability of network pathways between various types of resources, as described below in further detail. Health state information may be provided at various levels of detail in different embodiments, e.g., based on customer preferences. At a high level, an indication of whether a network impairment or failure has been detected with respect to certain sets of resources, and if so the extent to which the impairment may be affecting any given customer or a particular customer may be provided in various embodiments. At a more detailed level, statistics regarding packet loss rates, latencies (including aggregate statistics such as mean latency or $90^{th}$ percentile latency for various packet sizes, and/or measures of "jitter" or latency variation over time), and the like may be provided, e.g., upon request, to customers in some embodiments.

Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries) and may be organized into availability containers or availability zones for failure resilience purposes as described below in further detail. The underlying metrics to be used for network health state determination may be collected from data sources and/or intermediary tools at various levels of the provider network's resource grouping hierarchy—e.g., metrics may be collected indicative of connectivity or network performance between pairs of data centers, between pairs of availability containers, and so on.

In some provider networks, a multi-tenant virtualized computing service may be supported, as well as one or more multi-tenant storage services, database services, and the like. Using such services, customers may, for example, acquire a set of virtual machines from the virtual computing service, store various data sets at storage devices of selected storage services, and use the virtual machines to run applications that access the data sets. A given resource (e.g., a storage device or a computing device) of a multi-tenant service may at least in principle be utilized for operations performed on behalf of multiple customer accounts. In general, in at least some provider networks, information about infrastructure implementation details (e.g., the locations of various hosts or servers which may be in use for a given client) may not be accessible to customers; instead, customers may rely on the provider network operator to provision the appropriate set of physical and/or virtual resources to meet customer needs. As such, at least some of the underlying infrastructure components of the provider network, which may be involved in providing connectivity between endpoints of interest to customers, may be considered "non-public", and may not be visible to or accessible to customers. In various embodiments, the network health management service may analyze metrics pertaining to non-public resources or devices (e.g., routers, physical network links, virtualization management software and the like which may not be accessible to customers), as well as from customer-visible data sources (such as processes running at virtual machines allocated to customers), to determine network health states for various endpoint pair categories which may be relevant to a given customer.

The term "endpoint pair", as used herein, may indicate a pair of resources between which network packets may flow in one or both directions on behalf of one or more customers. For example, one endpoint pair may include, as the first element of the pair, a guest virtual machine established on behalf of a particular customer at a virtualization host of the provider network, and as the second element, a program running at a host located in a customer data center. Instead of (or in addition to) providing network health state information at the level of individual resources, the network health management service may provide summarized information with respect to various categories of endpoint pairs as discussed below in further detail. Thus, in the above example, the network health management service may (at least initially) provide information about the state of the network paths between a group of guest virtual machines established for the customer, and a group of devices located at the customer data center, instead of reporting on the state of the network path between an individual guest virtual machine and an individual customer data center device. Each of the two endpoints represented in an endpoint pair category may thus represent a respective resource set (one resource set comprising the group of virtual machines in the above example, and the other resource set comprising the group of devices located at the customer data center). The path between the endpoints of an endpoint pair category may comprise a virtual representation of one or more physical network links and/or associated network devices over which traffic flows between the corresponding resource sets in various embodiments. As such, the numerous devices and links of a potentially complex physical network being used on behalf of a customer may be virtualized into one or more endpoint pair categories for which easy-to-understand health state information can be provided. In some embodiments, detailed network health state information with respect to specific endpoints or resources may also be provided. In some embodiments, customers may be able to specify or select the particular endpoint pair categories for which network health state information is desired, and/or the particular endpoints for which network health state information is desired.

In general, the network health management service may be designed to provide relevant and reliable health state information efficiently to customers of various provider network services. "False positive" reports of network impairment (i.e., reports of problems which either do not exist, or may exist but do not affect a particular customer to whom a report of a problem is provided), which may tend to alarm customers unnecessarily, may be avoided as much as possible in various embodiments. Generally speaking, false positive reports may have several different root causes, including for example potentially unreliable metrics or data sources, the inability to determine whether a given network failure is actually going to impact a given customer, and so on; each of these types of causes may be addressed by the network health management service as described below in further detail. For example, prior to providing a potentially inaccurate report regarding a network impairment event, evidence of the event from multiple independent sources may be obtained in some embodiments. By providing timely and accurate network health state information, the network health management service may make it easier for customers to quickly determine whether unexpected application behavior is more likely to have been caused by an infrastructure issue or by problems in the application itself, thereby potentially reducing debugging costs. In effect, the service may consume large volumes of network related metrics from a variety of sources, and translate the metrics into health state information which is potentially much more useful to customers than the raw metrics may have been. In various embodiments, some of the raw metrics may not even be meaningful to customers, as they may refer to internal resources and devices of which customers are unaware. A number of easy-to-use programmatic interfaces for obtaining the network health state information at desired levels of granularity and desired reporting frequencies may be supported in different embodiments as described below. The network health management service (which may also be referred to as a network health manager herein) may in some embodiments be implemented as an independent service with its own sets of programmatic interfaces; in other embodiments, the network health management service may be subsumed within one of the other services of the provider network, such as a virtualized computing service. The network health management service may in general comprise or utilize a plurality of hardware and/or software components distributed within the provider network (and in some cases, outside the provider network, such as connectivity verification agents installed at customer data centers, which are described below).

According to one embodiment, the network health manager may be configured to identify one or more endpoint pair categories corresponding to resources associated with a customer of a virtualized computing service. The endpoint pair categories may be identified, for example, based on interactions with control plane or administrative components of the virtualized computing service at which resource allocation inventories may be maintained. Depending on the needs of an individual customer, one or more isolated virtual networks may be established for the customer as discussed below, and an endpoint pair category may comprise a virtual machine within one of the isolated virtual networks in some embodiments.

Various sets of network metrics which may provide insight into the health of endpoint pair categories relevant to the customer may be obtained in different embodiments. For example, a first set of network metrics may be obtained from a connectivity verifier tool, while a second set of network metrics may be obtained from an infrastructure monitoring tool or service. The connectivity verifier may comprise a fleet of agents or nodes which are configured to periodically communicate with one another and/or with endpoints outside the provider network in some embodiments, including at least one agent instantiated at a virtual machine established at the virtualized computing service. The agents may run as user-mode or application-layer processes in some embodiments, and as kernel-mode processes (or some combination of user-mode and kernel-mode components) in other embodiments. The infrastructure monitoring tool may collect metrics from at least some non-public resources or devices, such as routers, physical network links, and the like, which are not accessible to customers directly.

In some embodiments, respective weights may be assigned to the network metrics sets (or, more broadly, to the tools from which the metric sets are obtained), indicative for example of the relative priority or trustworthiness of the metrics sets with regard to potential identification of network impairments. For example, a knowledge base accessible to the network health manager may include entries indicating the reliability of various tools in different locations of the provider networks, the number of times false positive reports of network impairment have been produced using data from individual tools or underlying data sources, and so on. The factors taken into account when assigning weights may include, for example, the physical locations from which the metrics are collected, the logical location in the software/hardware stack from which the metrics are collected, how recently the metrics were collected (their collection times), and so on in various embodiments.

The network health manager may utilize the metrics sets and their respective weights to determine respective network health state of different endpoint pair categories, and provide an indication of the state to one or more destinations associated with the customer. For example, in one embodiment, a request may be received for network health state information via a programmatic interface such as an API (application programming interface) exposed by the network health management service, and the requested information may be provided in a response to an API invocation. In another embodiment, a data set which can be used to display a graphical representation or layout of resources used by the client as well as the corresponding network health state information may be transmitted to a client-side device for presentation.

In one embodiment, at least one metrics set collected by the network health manager may indicate a possible network impairment event, such as a failure of a router, gateway, or a physical network link. In an attempt to reduce false positive reports of such impairments, the network health manager may try to verify, using different metric sets obtained from another source, whether the impairment has actually occurred. A verification algorithm that may rely on factors such as the number of independent sources which appear to confirm the impairment, the number of successive metrics sets which indicate impairment, the relative weights assigned to the metrics sets or their sources, and so on, may be used before the impairment is reported to a customer. In at least one embodiments, fine-grained information about network packet flows, obtained for example at an encapsulation protocol processing component of the provider network, may be used to filter reports of network impairment to only those customers whose applications are expected to be affected by the impairments, as discussed below in further detail. In one such embodiment, respective probabilities of impact of a network impairment event on a given customer's application(s) may be assigned, e.g., based on an analysis of network configuration of resources allocated to the customer and/or on the particular services being used by the customer, and a report of the impairment event may be provided to a customer if the probability of impact exceeds a threshold.

Example System Environment

FIG. 1 illustrates an example system environment in which metrics from a variety of data sources may be aggregated to provide network health state information to customers of one or more provider network services via programmatic interfaces, according to at least some embodiments. As shown, system 100 comprises a provider network 102 at which a number of network-accessible services may be implemented, including for example a virtualized computing service (VCS) 130, a storage service (SS) 140, and a database service (DS) 150. The VCS, SS and DS may each comprise various resources which are allocated for use by service clients, as well as internal resources which are private to the service and are inaccessible to clients. For example, the VCS 130 may comprise a plurality of guest virtual machines (GVMs) 132, such as GVM 132A, 132B or 132C, each of which may have been instantiated on behalf of a given customer of the VCS. Similarly, the storage service 140 may comprise a plurality of customer storage assets (CSAs) 142, such as CSA 142A and 142B, while the database service 150 may comprise a plurality of customer database assets (CDAs) 152, such as CDA 152A or 152B. A CSA 142 may comprise, for example, an unstructured storage object accessible via a web-services interface, a storage volume accessible via block-device level interfaces, and so on. A CDA 152 may comprise, for example, an instance of a relational database or a non-relational database, and so on. A given customer of the provider network may be allocated resources of a plurality of services in the depicted embodiment—for example, customer C1's resource set 172 may comprise GVMs 132B and 132C, CSA 142A and CDA 152A as shown. In some embodiments, the provider network may include other services which are not shown in FIG. 1, such as a machine learning service, a parallel computing service, and so on, and a given customer's resource set may include resources from those other services Each service may comprise a set of administrative or control-plane components, not shown in FIG. 1, which may maintain information indicating the allotments or allocation of specific resources to various customers as well as various other kinds of metadata. Such resource allocation metadata may be queried in some embodiments by the network health management service to determine the particular endpoint pair categories for which network health state information is to be provided to a particular customer, as discussed below in further detail. In addition, respective sets of service-specific private resources may be used to support the customer-facing functionality at each service, such as private VCS resources 136, private storage service resources 146 and private database service resources 156. Some resources 158 (e.g., various physical network links, internal routers of the provider network, etc.) may be shared by several different services, and hence may be referred to as cross-service resources or multi-service resources.

The GVMs allocated to a given customer may be used to run various applications of the customer's choice in the depicted embodiment, and those applications may communicate with and/or utilize resources implemented using other services of the provider network 102, including for example the storage service and the database service. The dotted lines with double arrows indicate network packet pathways which may be used on behalf of service customers. For example, network packets may flow between GVM 132B and CDA 152A, between GVM 132C and CSA 142A, and between GVM 132B and external endpoints 170 (such as devices of the public Internet and/or devices located at customer premises such as offices or customer-managed data centers). GVM 132B and CDA 152A may be considered one endpoint pair whose network health state may be of interest to customer C1, GVM 132C and CSA 142A may be considered another endpoint pair, while GVM 132B and external endpoints 170 may be considered a third endpoint pair. More broadly, endpoint pair categories of interest may include {GVMs of VCS 130, CSAs of SS 140}, {GVMs of VCS 130, CDAs of DS 150} and {GVMs of VCS 130, external endpoints 170}. It is noted that at least in some embodiments in which one or more of the other services used by GVMs of VCS 130 (such as SS 140) allow access from the public Internet, special endpoints called virtual private endpoints may be established within the VCS to enable service requests to flow from the VCS to the other services (and responses to the service requests to be received) without requiring the use of a public IP address or the use of public Internet links.

In the depicted embodiment, a network health management service (NHMS) 110 comprising a plurality of nodes may be established at the provider network to provide network health state information regarding various endpoint pair categories (and/or specific endpoint pairs) to clients such as 120A or 120B via a variety of programmatic interfaces 119. The programmatic interfaces 119 may comprise, for example, a set of APIs for sending health state requests and receiving corresponding responses (e.g., requests/responses 166), one or more web-based consoles, one or more command-line tools, and/or graphical user interfaces (GUIs) which are not necessarily web-based. The NHMS 110 may include a plurality of aggregation and analysis nodes (AANs) 112, such as AANs 112A and 112B, each of which may be implemented using one or more computing devices in the depicted embodiment. In addition, metadata 113 used for aggregating and presenting health state information may be maintained at the NHMS 110, such as knowledge base entries which can be used to assign trust scores or weights to various metrics, client preferences, and so on.

The AANs 112 may be configured to identify the particular endpoint pair categories which correspond to a given customer's resource set in the depicted embodiment, e.g., by querying one or more control-plane metadata stores associated with various services including the VCS 130, the SS 140 and/or the DS 150. The AANs 112 may collect a variety of network metrics sets from various parts of the provider network 102 in order to provide relevant and reliable network health state information to clients 120. A number of metrics collectors (MCs) may be used, such as MCs 134 associated with VCS 130, MCs 144 associated with storage service 140, MCs 154 associated with database service 150, and one or more MCs 164 which are not specifically tied to any particular service of the provider network. In different embodiments, some MCs may comprise pre-existing tools that already collect various types of metrics, while other MCs may represent agents (e.g., processes or threads of execution, or hardware devices) set up on behalf of the NHMS itself. Some MCs may collect network metrics, such as request/response message success rates, from entities visible to customers, while other MCS may collect metrics from private resources such as resources 136, 146, 156 or 158. In general, as indicated by the non-dashed arrows in FIG. 1, network metrics information may flow from the underlying resources of the provider network to the MCs, and from the MCs to the AANs in the depicted embodiment. A preliminary level of aggregation or summarization may be performed at one or more of the MCs in at least some embodiments before the metrics are passed on to the AANs. It is noted that some AANs may collect network metrics from one or more source directly in at least one embodiment, e.g., without utilizing intermediary MCs.

In some embodiments, respective sets of AANs 112 and MCs may be set up corresponding to various hierarchical and/or location-based groupings of service resources. For example, as discussed below, in some embodiments, respective AANs and/or MCs may be set up in each room of each data center of the provider network at which resources used for a given service are located. Generally speaking, the NHMS 110 may be designed to be able to detect network problems or impairments at various granularity levels by combining information obtained from a wide range of data sources, so that the appropriate network health state information can be provided quickly to clients 120.

The AANs may assign respective weights or trust scores to individual MCs and/or to individual metrics sets in the depicted embodiment, e.g., based on a variety of factors such as the history of false positive reports of network impairments, the level of the data sources within the software/hardware stacks, the locations of the data sources, etc. Using the weights and the collected metrics, respective descriptors or records indicative of the current (and/or past) network health state of different endpoint pair categories may be generated. In some embodiments, respective probabilities of a given network impairment's impact on a given customer's applications may be estimated, and the indication of the impairment may be provided if the probability exceeds a threshold. In various embodiments, confirmations of the evidence which indicates a potential network problem may be obtained from multiple sources, before presenting an indication of the problem to a client 120. The health state information pertaining to a given customer may be provided via the appropriate sets of programmatic interfaces 119 to one or more destinations in the depicted embodiment. In some embodiments, at least some of the network health state information may be stored in a repository, e.g., for trend analysis, at least temporarily.

Intermediary Tools

Figure 2:
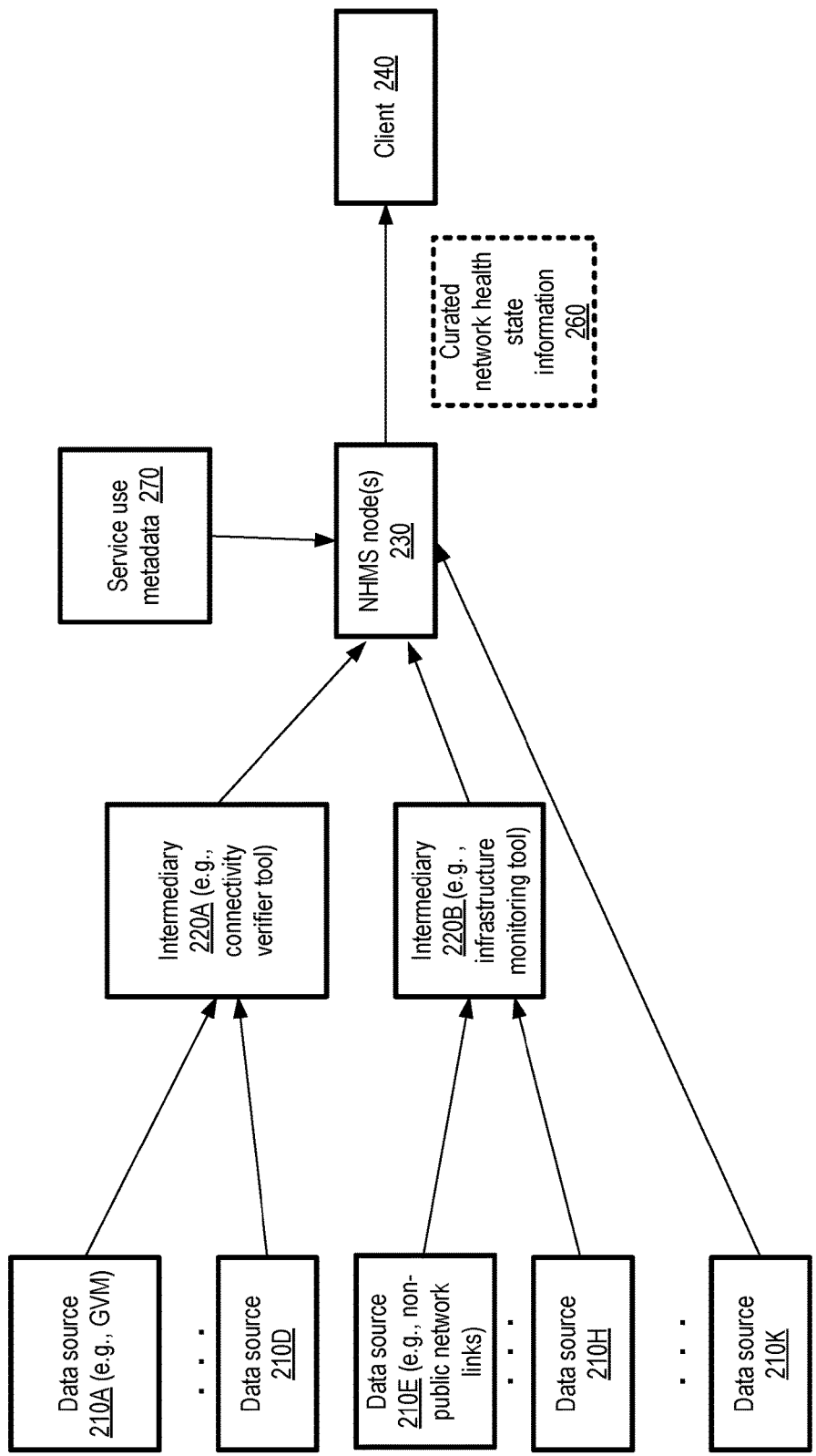
FIG. 2 illustrates an example scenario in which output produced by a variety of intermediary tools may be used to generate network health state information, according to at least some embodiments.

FIG. 2 illustrates an example scenario in which output produced by a variety of intermediary tools may be used to generate network health state information, according to at least some embodiments. In the depicted scenario, networking-related metrics generated at a variety of data sources 210 may be utilized, together with service use metadata 270, to produce curated network health state information 260 for clients 240 by one or more NHMS node(s) 230. The data sources may include, for example, one or more GVMs (as in the case of data source 210A), one or more network links (as in the case of data source 210E), and so on. For some data source categories, the provider network may have existing metrics collectors available in the form of tools that may also be used for other control-plane functions. Such tools may be used as intermediaries 220 by the NHMS in the depicted embodiment. For example, a connectivity verifier tool 220A may obtain request/response message success rate metrics from a variety of GVMs in the depicted embodiment, while an infrastructure monitoring tool 220B may check the latencies and packet drop rates across selected network links.

Network metrics may also be collected at the NHMS directly from at least some of the underlying data sources in various embodiments, as in the case of data source 210K. It is noted that from the perspective of the NHMS nodes 230, the intermediary tools 220 may be considered data sources, even though the data being provided by the intermediary tools may in turn have been obtained from other resources. The intermediary tools 220 may each provide data in different formats, and the NHMS nodes may be responsible for parsing the diverse data records provided, normalizing them into a standard format, disambiguating among the resources to which the metrics from different tools apply, mapping the metrics to different endpoint pair categories, and so on. Service use metadata 270 may indicate the particular provider network services and features which are being used by a given customer in the depicted embodiment, as well as the specific resources of each service which are allocated to the customer. The service use metadata 270 may be helpful in identifying the particular endpoint categories for which network health state information 260 should be provided to a given client 240. The network health state information 260 may be described as curated in the depicted embodiment in that, for example, customized summaries of relevant information pertinent to individual client accounts may be provided (rather than a generic representation of network health state information applicable to an entire service or provider network). In some cases, for example, even if two customers have resources located in the same room of a particular data center, different health state information may be provided to the two customers based on the specific services being used and/or the differences in the networking configurations of the resources.

Network Health Management Service Node Components

Figure 3:
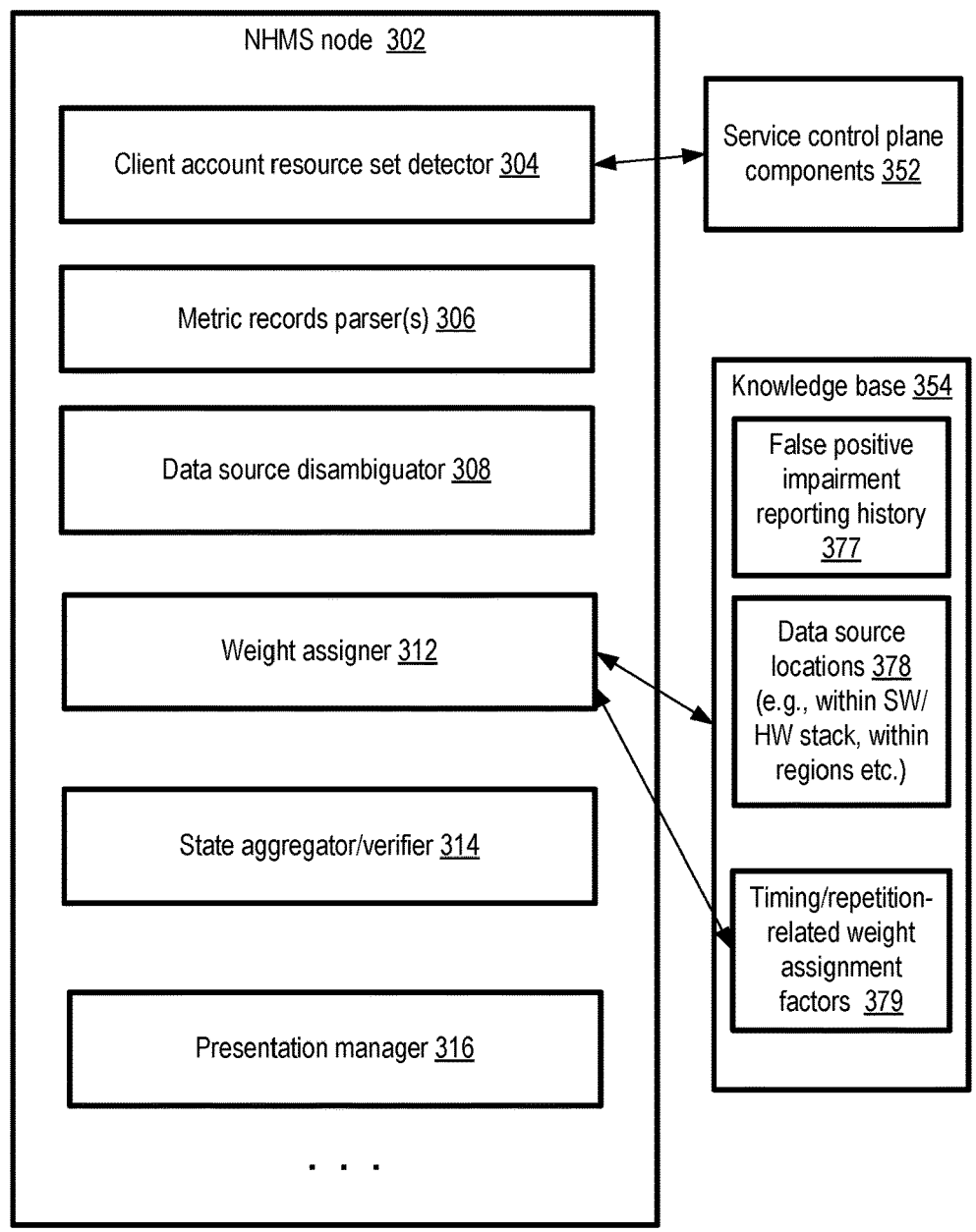
FIG. 3 illustrates example components of a network health management service node, according to at least some embodiments.

FIG. 3 illustrates example components of a network health management service node, according to at least some embodiments. As shown, network health management service (NHMS) node 302 (which may correspond to an aggregation and analysis node 112 of FIG. 1) may comprise, for example, a client account resource set detector 304, one or more metrics records parsers 306, a data source disambiguator 308, a weight assigner 312, a state aggregator/verifier 314, and/or a presentation manager 316. Individual ones of the components shown in FIG. 3 may be implemented as separate software processes or threads of execution in some embodiments. In at least one embodiment, some of the components may be implemented in firmware and/or in hardware.

The client account resource set detector 304 may determine, e.g., via communications with respective control plane (i.e., administrative) components 352 of one or more services of the provider network, the collection of provider network services that are being used by (or have been allocated to) a customer associated with a given client account, and/or the specific resources of various services that are being used. As mentioned above, networking-related metrics may be collected at an NHMS node 302 from a variety of data sources. The metrics records obtained may be formatted differently by the various intermediary tools and/or data sources, and parser(s) 306 may extract the relevant information from the metrics records. In at least some cases, metrics pertaining to the same underlying network flow may be received from more than one data source. For example, two application-layer processes at respective hosts may provide respective packet loss rates with respect to network traffic between the hosts, while an intermediary network device such as a router or switch may also provide information about the packets transferred between the hosts. The data source disambiguator 308 may be responsible for identifying, using any of various correlation-based techniques, the specific underlying resources to which one or more metrics sets correspond in the depicted embodiment. In some embodiments, various tools or data sources may express measurements of the same underlying phenomena in different units, and such measurements may be normalized to a common unit, e.g., by disambiguator 308 or by parsers 306.

Respective weights or trust scores may be assigned to metrics sets or data sources which provide the metrics sets in the depicted embodiment. A number of different factors may be taken into account by weight assigner 312. For example, a knowledge base 354 may contain records 377 indicative of the history of false positive reports regarding network impairments and the data sources or tools whose output was utilized for such reports. In addition, in some embodiments knowledge base 354 may include data source location records 378 indicating the specific layers of the software/hardware/firmware stack from which networking-related metrics are collected at various data sources, the physical or geographical locations of various data sources, and so on. In some embodiments, the weight assigner 312 may also consider timing and repetition-related factors 379—for example, if three consecutive metrics sets obtained from a given data source or intermediary tool indicate that a network impairment event may have occurred, the weight assigned to that data source or tool may be higher than if only two out of the last five metrics sets obtained indicated the network impairment. How recently a given metrics set was received may also play a role—e.g., if the collection time of one metrics set MS1 was ten minutes in the past, while the collection time of a different metrics set MS2 was one minute in the part, MS1 may have a lower trust score or weight assigned than MS2 (other factors being equal). In one implementation, the time that has elapsed since a metric set was collected may be used as a decay term (e.g., a linear or exponential decay) in a function used to assign weights or trust scores.

State aggregator and verifier 314 may be responsible for combining the information contained in the metrics collected, together with the weights assigned to the metrics, and generating network health state summaries and/or details for various endpoint pair categories (and/or pairs of specific endpoints). In various embodiments, the aggregated information may be stored in the form of health state descriptors or records of the kind described below in the context of FIG. 4. A formula which adds weighted representations of the different metric sets corresponding to a given endpoint pair category and then normalizes the sum based on the number of different sources may be used in some embodiments to obtain a network health state summary for the category. In at least some embodiments, a probability or confidence level may also be assigned to the network health states—e.g., with respect to a given endpoint pair category at a particular point in time, a 90% probability may be assigned to a "no impairment" state, a 9% probability may be assigned to a "partial impairment" state, and a 1% probability may be assigned to an "extensive impairment" state. In one embodiment, the aggregator/verifier components may be configured to utilize a plurality of metrics sets obtained from independent sources to verify certain kinds of network health states—e.g., a second or third tool or data source may be used to confirm an apparent network impairment event.

The presentation manager 318 may be responsible for formatting network health state information appropriately for transmission to various destinations. For example, the network health state for a set of endpoint pairs may be presented in human-readable format for one set of destinations (such as email addresses of interested parties) and in machine-readable format for another set of destinations (such as alert generator programs and the like). In at least one embodiment, data sets that can be used to generate graphical representations of a customer's resources and the corresponding health state information may be produced by presentation manager 318 and transmitted to one or more client display devices. Depending on preferences indicated by customers and/or summarization decisions made at the NHMS, only a subset of the total network health information aggregated at node 302 (and recorded in network health state descriptors) may be transmitted at a given time or in a given message/report in some embodiments. It is noted that some of the components shown in FIG. 3 may not be implemented at one or more NHMS nodes in some embodiments. In one embodiment, respective sets of NHMS nodes may be designated for various functions—e.g., some nodes may be responsible for metrics set collection and parsing, others for weight assignment, others for aggregation/verification of network health state, and others for formatting or presentation of the state information.

Health State Descriptor Elements

Figure 4:
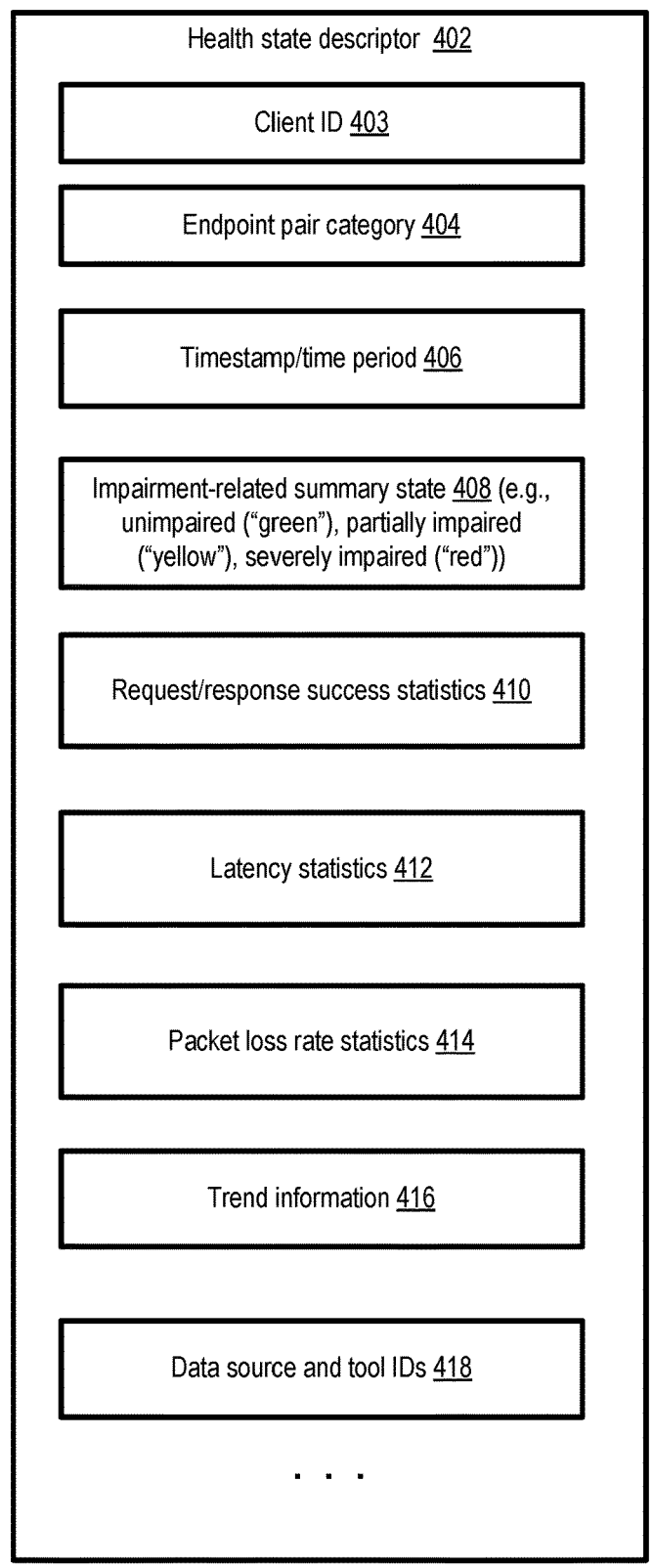
FIG. 4 illustrates example elements of a network health state descriptor which may be used to store information aggregated on behalf of a customer, according to at least some embodiments.

FIG. 4 illustrates example elements of a network health state descriptor which may be used to store information aggregated on behalf of a customer, according to at least some embodiments. Such descriptors may be prepared and/or stored by NHMS nodes, and subsets (or all) of the contents of the descriptors may be used to provide network health state reports or results to client destinations. As shown, a given health state descriptor 402 may include, among other elements, a client identifier 403, an endpoint pair category 404 to which the descriptor applies, a timestamp or time period 406, an impairment-related summary state 408, request/response success statistics 410, latency statistics 412, packet loss rate statistics 414, trend information 416, and/or identifiers 418 of the particular data sources or tools used for the information contained in the descriptor.

Client identifier 403 may indicate, for example, a client account of the provider network on whose behalf the network state information stored in the remainder of the descriptor 402 is being generated. As mentioned earlier, in various embodiments the set of endpoint pair categories with respect to which network health state information is to be provided for a given customer may be determined at the NHMS. Examples of several endpoint pair categories are discussed in further detail below in the context of FIG. 9. In the depicted embodiment, a respective descriptor 402 may be generated periodically for individual endpoint pair categories. In other embodiments, network health state information pertaining to multiple endpoint pair categories may be stored within a single descriptor.

The timestamp or time period element 406 may indicate the time at which (or the time period during which) the metrics used to generate the health state information were collected in the depicted embodiment. The impairment-related summary state 408 may provide a high-level overview of packet flow conditions via network pathways between the endpoint pairs represented by category 404. The summary state for a given endpoint pair category may be selected from a (typically small) set of options in various embodiments, e.g., in which an individual option may represent a corresponding degree of impairment of network traffic associated with the endpoint pair category. In one embodiment, a color-coded scheme may be used (e.g., at a client-side display device at which a data set derived from descriptor 402 may be displayed) to indicate the severity of an impairment, in which the color green or the word green indicates unimpaired connectivity (packets are flowing without significant errors or delays), the color or word yellow indicates partial impairment of connectivity (some packets may be dropped/delayed between some endpoints), while the color or word red indicates severe impairment of connectivity (most packets may be delayed or dropped). Other symbols or encodings of the high-level impairment-related summary state 408 may be used in other embodiments. For example, numeric codes may be used in some embodiments: e.g., "0" for no impairment, "1" for partial impairment, and "2" for severe/extensive impairment, or a "percent impaired" scheme may be used, in which the probability of encountering a problem due to an impairment is provided (e.g., based on an approximate fraction of resources of a particular type which are impacted by a failure event). In various embodiments the network health management service may define a default set of impairment-related summary states for various types of endpoints and resources, e.g., based on respective ranges of metrics. In at least one embodiment, as discussed below in the context of FIG. 5, customers may specify their own definitions of at least some health states, which may override the default definitions.

A number of lower-level statistics may be used to derive the summary state in different embodiments, and at least some of the lower-level statistics may be stored in the descriptor 402 in the depicted embodiment. Request/response success rate statistics 410 may be generated, for example, by a connectivity verifier tool which causes request messages from selected agents to be sent to selected endpoints and tracks how many responses to the request messages are received within a threshold interval. Latency statistics 412 may record the time taken for messages to be transmitted from one device to another. Different kinds of latency statistics 412 may be collected and/or provided to clients of the network health management service, in different embodiments. For example, aggregate statistics such as mean latency for different packet sizes may be collected in one implementation, while jitter statistics indicating variations in latencies over time may also or instead be collected in another embodiment. Packet loss rate statistics 414 may indicate the fraction of packets that were lost or dropped during a given period of network traffic between two endpoints. Individual ones of the statistics 410, 412 and 414 may be computed or aggregated using metrics collected from various data sources in the depicted embodiment. In some embodiments, information 416 regarding recent trends in some or all of the other statistics may be stored in a descriptor 402. In at least one embodiment, an indication of the particular tools or data sources from whose output the statistics and/or summary were derived may also be stored in a descriptor 402, e.g., using ID element 418. It is noted that only a subset of the information indicated in the descriptor 402 may be provided to clients of the network health management service in various embodiments—e.g., in one embodiment, at least initially, only the summary information may be provided to clients via a programmatic interface. Some programmatic interfaces may enable clients to obtain more details, such as the statistics 410, 412 or 414, and/or the trend information 416. In at least one embodiment, descriptors 402 may not necessarily be stored in persistent storage. A given descriptor 402 may simply represent the intermediate results of processing some set of network health-related metrics on behalf of a customer, prior to reporting health state information derived from the metrics to the customer.

Health State Request Elements

Figure 5:
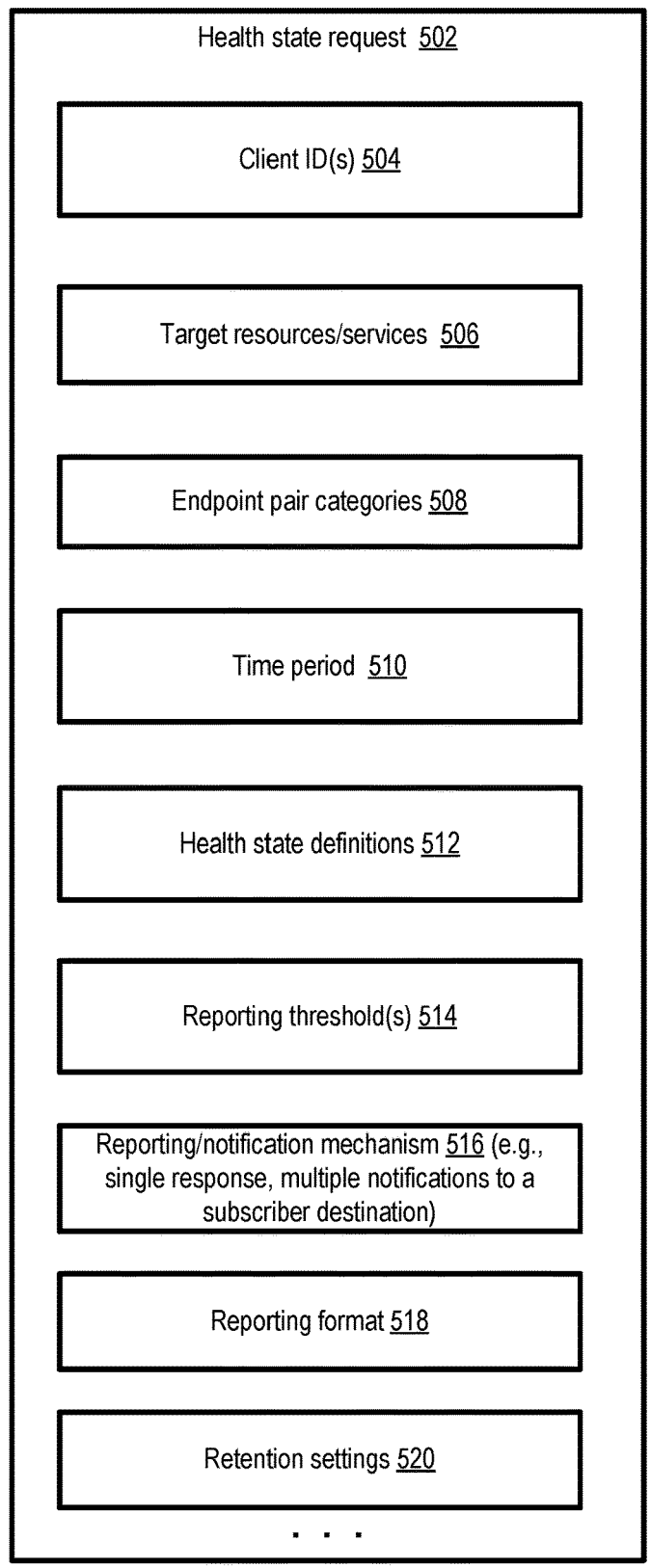
FIG. 5 illustrates example elements of a network health state request which may be transmitted via a programmatic interface supported by a network health management service, according to at least some embodiments.

FIG. 5 illustrates example elements of a network health state request which may be transmitted via a programmatic interface supported by a network health management service, according to at least some embodiments. As shown, a request 502 may include an indication of one or more client identifiers 504, a list of targeted resources or services 506, one or more endpoint pair categories 508, a time period 510, health state definitions 512, reporting threshold(s) 514, a reporting/notification mechanism 516, a reporting format 518 and retention settings 520 in the depicted embodiment.

A given customer of a provider network may be associated with several client accounts in some embodiments—e.g., different accounts may have been set up for different departments of an organization, or for different collaborating business entities. The set of client accounts for which network health state information is desired may be indicated in client ID field 504. In some embodiments, customers with a large number of resources may only wish to see health state information pertaining to a subset of the resources and/or services which they are utilizing; these resources and/or services may be indicated in element 506 of the request 502.

In one embodiment, instead of or in addition to indicating the services and/or resources for which network health state information is to be provided, a client may specify one or more endpoint pair categories 508. In some embodiments, a catalog of endpoint pair categories for which health state information is available may be made available to customers via a programmatic interface, and categories 508 may be selected from such a catalog. In one embodiment, customers may define customized endpoint pair categories, e.g., using labels of the kind discussed below in the context of FIG. 9, and indicate such custom categories in element 508. A time period over which metrics are to be collected or examined may be indicated in element 510 of the request 502 in some embodiments. The time period may be expressed in either absolute or relative terms—e.g., a client request may indicate the logical equivalent of "use metrics corresponding to the most recent 10-minute period", or "use metrics collected between 17:00:00 GMT and 17:20:00 on Apr. 3 2016". The time period element 510 may be used to obtain health state information for time periods in the past in some embodiments—e.g., to help perform post-event analysis of an application problem.

In at least some embodiments, clients may optionally indicate definitions 512 for a number of health states which the network health management service is to report with respect to the client's resources. For example, some clients may define a "severely impaired" state if there is a 10% probability of packets between a pair of endpoints being dropped, while other clients may define a "severely impaired" state if the average latency of messages between a pair of endpoints exceeds T milliseconds, or if the jitter or variance of latencies exceeds a threshold. In some cases, health states may be defined using multiple types of metrics. For example, a given state may be defined as a Boolean combination of a latency condition Cond1 and a packet drop rate condition Cond2. In one such scenario, an unimpaired health state may be defined by the logical equivalent of the Boolean combination "$90^{th}$ percentile latency for P-byte packets is less than T1 milliseconds" AND "packet drop rate in the last M minutes is no greater than D percent". The number of states defined by one client may differ from the number defined by another client. In some embodiments, different state definitions may be indicated for respective categories of resources or endpoints. Furthermore, in addition to the overall impairment-related state (e.g., "unimpaired", "severely impaired" etc.), in at least one embodiment clients may wish to obtain the underlying metrics which led to the determination of the overall state The kinds of metrics which are to be included in the response to request 502 may also be indicated in the request in some embodiments (e.g., as part of the state definitions element or in a separate element). Some clients may indicate that impairment-related summary state information of the kind discussed in the context of element 408 of FIG. 4 is sufficient, while other clients may wish to obtain more detailed statistics regarding request/response success rates, packet drops, mean or percentile latency, latency variation (jitter) statistics and the like.

The reporting threshold 514 may be used to indicate the conditions under which a client is to be provided health state information. For example, some clients may prefer not to be provided health state information unless there is a 10% probability of a network impairment event which is likely to impact the client's applications. Other clients may wish to receive health state information regardless of whether an impairment event has been detected or not, or only when the state of a given resource or endpoint pair changes. Any combination of a number of reporting or notification mechanisms 516 may be indicated by a client in request 502 in various embodiments. For example, some clients may indicate e-mail addresses, text message addresses or the like, while other clients may wish to receive health state information on a dashboard or graphical display. In some embodiments, a notification service of the provider network may be selectable as a notification mechanism, or a client may simply want information to be provided via an application programming interface. Some clients may wish to use a "pull" model for obtaining network health state, in which the information is provided only when requested, while others may prefer a "push" approach, in which the network health management service proactively sends health state information periodically or under specified conditions to one or more destinations. A subscription model may be supported in at least some embodiments, in which in response to a single subscription request, multiple health state messages may be transmitted to one or more subscribers using a specified notification mechanism, which each message indicating the health state of one or more endpoint pair categories during respective time intervals. Reporting format 518 may indicate the encoding or data structure to be used to report the health state in the depicted embodiment—e.g., whether JSON (JavaScript Object Notation), XML (Extended Markup Language), or plain text is to be used, or whether a hash map or other data structure is to be used. Retention preferences 520 may indicate a time period (e.g., a week or a month) for which the network health state data is to be retained at the network health management service in some embodiments, e.g., so that queries regarding past health states can be supported. In at least some embodiments, a time series format for reporting health state information may also be supported. A sequence of network health state data records may be provided for an endpoint pair category or for a specific resource in such embodiments, with each record corresponding to a respective point in time within a time interval indicated by the client or selected by the service (e.g., one record may be provided for each minute of the previous ten minutes). Each network health state data record of a time series may represent a summary health state as of the corresponding point in time, or a particular metric collected at the corresponding point in time. In some embodiments, clients may request that information about various kinds of changes to health states of one or more endpoint pair categories over time be provided. For example, instead of providing a static health state information report corresponding to a particular time, or a time series whose intra-record intervals are explicitly specified by the customer, the NHMS may provide an indication of changes to the degree of impairment of an endpoint pair category over several seconds or minutes. For example, the NHMS may report that an endpoint pair was 70% impaired at time T1, 50% impaired at time (T1+delta1) as repairs were performed, 20% impaired at time (T1+delta1+delta2), etc. Retention preferences 520 may be set in some embodiments based at least in part on the desired time series durations and/or the time periods over which changing health state information is to be reported.

In some embodiments, one or more APIs may be implemented by the network health management service to enable health state requests to be sent to the network health management service and to receive the corresponding responses. For example, an API such as getHealthState(myAccountID, resourceDescriptor, serviceDescriptor, endpointPairDescriptor, timingPreferences, healthStateDefinitions, reportingThreshold, reportingMechanism, format, retentionPeriod) may be used in one embodiment, with the parameters respectively representing the various elements of request 502 shown in FIG. 5. Some or all of the parameters of getHealthState may be optional in various implementations—for example, the account identifier of the customer may be inferred from a header of the message used to submit the request, the network health management service may determine the resources/services targeted if the resourceDescriptor or serviceDescriptor parameters are not specified, and so on. In at least one embodiment, if and when a client submits the equivalent of "getHealthState( )" with no parameters, the network health management service may determine appropriate values for some or all of the elements shown in FIG. 2, e.g., using a set of default parameter determination algorithms and metadata obtained from various services, and provide meaningful health state information to the client based on those values. It is noted that a request similar to that indicated in FIG. 5 may be generated as a result of a use of a graphical user interface control (such as a mouse click on a button or a link) in some embodiments.

Data Source Examples

Figure 6:
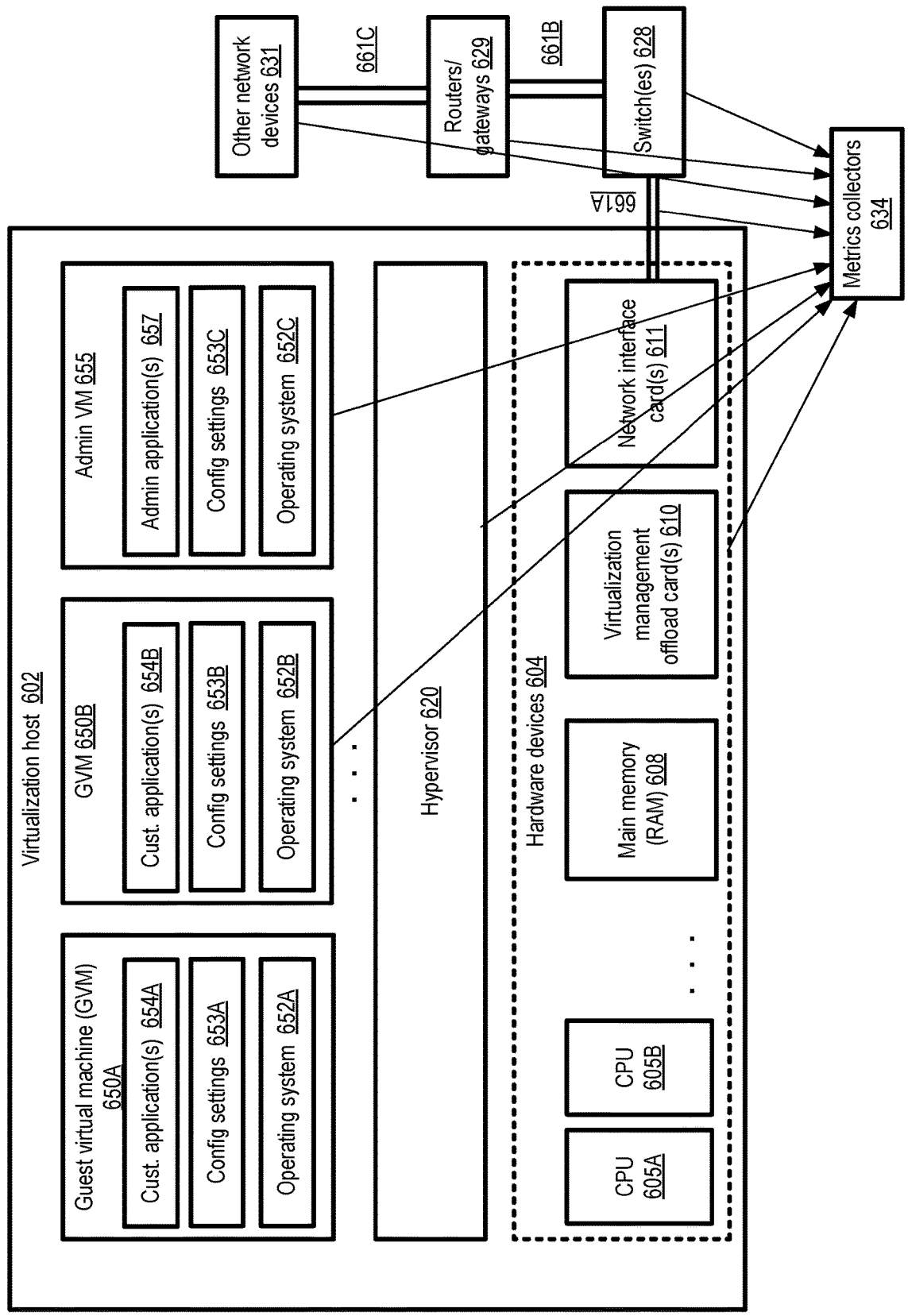
FIG. 6 illustrates example data sources from which networking-related metrics pertaining to guest virtual machines of a virtualized computing service may be obtained, according to at least some embodiments.

FIG. 6 illustrates example data sources from which networking-related metrics pertaining to guest virtual machines of a virtualized computing service may be obtained, according to at least some embodiments. As discussed earlier, a virtualized computing service (VCS) may comprise a plurality of virtualization hosts, at individual ones of which one or more guest virtual machines (GVMs) may be instantiated. In the embodiment depicted in FIG. 6, a virtualization host 602 of a VCS comprises two guest virtual machines 650A and 650B, as well as an administrative virtual machine 655, a hypervisor 620, and a number of hardware devices including CPUs 605A and 605B, main memory 608, virtualization management offload cards 610, and network interface cards (NICs) 611.

The administrative virtual machine 655, the hypervisor 620, and the virtualization management offload cards 610 may collectively be referred to as virtualization management components (VMCs). The VMCs may act as intermediaries between the GVMs 650 and the (remaining) hardware components of the virtualization host, in effect presenting an abstracted or virtualized view of the hardware to each GVM. As discussed below in further detail, an encapsulation protocol may be implemented at the VCS, which enables GVMs 650 to communicate with each other (and with other endpoints) using network addresses which are not tied to the NICs 611 at the virtualization hosts.

Each GVM 650 (as well as the administrative VM 655) may comprise one or more applications, such as customer applications 654A and 654B of GVMs 650A and 650B respectively and administrative applications 657 of VM 655, at least some of which may be communicating with applications at other GVMs, VCS hosts, endpoints of other services of the provider network, or endpoints outside the provider network. In addition, each virtual machine may comprise a respective operating system 652 (such as 652A-652C) and may store respective networking-related configuration settings 653 (e.g., 653A-653C).

The NICs 611 of the virtualization host 602 may be connected via physical links 661A to switches 628, which may in turn be connected via additional physical links 661B and 661C to routers/gateways 629 and/or other network devices 631. At least in principle, connectivity disruptions, traffic flow slowdowns, packet drops and other network impairments may occur as a result of underlying problems at any combination of the hardware and software components shown in FIG. 6. Furthermore, in some cases network impairments may result from inappropriate configuration settings 653. As a result, to obtain a comprehensive view of network health state of the GVMs allocated to different customers, in some embodiments respective metrics collectors 634 may be set up to capture metrics from each of the different kinds of components shown, and pass the collected metrics on to the network health management service. Some metrics collectors may be incorporated within the virtualization hosts (e.g., as daemons or user-mode processes), while others may be external to the virtualization hosts (e.g., in the form of packet header analyzers, sniffers, traffic flow analyzers, tapping tools, etc.). In some embodiments, one or more of the metrics collectors may periodically capture various configuration settings 653 and provide them to the network health management service for analysis.

Resource Grouping Hierarchy

Figure 7:
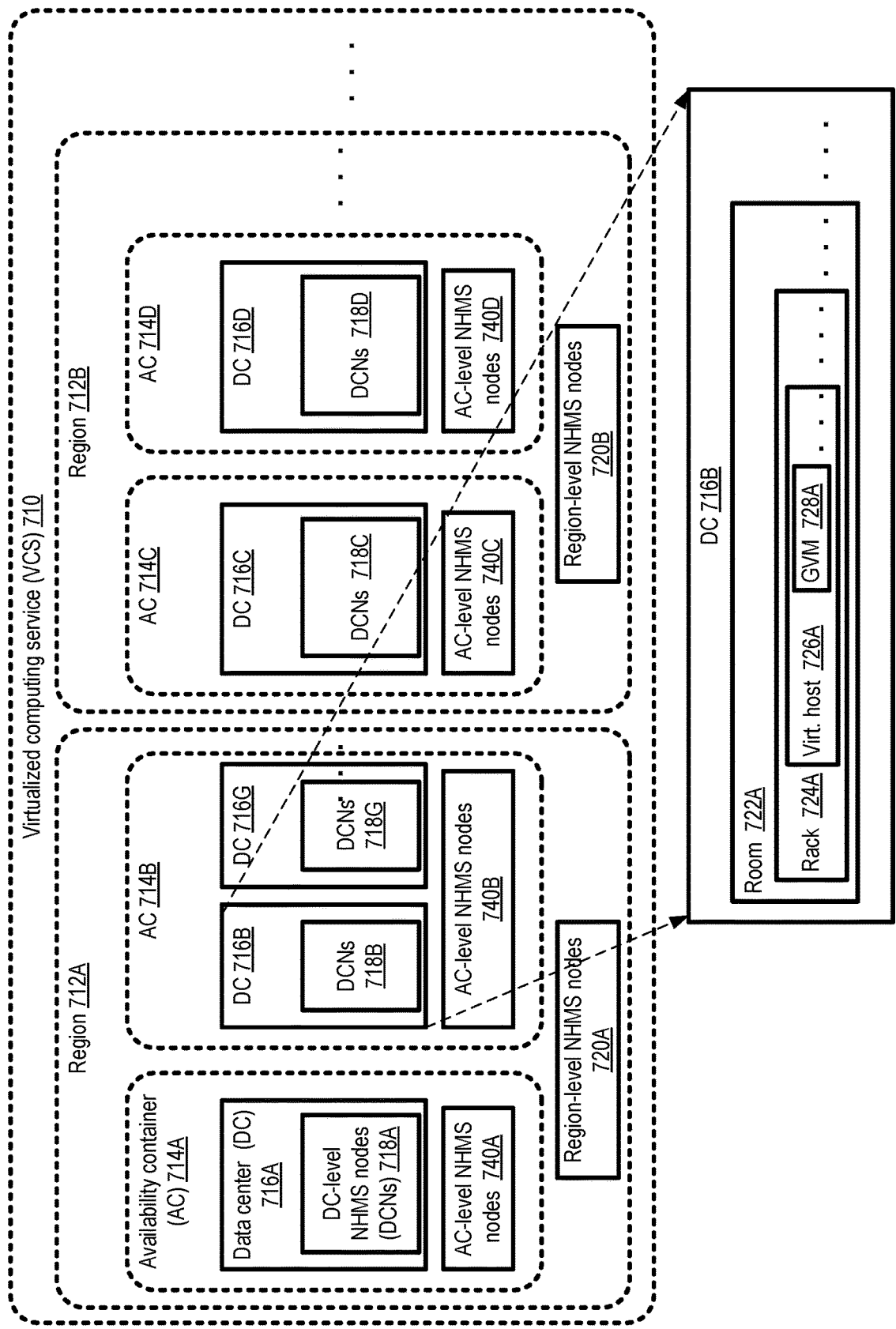
FIG. 7 illustrates an example hierarchy of resources of a virtualized computing service, according to at least some embodiments.

The complexity of determining the network health state of a customer's resources may be further complicated by the fact that the resources may be spread across widely distributed locations, potentially with some locations more thoroughly instrumented for network measurements than others. FIG. 7 illustrates an example hierarchy of resources of a virtualized computing service, according to at least some embodiments. As shown, the resources of a VCS 702 may be dispersed among a plurality of regions 712, such as regions 712A and 712B. A given region may 712 may comprise a group of data centers 716 (e.g., data centers 716A, 716B and 716G of region 712A, or data centers 716C and 716D of region 712B). The data centers which make up a given region may be located near to each other, e.g., within the same metropolitan area or state, although the correspondence between VCS region boundaries and geographical/political boundaries may not be exact in at least some embodiments.

In the depicted embodiment, the VCS resources may also be logically divided among availability containers (ACs) 714, such as ACs 714A and 714B of region 712A, and ACs 714C and 714D of region 712B. Availability containers may also be called availability zones in some environments. A given availability container may comprise portions or all of one or more distinct locations or data centers, engineered in such a way (e.g., with independent infrastructure components such as power-related equipment, cooling equipment, or physical security components) that the resources in a given availability container are insulated from failures in other availability containers. In the examples shown in FIG. 7, ACs 714A, 714C and 714D each comprise resources within a single data center, while the resources of AC 714B span two data centers 712B and 712G. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers. As discussed below in further detail, an isolated virtual network comprising GVMs in multiple availability containers may be set up on behalf of some VCS customers to enhance the failure resilience of the customer applications. From the perspective of application availability, information about the state of the network pathways between availability containers may be especially important to at least some customers.

Each data center 712 may in turn comprise one or more rooms, such as room 722A of data center 712B. A given room may in turn comprise a plurality of racks, such as rack 724A, within which a number of virtualization hosts (such as virtualization host 726A of rack 724A) are located, and each virtualization host may comprise zero or more GVMs (such as GVM 728A of host 726A). Networking failures or other impairments may occur at any of the various levels of the hierarchy shown in FIG. 7. In some embodiments, nodes of the network health management service may also be organized hierarchically. For example, one or more region-level NHMS nodes 720 (e.g., 720A or 720B) may be established in each region, AC-level NHMS nodes 740 (e.g., 740A-740D) may be set up in each availability container, data center level NHMS nodes 718 (e.g., 718A, 718B, 718G, 718C or 718D) may be configured in each data center, and so on. At some levels of the hierarchy, metrics collectors and aggregation/analysis nodes may both be configured in one embodiment, while at other levels, only metrics collectors or only aggregation/analysis nodes may be set up. In at least some embodiments, the hierarchy of the NHMS nodes may extend to other levels as well—e.g., each rack may have its own NHMS node(s), or each room within a data center may have its own NHMS node(s). In the embodiment depicted in FIG. 7, the NHMS may be responsible for translating large volumes of detailed point-to-point network metrics obtained at various levels of the hierarchy into reliable aggregated network health state information which can be used by customers to diagnose and resolve networking-related problems of complex distributed applications as needed.

Isolated Virtual Networks

Figure 8:
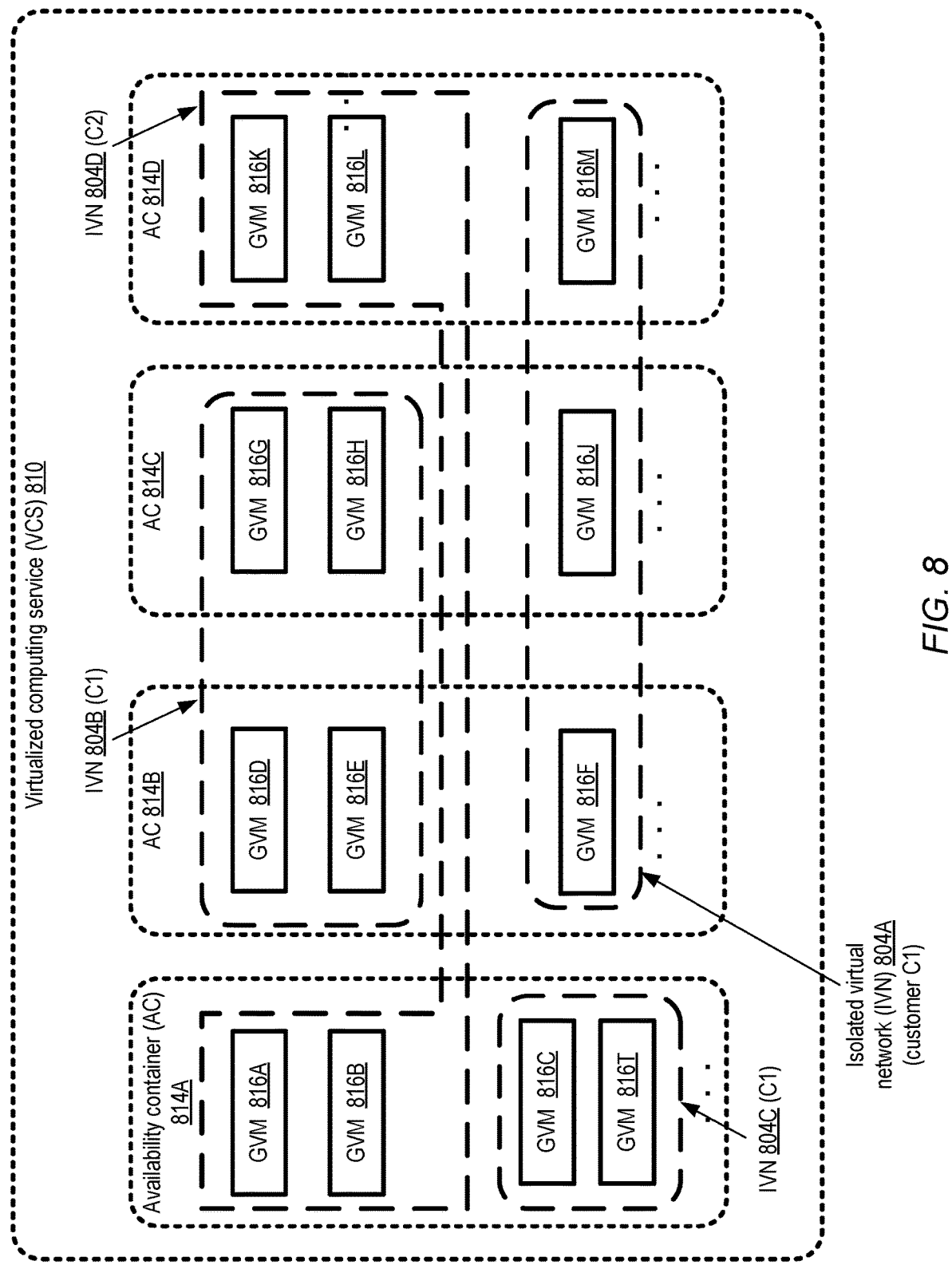
FIG. 8 illustrates examples of isolated virtual networks which may be established on behalf of customers of a virtualized computing service, according to at least some embodiments.

Depending on their application and security needs, customers of virtualized computing service may require varying levels of network isolation. FIG. 8 illustrates examples of isolated virtual networks which may be established on behalf of customers of a virtualized computing service, according to at least some embodiments. The VCS 802 comprises at least four availability containers (ACs) 814 in the depicted embodiment—ACs 814A-814D. Four examples of isolated virtual networks (IVNs) 804 are shown—IVNs 804A, 804B and 804C, all established for one customer C1, and IVN 804B, established for a different customer C2. IVN 804A comprises GVMs 816F, 816J and 816M, each of which is part of a respective availability container 814. IVN 804B comprises two GVMs in each of two ACs—GVMs 816D and 816E in AC 814B, and GVMs 816G and 816H in AC 814C. IVN 804C comprises GVMs 816C and 816T, both of which are part of AC 814A. IVN 804D comprises GVMs 816A and 816B in AC 814A, and GVMs 816K and 816L in AC 814D.

Generally speaking, an IVN 804 may comprise one or more guest virtual machines and/or other devices (such as storage devices managed by a storage service, or networking devices such as virtual or physical gateways) and resources of a provider network. The customer for whom the IVN is established may be granted substantial networking configuration flexibility for the IVN. For example, customers may choose a range of private IP addresses from which particular addresses are to be assigned to various guest virtual machines, set up subnets, establish security rules for incoming and outgoing traffic, create routing table entries, and so on, in a manner very similar to the way that network configuration settings could be selected at a customer-owned facility. The private IP addresses assigned within a given IVN 804 may not be accessible (at least by default) outside that IVN; as a result, the client may choose arbitrary IP addresses for the GVMs without having to be concerned about the possibility of duplicating addresses already assigned outside the IVN. In general, IVN capability may enable VCS clients to set up networking configurations as though they were using client-owned resources, while benefiting from the scaling, availability and pricing-related advantages made possible by the provider network. IVNs may also be referred to as "virtual private clouds" in some provider network environments.

In some embodiments, each of the GVMs allocated to a customer may belong to an IVN; in other embodiments, at least some GVMs which are not configured as part of an IVN may be assigned to a customer. Different IVNs may be used for respective groups of related applications, and security settings may be configured independently for each IVN in some embodiments. By default, at least some of the resources (such as GVMs) within a given IVN may not be accessible to resources outside the IVN. In some embodiments, connectivity between the resources of an IVN, and resources outside the IVN, may be enabled using virtual and/or physical gateways. Some IVNs may be configured to enable secure communications between the GVMs of the IVNs and networks outside the provider network, e.g., customer networks established at customer-owned data centers. In at least some embodiments, IVNs may represent an important resource grouping abstraction from a customer perspective. As such, at least some customers may wish to obtain network health state information at the IVN level in such embodiments.

Endpoint Pair Categories

Figure 9:
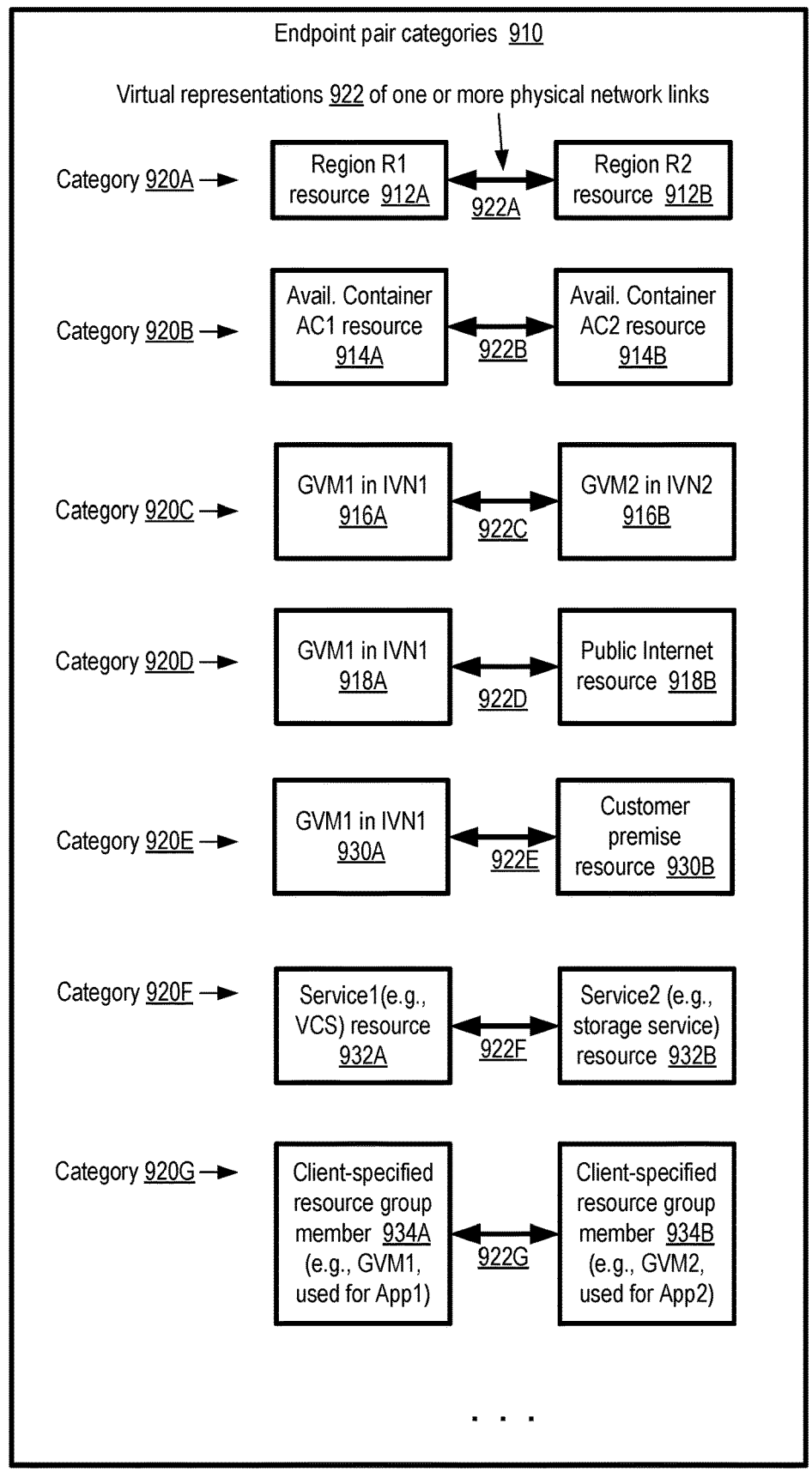
FIG. 9 illustrates examples of endpoint pair categories for which respective health state information reports may be provided to clients of a network health management service, according to at least some embodiments.

As mentioned earlier, in at least some embodiments, network health state information may be generated with respect to a number of endpoint pair categories. FIG. 9 illustrates examples of endpoint pair categories for which respective health state information reports may be provided to clients of a network health management service, according to at least some embodiments. Each endpoint of an endpoint pair category may represent a resource set with some set of characteristics in common in various embodiments—e.g., the resources in a given resource set may have a common geographical location or network configuration setting, or the resources in a given resource set may be used for implementing a particular service. The path between the endpoints of a given category may comprise a virtual representation of one or more physical network links, and the health state information for the category may be derived at least in part using network metrics obtained from physical network devices used for traffic associated with the category.

Endpoint pair category 920A corresponds to resource sets located in different regions—e.g., one resource 912A in region R1, and another resource 912B in region R2. Category 920B comprises endpoints located in different availability containers—e.g., one resource 914A in availability container AC1, and a second resource 914B in a different availability container AC2. Category 920C comprises endpoints located in different isolated virtual networks, such as a guest virtual machine GVM1 in isolated virtual network IVN1, and a second GVM, GVM2, in IVN2.

In category 920D, one of the endpoints is a public Internet resource 918B (e.g., a web site of the public Internet), while the other endpoint is a GVM (GVM1) within an IVN (IVN1) of the VCS. In category 920E, one of the endpoints 930B corresponds to a resource which is part of a customer-premise network, while the second endpoint is a resource (GVM1) within an IVN (IVN1) of the VCS. Endpoint pair category 920E represents cross-service network traffic, e.g., between resource 932A of one provider network service (such as the VCS) and resource 932B of another provider network service (such as a storage service or a database service). As mentioned earlier, in some embodiments one or more of the other services accessed by GVMs of the VCS 130 may allow clients to submit requests from the public Internet. In some such embodiments, special endpoints (called virtual private endpoints) may be established within the VCS which enable service requests to flow from the VCS to the other services (and responses to the service requests to be received) using provider network resources, without requiring packets representing the requests/responses to traverse the public Internet. An endpoint pair category for cross-service traffic (analogous to category 920E) may include a virtual private endpoint for one of the services as one of the endpoints of the pair in some embodiments.

In at least one embodiment, customers of the provider network may define custom endpoint pair categories. For example, a set of APIs or other programmatic interfaces may be provided to allow a customer to label selected sets of resources with respective labels, and then to define an endpoint pair category which comprises one resource with one label, and another resource with a different label. Consider one example scenario in which a customer C1 has two applications, App1 (which runs on a first set of VCS resources) and App2 (which runs on a different group of VCS resources). Using programmatic interfaces provided by the VCS or the network health management service, customer C1 may label the resources being used for App1 as "App1-group" resources, and the resources being used for App2 as "App2-group" resources. A custom endpoint pair category such as 920G may then be created, corresponding to network communications between resources of App1-group and App2-group. Other custom endpoint pair categories may represent intra-group traffic—e.g., App1-group resources communicating with other App1-group resources, or App2-group resources communicating with App2-group resources. Network health state information for the custom endpoint pair categories may be provided to customer C1, e.g., either upon request or by default by the network health management service. Some customers may wish to obtain network health state information pertaining to a combination of custom endpoints and service-defined endpoints. The paths 922 (e.g., paths 922A-922G) between the endpoints of various endpoint pair categories may present a concise virtualized view of the various hardware components (e.g., physical network links, networking devices such as routers and the like) and associated software/firmware used for the traffic between the resources corresponding to the endpoints of the category. In effect, a virtualized view of the set of networking components being used on behalf of a customer may be provided using endpoint pair categories in various embodiments. Endpoint pair categories other than (or in addition to) those shown in FIG. 9 may be used in some embodiments. It is noted that in various embodiments, the resources for which health state information is provided to a given customer may in some cases be mapped to a single endpoint pair category; thus, multiple endpoint pair categories may not be identified for at least some customers.

In various embodiments, the network health management service may be responsible for (a) identifying the endpoint pair categories for which network health state information is to be provided to a given client or customer and (b) using the network metrics obtained from various data sources and/or intermediate tools to generate network health state information for the identified endpoint pair categories. In some embodiments, as mentioned earlier, control plane components of various services of the provider network may be able to indicate the kinds of resources allocated to a given customer, from which the endpoint pair categories likely to be most useful to the customer may be derived. In at least one embodiment, clients may specify the particular endpoint pair categories for which health state information is desired, or clients may create new endpoint pair categories similar to category 920G of FIG. 9, which may be assumed to be categories for which health state information should be provided. Given the wide variety of data sources and metrics collectable in a large provider network environment, the task of determining health state reliably for individual endpoint pair categories may involve the use of a variety of algorithms for correlation, disambiguation, verification and summarization. For example, information which may be pertinent to the health state of endpoint pair category 920B (with endpoints in respective availability containers) may be received from a variety of sources such as application-level or user-mode connectivity verifiers, network link monitors, routers, encapsulation protocol processing components, and the like. The information may have to be parsed and correlated (in terms of time, in terms of physical and network locations of the resources involved, and so on). In some cases one part of the information obtained may conflict with another part, and a verification protocol (which may involve gathering of additional data) may be used to resolve such conflicts in various embodiments, before a summarized representation of health state for the endpoint pair category can be generated.

Graphical Interface Examples

Figure 10:
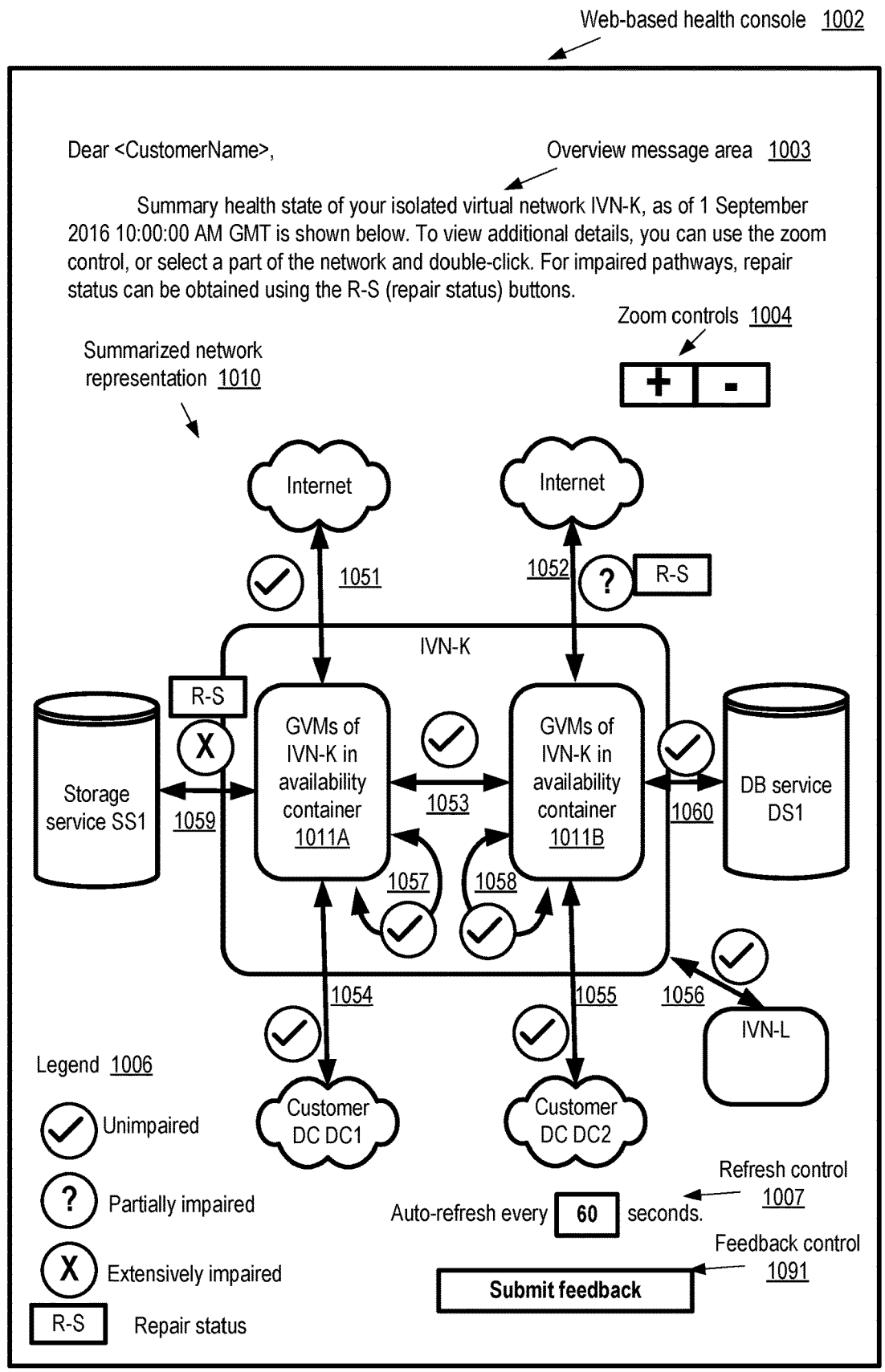
FIG. 10 illustrates an example web-based interface which may be used to provide high-level network health state information to a client of a virtualized computing service, according to at least some embodiments.

A variety of programmatic interfaces may be used to provide network health state information at customizable granularity in various embodiments, including for example web-based consoles, APIs, command line tools and graphical user interfaces. FIG. 10 illustrates an example graphical interface which may be used to provide high-level network health state information to a client of a virtualized computing service, according to at least some embodiments. As shown, the interface may comprise a web-based health console 1002. The console 1002 may include a message area 1003 providing an overview of the contents of the console, and a summarized representation 1010 of the portion of the network for which health state information is being displayed. Groups of resources corresponding to the endpoints of different endpoint pair categories may be represented in summary form using individual icons, and the physical networking links/devices between the groups of resources may be represented by virtual paths between the endpoints of the categories. In at least one embodiment, as soon as the network health management service detects that an entity associated with a client account has successfully logged in to a management console associated with the virtualized computing service (or some other service of the provider network), health state information similar to that shown in FIG. 10 may be displayed (and the display may subsequently be refreshed periodically). That is, logging in to the management console may serve as the equivalent of transmitting a request for graphical display of network health state (so that an explicit request for the graphical display of health state information may not be required). In one implementation, the health state information may be associated with one tab of several tabs of the management console—e.g., one tab may provide billing information, another may provide account profile information, another may be used to request resource allocations, while another may provide network health state information.

In the depicted example scenario, the console shows health state information for several endpoint pair categories, with at least one endpoint of each pair being a GVM within an isolated virtual network IVN-K. The endpoint pair categories are labeled 1051-1060 in FIG. 10. Each endpoint pair category shown represents a type of network traffic flow over some collection of pathways for which summary health state information may have been generated by aggregating metrics corresponding to a variety of data sources and locations. The GVMs of IVN-K are distributed among two availability containers, 1011A and 1011B. One of three symbols indicated in legend 1006, each of which is indicative of a respective degree of impairment of network traffic, is assigned to each endpoint pair category to summarize the network health state: the circle with a check mark symbol indicates an unimpaired state, the circle with an "X" indicates severe impairment, while the circle with a "?" indicates partial impairment. In some embodiments, the severity of a network health problem or impairment may be indicated using a color code—e.g., a red icon or red text may be used to indicate extreme or sever impairment, a yellow icon or text may be used to indicate moderate or partial impairment, and a green icon or text may be used to indicate unimpaired state. Other encoding schemes to indicate degrees of impairment of network traffic corresponding to different network health states may be used in some embodiments. Buttons labeled "R-S" are shown adjacent to health state symbols which indicate impairment (either partial or severe impairment), and may be used to obtain repair status regarding the impairments. The definitions of each of the health states (that is, the conditions under which the state is deemed to be unimpaired, partially impaired or severely impaired) may be selected by the network health management service in various embodiments. In at least one embodiment, customers may provide their own customized definitions for health states to the network health management service, and the service may use those definitions when reporting network health for the customers' resources.

One endpoint of endpoint pair category (EPC) 1053 represents GVMs of IVN-K in availability container 1011A, while the other endpoint represents GVMs of IVN-K in availability container 1011B. EPCs 1051 and 1052 represent communications between the GVMs in availability containers 1011 and the external Internet. EPC 1057 represents network traffic among the GVMs of IVN-K within availability container 1011A, while EPC 1158 represents network traffic among the GVMs of IVN-K within availability container 1011B.

In the depicted example, EPC 1054 represents traffic between the GVMs in AC 1001A and a customer-owned data center DC1, while EPC 1055 represents traffic between the GVMs in AC 1011B and a different customer-owned data center DC2, EPC 1056 represents traffic between IVN-K and another isolated virtual network IVN-L. EPC 1059 represents traffic between the GVMs of AC 1011A and a storage service SS1. EPC 1060 represents traffic between the GVMs of AC 1011B and a database service DS1.

Among the various endpoint pair categories for which health state is displayed in FIG. 10, one (EPC 1059) is in a severely impaired state, one (EPC 1052) is in a partially impaired state, and the remaining are in unimpaired state as of the time indicated in message area 1003. Zoom controls 1004 may be used to obtain more detailed network health state information, as discussed below in the context of FIG. 11.

The kind of graphical display illustrated in FIG. 10, which in effect provides a "virtual network" representation of the resources being used for a client, may be generated in response to a health state request submitted by a client in various embodiments. The term "virtual network" may be used because information about at least some physical devices and physical network links actually being used for the client's network traffic may be abstracted in the form of icons and virtual paths corresponding to endpoint pair categories. The particular focus of the display (the GVMs of IVN-K in the illustrated example) may be indicated in the request, or may be selected by the network health management service in various embodiments based on an examination of the resources being used by the requester. In at least some embodiments, a given client may have a large number of resources (e.g., dozens of IVNs distributed among numerous regions and availability containers), and the network health management service may have to determine how best to summarize the state of the client's network given a limited amount of display space. The scale or granularity-related decisions for displaying customer network health information may be based at least in part on characteristics of the display—for example, it may be possible for the network health management service to determine the size (in pixels) of the display device being used, and the granularity of the displayed information may be adjusted accordingly. In at least some embodiments, the information displayed via console 1002 may be refreshed automatically, e.g., at a rate controllable via refresh control 1007. Note that, as new resources are allocated on behalf of the customer or some resources are de-allocated, a subsequent refresh may result in the display of health state information for a different set of endpoint pair categories—that is, either the set of endpoint pair categories, the states of the pathways between the endpoint pair members, or both may change over time.

In at least some embodiments, customers may provide feedback regarding the network health state information displayed via the console 1002 (or, more generally, the health state information provided via any of the supported interfaces). Such feedback may include, for example, confirmations indicating that the customer is experiencing application behavior which matches the indicated health state information for an endpoint pair category or a particular resource, or contradictions of the health state indications provided by the network health management service. In the embodiment depicted in FIG. 10, the feedback may be provided using control 1091 (which may lead to the display of a pop-up text form or graphical input panel, for example). In other embodiments, at least some of the health state icons may have embedded controls which enable a customer to provide feedback by clicking on or near the icon itself—e.g., with by clicking on the icon associated with EPC 1059, which shows extensive impairment, a customer may be able to confirm the impaired state (or, in contrast, indicate that from the customer perspective, impairment is not being experienced with respect to network traffic for EPC 1059). Such feedback messages may be provided via non-graphical interfaces as well in some embodiments. For example, a customer may receive a response to a network health state request similar to that shown in FIG. 5 submitted via an API, and use another API to submit follow-up feedback indicating confirmation/contradiction of network health state information contained in the response. Other interfaces such as command-line tools may also be used in various embodiments for feedback messages.

Contents of such feedback messages may be used in a variety of ways in different embodiments at the network health management service. For example, in one embodiment the feedback obtained from customers may be treated as another set of metrics, which can then be aggregated together with metrics from other sources to update network health state information for various EPCs or resources. Consider a scenario in which the NHMS concludes (and indicates to numerous customers) that traffic between a particular availability container AC1 and the public Internet is flowing in an unimpaired manner. If feedback from a large number of customers who are using AC1 contradicts that conclusion, the aggregated customer feedback may potentially be used to trigger more extensive verification of the state of traffic flow between AC1 and the Internet, and/or to conclude that the state may actually be partially or extensively impaired.

Another way in which feedback message contents may be used by the NHMS in one embodiment is to trigger various types of events or operations at a customer support organization of the provider network. For example, consider a scenario in which, at some time T1, the NHMS concludes that an impairment event has occurred which is disrupting traffic between sets of endpoints {E1} and {E2}. The NHMS may notify customers that are expected to be affected by the event, e.g., using interfaces similar to console 1002, APIs, etc. Operations to debug and/or repair the impairment may be initiated at the provider network. Later, at some time (T1+delta1), based on various metrics and/or on input from the repairing organization or entities, the NHMS may conclude that the impairment has been fixed, and indicate the completion of repair and the resumption of unimpaired status to various customers. If a particular customer receives an indication that the health state of a particular EPC is supposed to be unimpaired, but continues to experience application networking problems associated with that EPC, a feedback message may be transmitted to the NHMS indicating that the customer's applications continue to be affected negatively. In such a scenario, the NHMS may use the contents of the contradicting feedback message to, for example, open or escalate a support request, or cause a member of the support staff of the provider network to contact the customer from whom the feedback was received. This course of action may be especially appropriate if, out of a large number of customers whose applications were experiencing a negative impact of the impairment event, most customers report that they are no longer experiencing the problem, but a particular customer C1 continues to experience the problem. In such a situation, something specific to C1's resources or applications may be causing the problem, and as a result a support action for C1 may be initiated.

As mentioned above, a refresh control 1007 may be used to update the information being displayed in some embodiments. In other embodiments, instead of or in addition to providing snapshots of health state information, each of which separately indicates network health at a given point in time, more dynamic views of health information may be provided. In one such embodiment, a time series of network health information may be represented graphically, with individual network health state records of a given time series representing the state of one or more resources at discrete points of time over a selected time interval. In some embodiments, changes to health state (if and when such changes occur) may be represented in the graphical view. For example, in one scenario the health state of a given endpoint pair category may be represented by a visual "percent unimpaired" indicator. If the endpoint pair category is extensively unimpaired as a result of some failure, the percent unimpaired value may fall to zero or some small integer. As repairs are performed, the percent unimpaired value may rise, eventually reaching 100%. This change in the degree of impairment may be shown in some embodiments using a graph in which the X-axis represents time and the Y-axis corresponds to the "percent unimpaired" metric. Having such dynamic and automatically updated views of health state may be especially valuable to customers whose applications have been affected by a failure.

In at least one embodiment, hints regarding the layout of the health state information in the graphical view may be provided. For example, information about a logical or physical relationship between a particular endpoint and another endpoint, or between a particular endpoint category and another endpoint category, which can be used to place the graphical representations of those entities relative to one another may be obtained (e.g., from a source such as a control plane component of a virtualized computing service). In one scenario, containment relationships between regions and availability containers may be provided to the device at which the health state information is going to be displayed, together with a directive that region-level information should generally be displayed above availability container level information. Such relationship information and accompanying directives may result in a consistent look-and-feel for the graphical representations of network health state information—for example, inter-region information may consistently be shown above intra-region information, regardless of the display device or the particular customer to whom the information is displayed. The relationship information may be included in the data sets generated by the network health management service for the graphical displays in some embodiments, or may be obtained separately in other embodiments.

Figure 11:
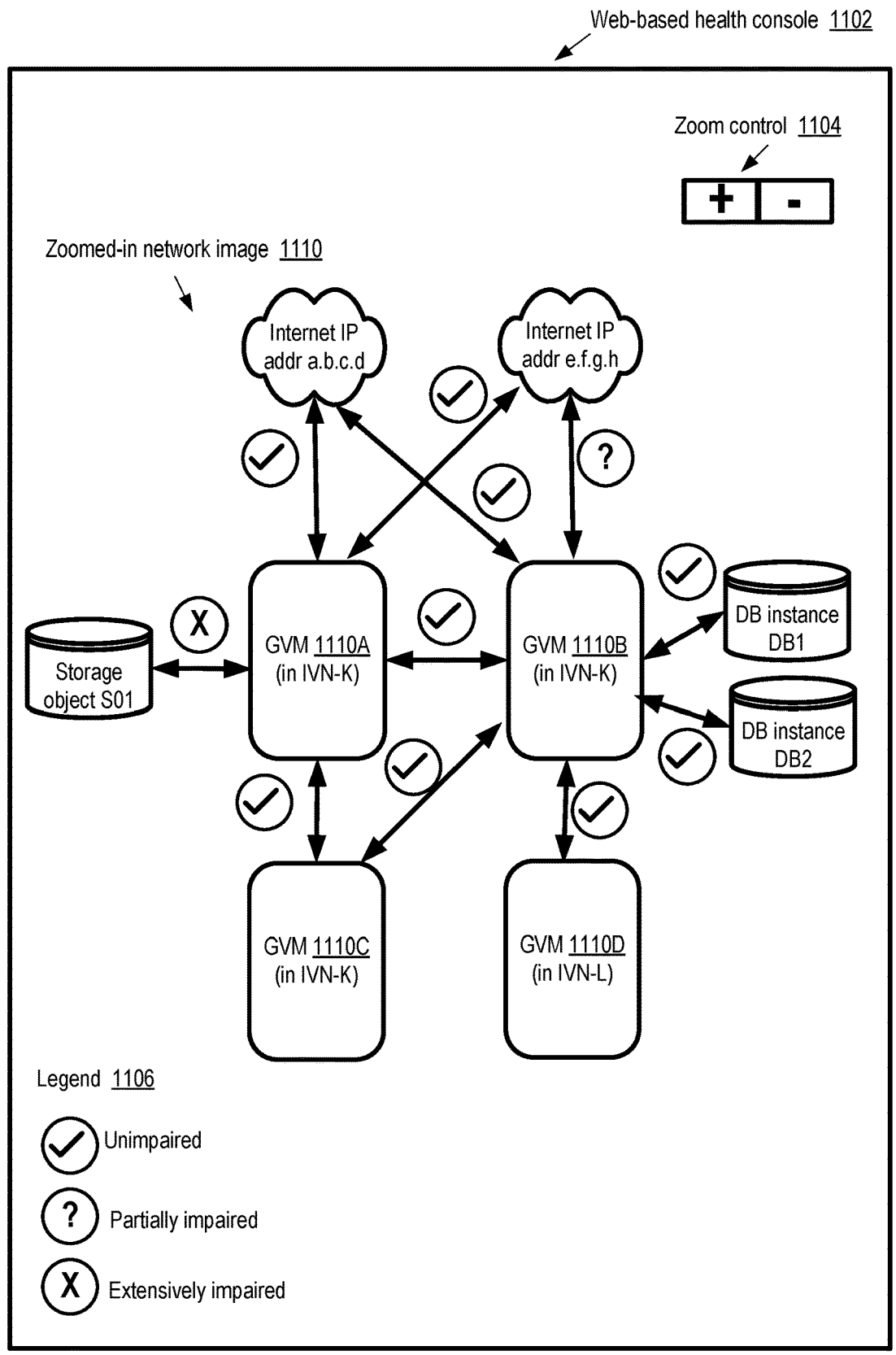
FIG. 11 illustrates an example web-based interface which may be used to provide network health state information at the level of individual virtual machines to a client of a virtualized computing service, according to at least some embodiments.

In some cases, customers may wish to drill down to a finer granularity of detail than the summarized level shown in FIG. 10. FIG. 11 illustrates an example graphical interface which may be used to provide network health state information at the level of individual virtual machines to a client of a virtualized computing service, according to at least some embodiments. Starting with a summarized network representation similar to that of FIG. 10, and using the zoom controls 1104 and/or other interface elements of the graphical console 1102, a client of a VCS may be able to view the state of the network traffic flow between individual resources in the depicted embodiment.

In the zoomed-in network image 1110, the focus is on individual endpoints rather than on endpoint pair categories. Four GVMs are shown: GVM 1110A, 1110B and 1110C in isolated virtual network IVN-K, and GVM 1110D in isolated virtual network IVN-L. In at least some embodiments, network health state information at the individual resource level may only be shown with regard to pathways over which attempts to transmit network packets have actually occurred, e.g., within a selected time window. Thus, for example, in the scenario depicted in FIG. 11, while in principle it may be the case that network packets could be transmitted between GVM 1110A and GVM 1110D, the health state of that pathway is not indicated because GVMs 1110A and 1110D may not have communicated (or attempted communications) within the previous T minutes relative to the time for which the information is displayed.

In the example scenario shown, the respective states of network traffic flow between GVM 1110A and five other endpoints are shown: storage object S01 (which may be managed at a storage service of the provider network), GVM 1110B, GVM 1110C, and public Internet endpoints "a.b.c.d" (expressed, for example as Internet Protocol version 4 addresses) and "e.f.g.h". As indicated by the respective symbols (selected from the symbol set shown in legend 1106), the health state of most of the traffic flows associated with GVM 1110A is unimpaired. The exception is the flow of traffic between S01 and GVM 1110A, which is shown as being severely impaired.

Seven traffic endpoints are shown with respect to GVM 1110B: GVM 1110A, GVM 1110C, GVM 1110D, the two public Internet endpoints, and two database instances DB1 and DB2 (which may be managed, for example, by a database service of the provider network). The state of the traffic flow for most of the endpoints with which GVM 1110B is in communication is shown as unimpaired, with the exception of the Internet endpoint "e.f.g.h", which is shown as partially impaired. With respect to GVMs 1110C and 1110D, all the traffic flows for which health information is shown are unimpaired.

It is noted that the level of detail indicated in FIG. 11 may be extremely helpful in narrowing down the root causes of certain types of unexpected application behaviors. For example, consider the partial impairment of the network pathway between the GVM 1110B and the Internet endpoint "e.f.g.h". Since the traffic between GVM 1110A and "e.f.g.h" appears to be unimpaired, this would suggest "e.f.g.h" itself is healthy, and that the underlying problem causing the partial impairment may be associated with the portion of the pathway between GVM 1110B and "e.f.g.h" which is different from the pathway used for packets flowing between GVM 1110A and "e.f.g.h". In various embodiments, additional controls (such as the R-S or repair status buttons shown in FIG. 10, or the refresh control shown in FIG. 10) may also be included in finer granularity displays such as that shown in FIG. 11. In at least one embodiment, the network health management service may display separate state information for traffic in respective directions between endpoints—e.g., for some types of metrics such as packet drop rates, the health state for traffic flowing from endpoint E1 to endpoint E2 may differ from the health state for traffic flowing from endpoint E2 to endpoint E1. It is noted that even at the level of detail shown in FIG. 11, virtual representations of physical network links may be provided in at least some cases—e.g., the path between GVM 1110A and 1110B may actually include multiple physical links and/or multiple physical networking devices, all of which are represented collectively using a single arrow.

Figure 12:
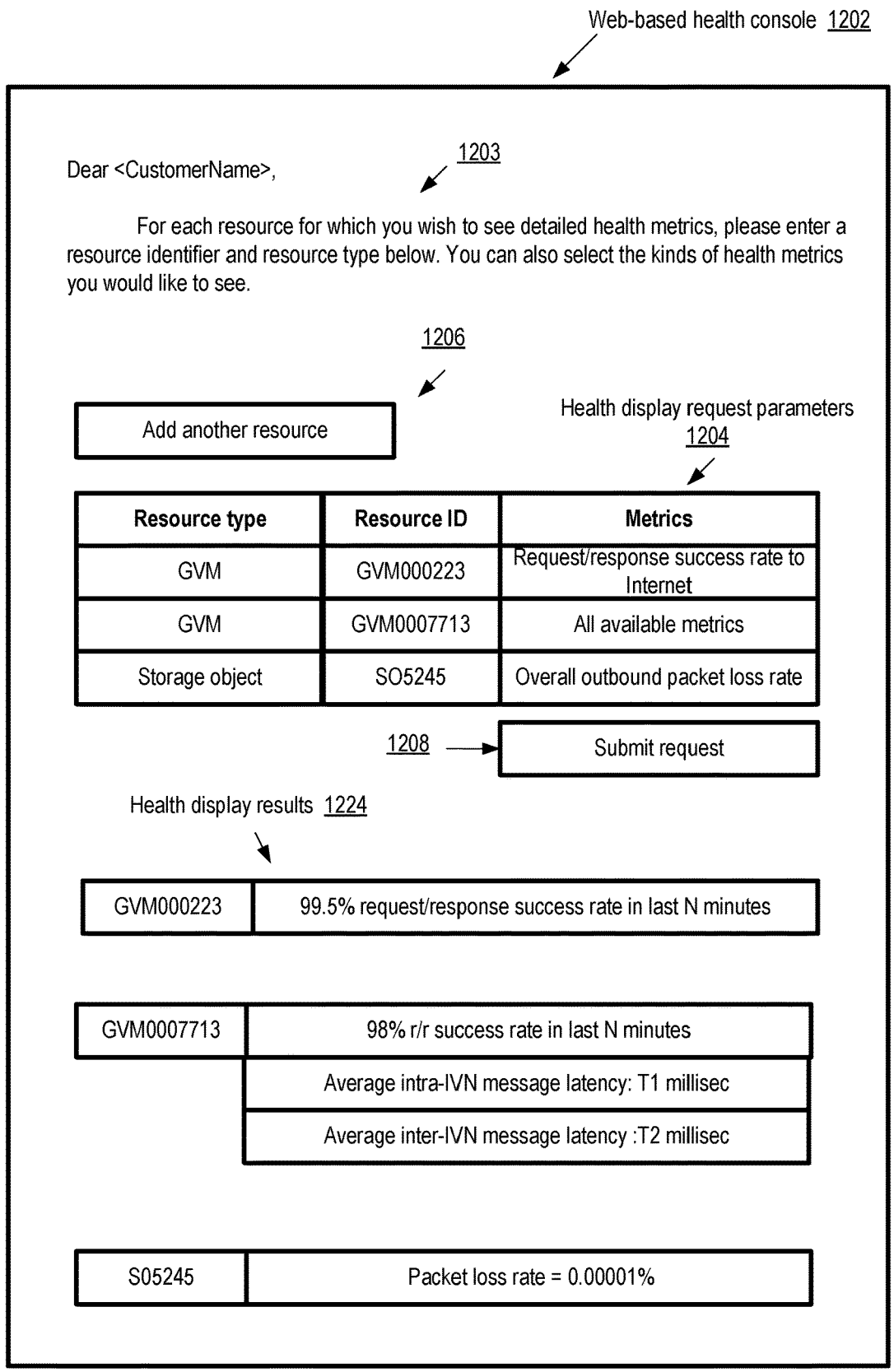
FIG. 12 illustrates an example web-based interface which may be used to specify health-related metrics to be displayed with respect to various resources allocated to a client, according to at least some embodiments.

In some embodiments, instead of using zoom controls, clients may be provided interfaces to name the resources for which they wish to view health state information, as well as the particular sets of health metrics to be shown. FIG. 12 illustrates an example graphical interface which may be used to specify health-related metrics to be displayed with respect to various resources allocated to a client, according to at least some embodiments. As shown, the web-based console 1202 may include a message area 1203, a region 1204 for indicating request parameters for health state information, and a results region 1224 in which responses to the requests may be shown.

In the depicted embodiment, the client may use button 1206 to add the name of a resource for which network health state information is to be displayed. A number of options for the resource type may be provided, e.g., via a drop-down menu in health display request parameter region 1204. Example resource types may include GVMs, storage objects, database instances and the like in various embodiments. The identifiers of the resources of the selected types may be supplied by clients in the "Resource ID" column of the health display request parameters region 1204. Corresponding to a given resource or resource type, options for the available health metrics may be provided via drop-down menu associated with the "Metrics" column in the depicted embodiment. After the client has indicated the specific resources and metrics for which health state information is to be displayed, the "submit request" button 1208 may be used to transmit the request to the network health management service in the depicted embodiment. The request may be translated into one or more API invocations in some embodiments, with a given API invocation including elements similar to those shown in FIG. 5.

In the health display results region 1224, the metrics requested may be displayed for each of the resources indicated in the request. For example, as shown, with respect to GVM with identifier "GVM000223", a request/response rate to the public Internet of 99.5% in the last 10 minutes is indicated. For GVM0007713, for which all available metrics were requested, the request response rate to the Internet, intra-IVN message latency and inter-IVM message latency may be shown. For the storage object with identifier SO5245, the outbound packet drop rate may be provided as requested. It is noted that in at least one embodiment, clients may be able to specify endpoint pair categories instead of, or in addition to, specific endpoints for which health state information is to be provided using interfaces similar to that shown in FIG. 12. In various embodiments, the kinds of information displayed graphically in the examples of FIG. 10, FIG. 11 and FIG. 12 may also be available in a non-graphical or text-based format from the network health management service. Generally speaking, the kinds of information that can be retrieved from the service may be independent of the interface used to retrieve the information in such embodiments—thus, any kind of network health-related information at any permitted granularity and frequency may be retrieved using any of the supported programmatic interfaces.

Example Tools for Obtaining Network Metrics

Figure 13:
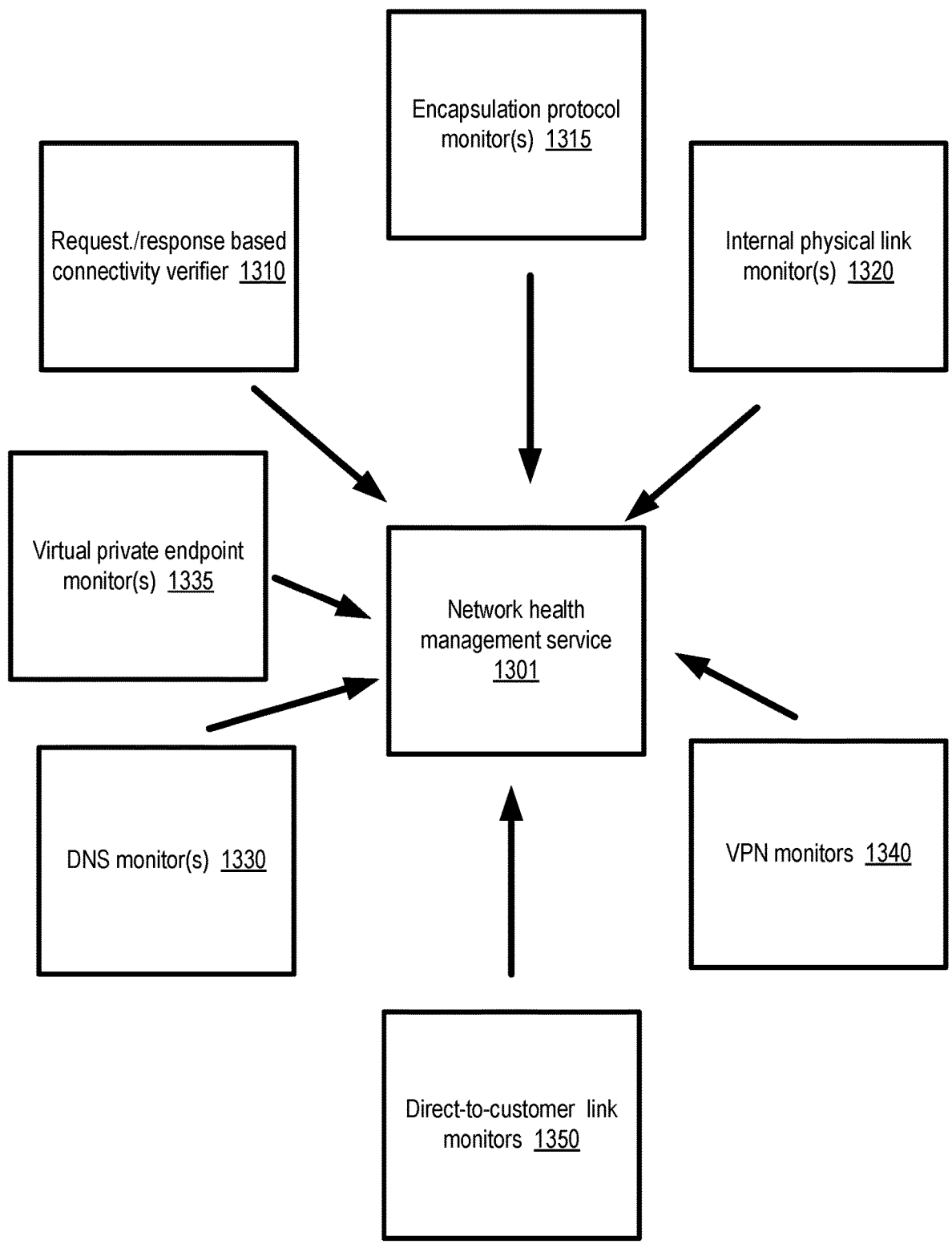
FIG. 13 illustrates examples of tools from which data may be collected at a network health management service, according to at least some embodiments.

As mentioned earlier, a number of different intermediary tools may be used to collect metrics for analysis and aggregation by the network health management service in some embodiments. FIG. 13 illustrates examples of tools from which data may be collected at a network health management service, according to at least some embodiments. Additional details regarding some of the tools and associated data sources are provided below, e.g., in the context of FIG. 14-FIG. 19.

The network health management service 1301 may obtain high-level connectivity information, e.g., based on request/response success rates associated with pairs of user-mode processes and/or privileged kernel-mode processes, using a connectivity verifier tool 1310 in the depicted embodiment. In at least some embodiments, a number of Domain Name System (DNS) servers may be utilized at or from a provider network, e.g., for facilitating communications between control-plane components of various services as well as for customer applications. One or more DNS monitor(s) 1330 may keep track of the state of the DNS traffic in various parts of the provider network—e.g., measuring the latency for responding to DNS requests, the success rate of DNS requests, and the like. A DNS failure may have a substantial negative impact on customer application communications. As such, the network health management service may be able to utilize the output of the DNS monitors 1330 for determining the health state of various endpoint pair categories. As mentioned earlier, in some embodiments one or more of the other services accessed from the VCS, such as a storage service, may allow service requests to be transmitted from the public Internet. In some such embodiments, special endpoints (called virtual private endpoints) may be established within the VCS which enable service requests to flow from the VCS to the other services (and responses to the service requests to be received) using provider network resources, without requiring packets representing the requests/responses to traverse the public Internet. Tools 1335 for monitoring the connectivity to such virtual private endpoints, and/or performance of traffic flows which utilize the virtual private endpoints may also provide metrics to the NHMS in the depicted embodiment.

A number of mechanisms may be made available to clients regarding secure network pathways between the virtualized computing service and customer premise networks (networks external to the provider network, e.g., at an office location or a data center owned/managed by the customer). Such mechanisms may include, for example, dedicated direct-to-customer physical links and/or virtual private networks (VPNs) in various embodiments; more details regarding these alternatives are provided below in the context of FIG. 16. Respective monitors 1350 and 1340 may be established for each of these connectivity mechanisms, and utilized by the network health management service 1301 in at least some embodiments.

In at least one embodiment, a number of monitors 1320 for various internal physical links of the provider network may be configured to provide metrics to the network health management service 1301. For example, hardware links connecting rooms within data centers, or connecting pairs of data centers, may be monitored at a high priority as part of the infrastructure maintenance functions of the provider network. In some embodiments, as discussed below in further detail, an encapsulation protocol may be used to manage network traffic for guest virtual machines, and monitoring tools 1315 associated with the encapsulation protocol may be configured to provide input to the network health management service. In at least some embodiments, each of the various monitors and tools shown in FIG. 13 may run respective sets of tests on their targeted resources or protocols, e.g., at respective intervals selected by the tools, and generate metrics in respective different formats. The network health management service 1301 may be responsible for collecting and correlating the independently-generated metrics, resolving any ambiguities or conflicts, mapping the metrics to endpoint pair categories relevant to different customers, and providing easy-to-understand customized health state information relevant to the individual customers. In at least one embodiment, tools similar to those shown in FIG. 13 may be implemented as subcomponents of the network health management service itself—for example, connectivity verification using request/response tests may be performed by agents of the network health management service.

Connectivity Verifier Tool Implementations

Figure 14:
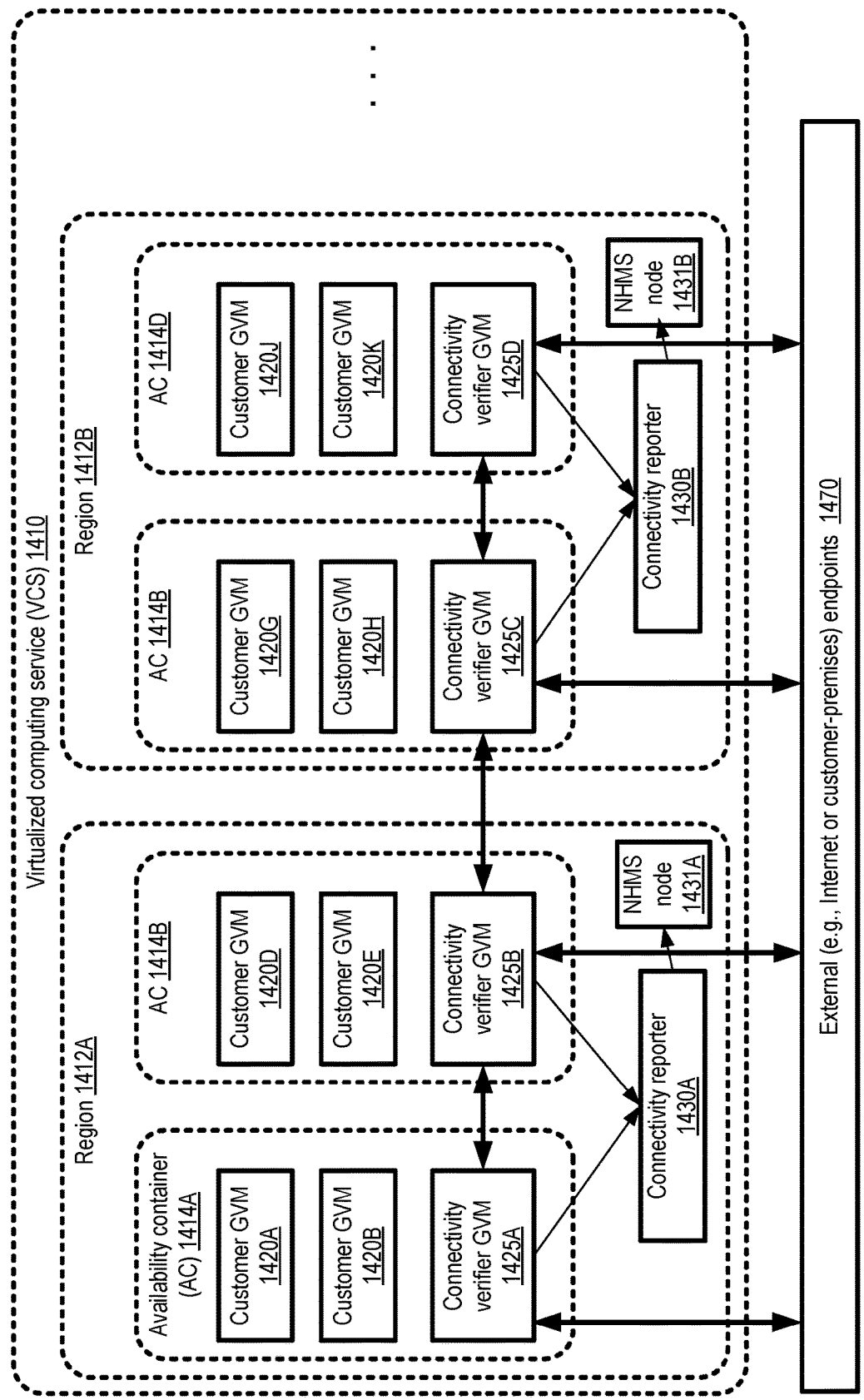
FIG. 14 illustrates examples of guest virtual machines which may be established as part of a connectivity verifier tool whose output is used by a network health management service, according to at least some embodiments.

A number of approaches may be used to implement a connectivity verifier tool associated with one or more services of a provider network in various embodiments. FIG. 14 illustrates examples of guest virtual machines which may be established as part of a connectivity verifier tool whose output is used by a network health management service, according to at least some embodiments. As shown, availability containers 1414A-1414D of a virtualized computing service 1410 may each comprise numerous customer guest virtual machines (GVMs) 1420 (i.e., GVMs used for running customer applications). For example, availability container 1414A of region 1412A may comprise customer GVMs 1420A and 1420B, availability container 1414B of region 1412A may comprise customer GVMs 1420D and 1420E, availability container 1414C of region 1412B may comprise customer GVMs 1420G and 1420H, and availability container 1414D of region 1412B may comprise customer GVMs 1420J and 1420K.

In addition to the customer GVMs, one or more connectivity verifier GVMs 1425 may be established in each availability container 1414, such as connectivity verifier GVM 1425A in availability container 1414A, 1425B in availability container 1414B, 1425C in availability container 1414C, and 1425D in availability container 1414D. In contrast to the customer GVMs 1420 which may be used primarily for running customer applications, each of the connectivity verifier GVMs may be tasked primarily with running connectivity tests involving sending messages to (and receiving responses from) a set of designated endpoints. For example, a list of network addresses of peer connectivity verification GVMs and/or one or more external endpoints 1470 may be provided to each connectivity verification GVM 1425 in the depicted embodiment, with an indication of (a) the respective rate at which request messages should be sent to the various addresses and (b) properties of the messages (e.g., message size, networking protocol, request content, acceptable response content, etc.). In accordance with the addresses and instructions received, for example, each connectivity verifier GVM may send a respective 200-byte payload request message to each of 100 destinations per minute, and track the number of responses received, the latency of the request/response round trip, etc. Similarly, when a connectivity request message is received from another GVM, a corresponding response may be transmitted to the requester by a connectivity verifier GVM. Any of a variety of protocols may be used in different embodiments for the request/response communications, such as variants of HTTP (HyperText Transfer Protocol), ICMP (Internet Control Message Protocol), and the like.

In the depicted embodiment, the request/response success rate (e.g., the fraction of requests for which corresponding results were received within a specified interval) and/or other metrics may be provided by each connectivity verifier GVM 1425 to a connectivity reporter 1430 in its region 1412 (such as connectivity reporter 1430A in region 1412A and connectivity reporter 1430B in region 1412B). The network traffic characteristics (packet loss rate, latency, etc.) between the connectivity verifier GVMs may be considered reasonable approximations of the network traffic characteristics that would be observed by the customer GVMs for similar destinations. The connectivity verifier tool may comprise the reporters 1430 and the special GVMs 1414 in the depicted embodiment. Network health management service (NHMS) nodes 1431, such as NHMS node 1431A and 1431B may collect connectivity metrics from the reporters 1430, and generate network health state information based at least partly on the connectivity metrics in the depicted embodiment.

Figure 15:
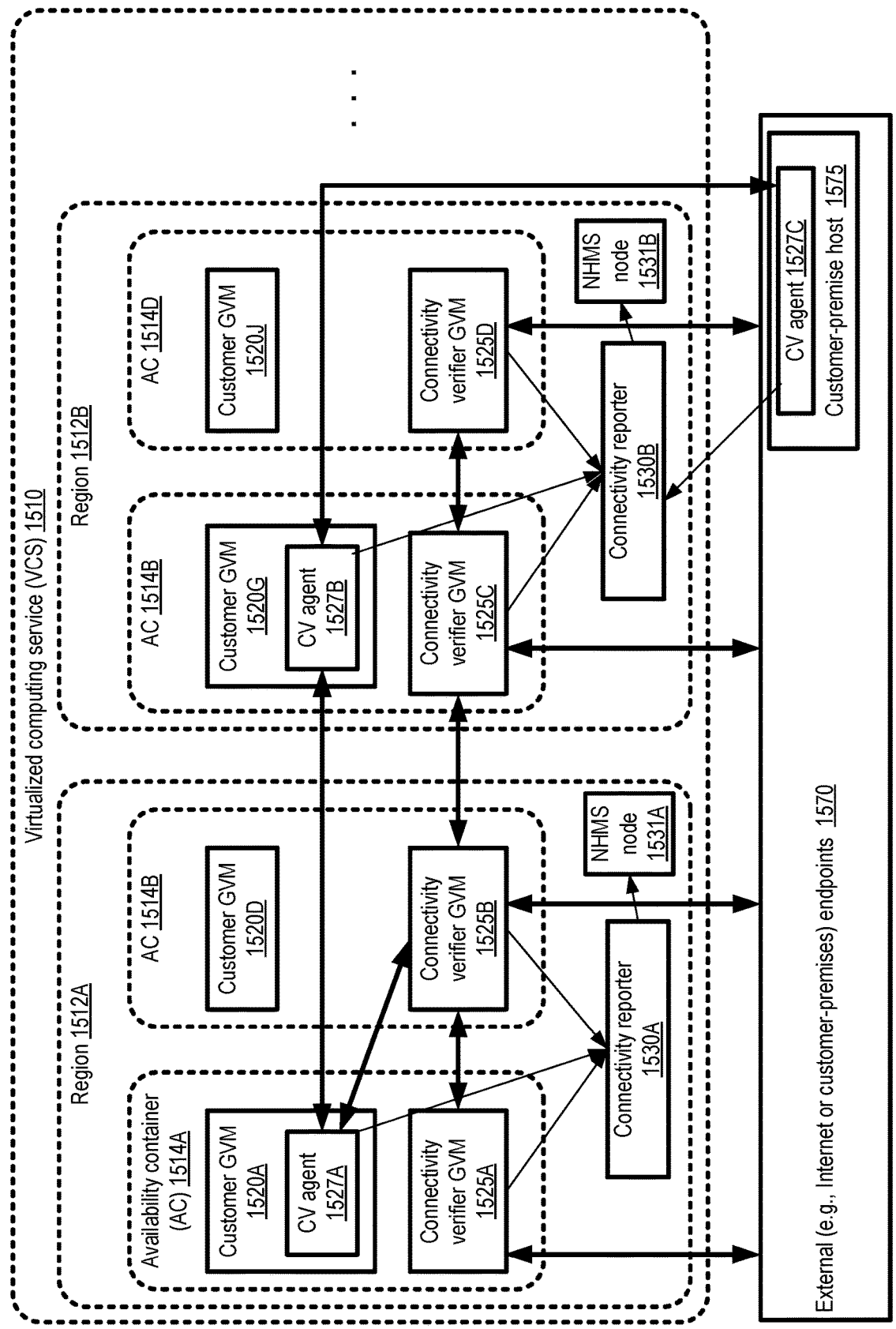
FIG. 15 illustrates examples of connectivity verifier agents which may be installed at customer guest virtual machines and at customer premises for use by a network health management service, according to at least some embodiments.

In at least one embodiment, an installable agent module for connectivity verification may be made available by the connectivity verifier tool and/or the network health management service. FIG. 15 illustrates examples of connectivity verifier agents which may be installed at customer guest virtual machines and at customer premises for use by a network health management service, according to at least some embodiments. In the depicted embodiment, request/response message tests of the kind discussed above may be executed not just by connectivity verifier GVMs 1525 (e.g., 1525A-1525D), but also by the connectivity verifier (CV) agent modules or processes 1527 (e.g., agents 1527A, 1527B and 1527C). Some CV agents may be installed or activated at customer GVMs (such as CV agent 1527A at customer GVM 1520A, CV agent 1527B at customer GVM 1520G) within the virtualized computing service, while other CV agents (such as agent 1527C) may be activated at customer-premise hosts 1575.

In various embodiments, the connectivity verifier agents may be configurable—e.g., clients may decide various attributes of the tests which should be run by each agent, the manner in which the results should be provided from the agents (e.g., to connectivity reporters such as 1530A or 1530B, or directly to NHMS nodes such as 1531A or 1531B). Some clients may wish to install CV agents at selected important subsets of their resources for which obtaining specific and detailed network health state information is considered a high-priority; other clients may install CV agents on all their resources. In at least one embodiment, the input received from CV agents may be used to detect and/or diagnose network problems at customer premises by the network health management service. As shown, CV agent 1527C may provide metrics to connectivity reporter 1530B, which may be analyzed by NHMS node 1531B to determine the state of the customer-premises network in which host 1575 is configured. It is noted that although region-level aggregation of connectivity verification data is shown in FIG. 14 and FIG. 15, input from the connectivity verifier GVMs and/or agents may be collected at various levels of the resource hierarchy in different embodiments. In some embodiments, CV agents may be utilized, but dedicated connectivity verifier GVMs may not necessarily be instantiated; instead, CV agents may be started up as respective processes or threads at customer GVMs. The connectivity verifier GVMs, installable agents, and connectivity reporters shown in FIG. 14 and FIG. 15 may be referred to collectively herein as nodes of the connectivity verifier tool. As mentioned earlier, the connectivity verifier tool may be implemented as part of the network health management service in some embodiments.

Secure Network Paths to Customer Premises

Figure 16:
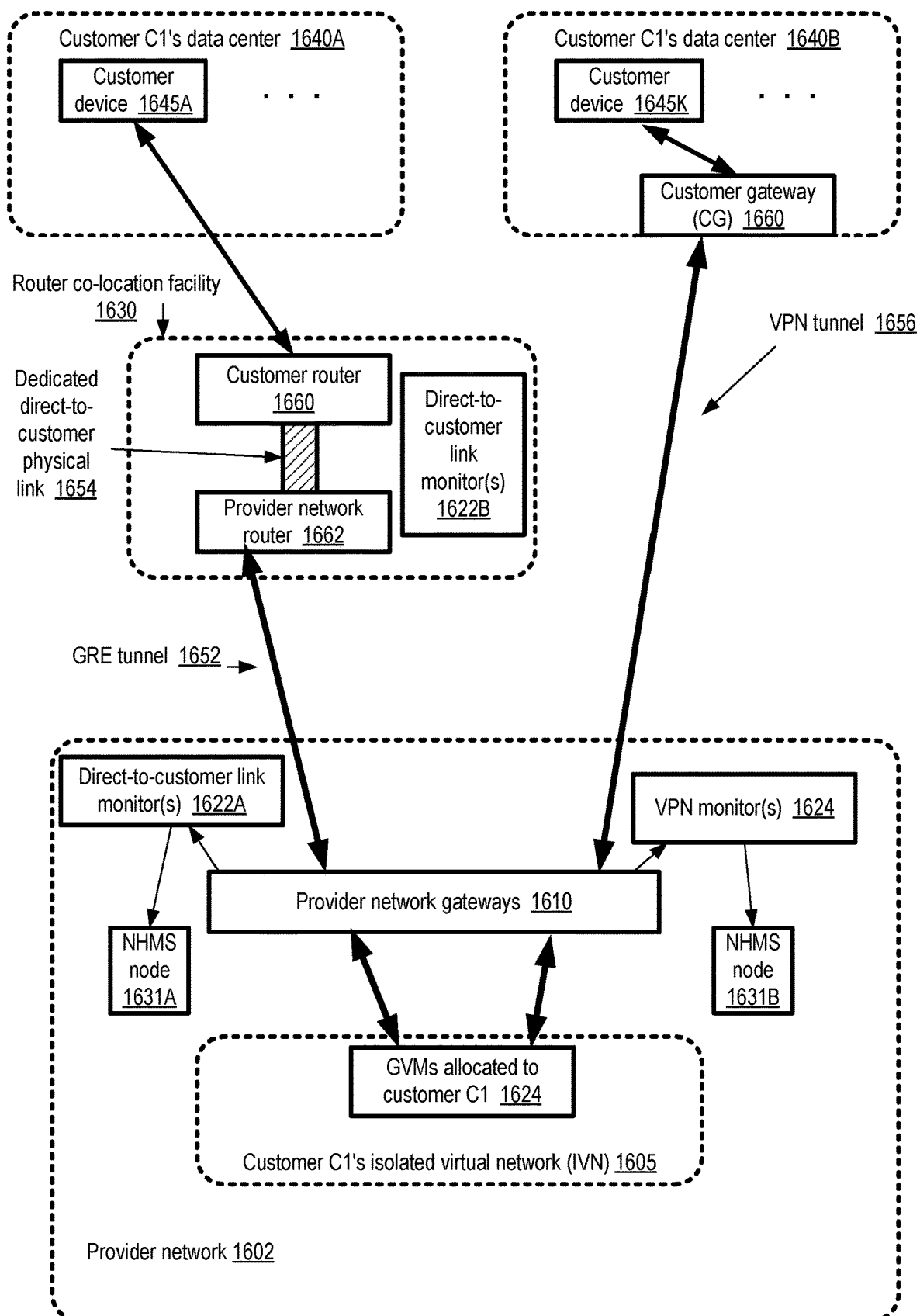
FIG. 16 illustrates examples of network pathways to customer data centers, with respect to which metrics may be obtained by a network health management service, according to at least some embodiments.

FIG. 16 illustrates examples of network pathways to customer data centers, with respect to which metrics may be obtained by a network health management service, according to at least some embodiments. As shown, provider network 1602 may comprise an isolated virtual network (IVN) 1605 established on behalf of a particular customer C1. C1 may also have computing devices at a number of data centers outside the provider network, such as device 1645A at data center 1640A and device 1645B at data center 1640B in the depicted embodiment. Secure network connectivity between the GVMs 1624 (set up on behalf of customer C1 in the provider network) and the external devices 1645 may be established using virtual private networks (VPNs) and/or dedicated direct-to-customer physical links in the depicted embodiment.

A direct physical link 1654 may be established at customer C1's request between a customer router 1660 and a provider network router 1662 at a router co-location facility 1630 or transit center. Such dedicated physical links may be referred to as "direct connect" links in some environments, and may provide bandwidth that does not have to be shared by other customers. In one embodiment, for example, a customer may opt to configure either a 10 Gbps (Gigabits per second) dedicated direct-to-customer link or a 1 Gbps dedicated direct-to-customer link between an external data center and the provider network. Any of a variety of protocols may be used for the traffic flowing over the direct-to-customer links in various embodiments—for example, in the scenario depicted in FIG. 16, a Generic Routing Encapsulation (GRE) protocol tunnel 1652 may be established.

For some customer applications, the dedicated bandwidth associated with direct-to-customer links may not be required, and a VPN tunnel such as tunnel 1656 may be established between a customer gateway and a provider network gateway 1610. A variety of different protocols may be used for the VPN tunnel in different embodiments, such as SSL/TLS (Secure Sockets Layer/Transport Layer Security), DTLS (Datagram Transport Layer Security), a combination of IKE (Internet Key Exchange) and IPSec (Internet Protocol Security), and so on. The provider network gateways 1610 may be implemented using a variety of approaches in different embodiments—e.g., using a collection of protocol processing engines running at GVMs, using custom hardware devices, and so on.

In the depicted embodiment, metrics related to the health of the direct-to-customer links may be collected by monitors 1622A and 1622B and passed on to network health monitoring service nodes such as node 1631A for analysis and aggregation with metrics obtained from other sources. Monitors 1622A and/or 1622B may, for example, run a variety of tests over the direct-to-customer link 1654. Similarly, metrics pertaining to the virtual private network connection between the provider network and data center 1640B may be obtained by VPN monitors 1624 by running a different set of tests which utilize tunnel 1656, and the VPN metrics may be passed on for analysis and aggregation to NHMS node 1631B. In some embodiments, the NHMS nodes may comprise logic to parse and interpret metrics corresponding to the various protocols used for connectivity between customer networks and the provider network, such as GRE, IKE, TLS/SSL, IPSec etc. It is noted that some customers of the provider network may not utilize direct-to-customer links or VPNs, and part of the responsibility of the NHMS may include determining whether VPN-related or direct-to-customer link-related network state information is relevant for a given customer. It is noted that the term "customer data center" may be used synonymously with the terms "customer-owned data center" or "customer-managed data center" herein, and may refer to premise that are managed, owned or run at least in part by entities other than the provider network operator. Similarly, the term "customer device" may be used to refer to customer-owned or customer-managed devices (such as the router 1660).

Packet Tracking at Encapsulation Protocol Layer

Figure 17:
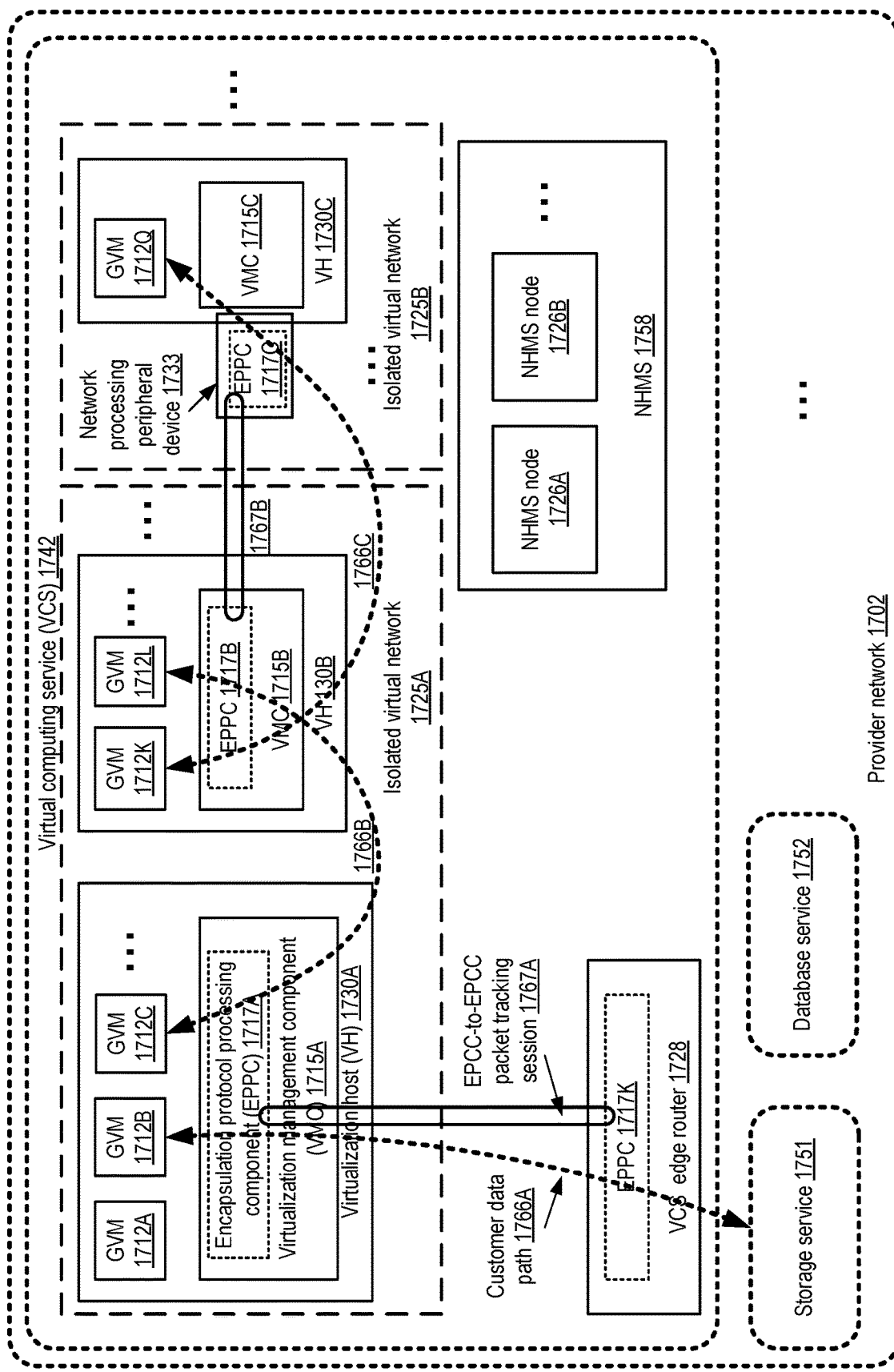
FIG. 17 illustrates an example system environment in which data collected from network packet tracking sessions associated with an encapsulation protocol may be utilized by a network health monitoring service, according to at least some embodiments.

FIG. 17 illustrates an example system environment in which data collected from network packet tracking sessions associated with an encapsulation protocol may be utilized by a network health monitoring service, according to at least some embodiments. In the depicted system, a number of services including virtual computing service (VCS) 1742, storage service 1752 and database service 1762 are implemented at a provider network 1702. As discussed earlier, at least some resources of the VCS such as virtualization hosts (VHs) 1730A, 1730B and 1730C may be distributed among one or more isolated virtual networks (IVNs) such as IVNs 1725A and 1725B established at the request of VCS clients.

In the embodiment shown in FIG. 17, IVN 1725A comprises a plurality of virtualization hosts 1730, including VH 1730A and VH 1730B, while IVN 1725B comprises VH 1730C. Each VH 1730 may include respective virtualization management components (VMCs) 1715, such as VMCs 1715A, 1715B and 1715C. As discussed earlier, a VMC may comprise, for example, a hypervisor, and/or an instance of an operating system running in an administrative domain (sometimes referred to as "dom-0"). In some embodiments, or more hardware cards which may perform a subset of virtualization management functions, such as network processing peripheral card 1733, may also be considered VMCs. Each VH 1730 may be used to instantiate zero or more GVMs 1712 at a given point in time in the depicted embodiment. VH 1730A, for example, is shown with three GVMs 1712A, 1712B and 1712C; VH 1730B has GVMs 1712K and 1712L, while GVM 1712Q is instantiated at VH 1730C. In addition to the virtualization hosts 1730, a VCS 1742 may also contain various other components including edge routers 1728 and nodes 1726 (e.g., 1726A and 1726B)

of a network health management service 1758 in the depicted embodiment. It is noted that in some embodiments, at least some NHMS nodes 1726 may be set up outside the VCS 1742.

In order to facilitate traffic between GVMs 1712 instantiated at different virtualization hosts 1730 (and between the GVMs 1712 and entities outside the VCS 1742, such as various network endpoints of services 1751 or 1752, as well as endpoints outside the provider network 1702), an encapsulation protocol may be implemented at various devices of the VCS 1742. Software and/or hardware components responsible for implementing the encapsulation protocol, labeled encapsulation protocol processing components (EPPCs) 1717, are shown incorporated within VMCs 1715 (including within network processing peripheral device 1733), and within edge router 128 in system 100. For example, VMC 1715A of VH 1730A includes EPPC 1717A, VMC 1715B includes EPPC 1717B, network processing peripheral device 1733 includes EPPC 1717C, and edge router 1728 includes EPPC 1717K. A virtualization host such as VH 1730C may be equipped with a network processing peripheral device 1733 in some embodiments so that, for example, some of the computing workload associated with implementing one or more network protocols (such as the encapsulation protocol itself and/or the underlying Transmission Control Protocol (TCP), User Datagram Protocol (UDP) or Internet Protocol (IP)) can be offloaded from the main CPUs or cores of the virtualization host. In some embodiments, the network processing peripheral device may be attached via the Peripheral Component Interconnect Express (PCI-Express) bus or another similar bus. In one embodiment, a customized or enhanced network interface card may serve as the network processing peripheral device for some virtualization hosts. In embodiments in which network processing peripheral devices are used at one or more virtualization hosts, some of the networking-related responsibilities of the hypervisor and/or administrative domain operating system which constitute the VMCs of the hosts may be delegated or offloaded to the peripheral devices, and as a result more of the processing capabilities of the CPUs/cores of the hosts may become available for guest virtual machines.

According to the encapsulation protocol, a message generated at an application process executing at a particular GVM (e.g., GVM 1712C) of a particular virtualization host (e.g., VH 1730A) and directed to an application process at a different GVM (e.g., GVM 1712L) at a different virtualization host (e.g., VH 1730B) may be included in an outbound baseline packet OBP1 at the networking software stack of the source GVM 1712C. The dashed arrow labeled 1766B indicates that customer data (i.e., messages generated at the application level) is being transmitted between GVM 1712C and GVM 1712L in the example scenario illustrated in FIG. 17. The term "baseline" is used herein to refer to the packets generated at or received by the networking software stacks of various GVMs, as opposed to the typically larger "encapsulation" packets described below, which are generated by the EPPCs 1717. (In some cases, of course, a message may be large enough to require multiple baseline packets, in which case each of the multiple baseline packets may be encapsulated similarly.) Assuming that an IP-based networking protocol is used for GVM-to-GVM communication, the outbound baseline packet OBP1 may indicate an IP address GVMAddr1 assigned to GVM 1712C as the source IP address, and an IP address GVMAddr2 assigned to GVM 1712L as the destination address. In various embodiments, the IP address assigned to a GVM (or, more specifically, to a virtual network interface associated with the GVM) may typically differ from the IP address assigned to the virtualization host at which that GVM runs. For example, VH 1730A may have an address VHAddr1 assigned to it, and VH 1730B may have address VHAddr2 assigned to it. In order to route GVM-to-GVM packets correctly, network mappings indicating the relationship between GVMs and virtualization hosts, as well as route tables set up for the IVNs 1725 may be used, e.g., as part of the encapsulation protocol.

In the example where the outbound baseline packet OBP1 is created at GVM 1712C of VH 1730A, the virtualization management component VMC 1715A of VH 1730A may intercept OBP1, and a corresponding outbound encapsulation packet OEP1 may be prepared by EPPC 1717A. OEP1 may include one or more headers defined by the encapsulation protocol, for example, and the body of OEP1 may include OBP1. In at least some embodiments, OEP1 may indicate host address VHAddr1 as a source address, and VHAddr2 (or some intermediary address on a route towards VH2) as a destination address. OEP1 may be transmitted using VH 1730A's physical network interface card (NIC) on its path towards VH 1730B. When OEP1 reaches VH 1730B, EPPC 1717B of the VMC 1715B may examine its contents, and the baseline packet contained in OEP1 may be provided to GVM 1712L. A similar encapsulation technique may be employed for inbound packets with respect to a given GVM 1712 (e.g., a baseline packet generated at GVM 1712L may be incorporated within an encapsulation packet generated by EPPC 1717B of VMC 1715B, received and validated at EPPC 1717A of VMC 1715A, extracted and passed on to GVM 1712C).

In the scenario depicted in FIG. 17, customer data traffic (e.g., encapsulation packets containing baseline packets generated at GVMs 1712, or directed to GVMs 1712) flows between GVMs 1712C and 1712L, GVMs 1712K and 1712Q, and GVM 1712B and service storage service 1751 via edge router 1728, as indicated by arrows 1766B, 1766C and 1766A respectively. In general, customer traffic may flow between any two GVMs, or between any given GVM and devices external to the VCS 1742. Corresponding to at least some pairs of such communicating endpoints, respective packet tracking sessions 1767 may be established between the EPPCs involved. For example, packet tracking session 1767A has been established between EPPC 1717A of VH 1730A and EPPC 1717K of edge router 1728, and packet tracking session 1767B has been established between EPPC 1717B of VH 1730B and EPPC 1717C of VH 1730C. Each session 1767 may be established at the request of one of the EPPCs of the pair of EPPCs participating in the session. The EPPC requesting the session may be referred to as the "transmitter" or "TX" EPPC of the session, while the EPPC accepting the session establishment request may be referred to as the "receiver" or "RX" EPPC of the session.

Any of a number of criteria may be used to determine if and when a given EPPC should attempt to establish (as the TX EPPC) a packet tracking session, and the particular peer EPPC which should be selected as the potential RX EPPC of the session. For example, each EPPC may have a fixed-size pool of tracking resources (e.g., units of memory) in some embodiments, such that a selected subset of resources of the pool has to be reserved for any given session. An EPPC may attempt to establish a new packet tracking session, for example, if a tracking resource of the pool has recently been freed as result of a termination of another packet tracking session, or based on other criteria such as the reception of a network health state request at the NHMS. The peer EPPC which is to assume the role of RX EPPC may also be selected based on any combination of several criteria, such as the length of a time interval during which at least some encapsulation packets have been transmitted per minute or second between the TX EPPC and the proposed RX EPPC, the number of encapsulation packets which have been transmitted between the two EPPCs, the number of bytes which have been transmitted between the two EPPCs during a particular time interval, or the length of a time interval elapsed since a previous session between the two EPPCs ended. Not all communicating EPPC pairs may have corresponding tracking sessions established at a given point in time; for example, no session is shown for the EPPC pair (EPPCs 1717A and 1717B) corresponding to customer data path 1766B. Depending on the communication needs of the applications which are being run at the virtualization hosts of the VCS, and the constraints on tracking resources available at the EPPCs, it may sometimes be the case that packet tracking sessions can be set up for only a fraction of the communicating EPPC pairs of the VCS at a given point in time. For example, a given EPPC may be transmitting encapsulation packets to hundreds of destinations, but may be limited to participating in eight or sixteen tracking sessions at a time.

The session-initiating or TX EPPC may transmit an encapsulation packet to the proposed RX EPPC as part of a handshake procedure in the depicted embodiment, using one or more encapsulation headers or encoded bit sequences to request the participation of the RX EPPC in the session. After the session is established, the TX EPPC may tag some or all of the encapsulation packets (which contain embedded baseline packets) as packets to be tracked. A number of metrics may be maintained regarding the tracked packets at the RX EPPC and/or at the TX EPPC, such as the total number of packets sent, the total amount of data sent, the number of dropped or corrupted packets received, the number of out-of-order packets received, the latency associated with a particular route used for the packets relative to other routes, etc. Periodically, or in response to triggering conditions, the TX EPPC of a session 1767 may request that the metrics collected thus far at the RX EPPC be transmitted back to the TX EPPC. The TX EPPC may send the network metrics obtained from the RX EPPC to one or more of the nodes 1726 of the NHMS 1758 in the depicted embodiment. The scheduling of the network health update messages may be based on various parameters in different embodiments: e.g., one update message may be sent per set of metrics received from the RX EPPC, or update messages may be sent based on a preliminary analysis of the metrics obtained from the RX EPPC, or update messages may be sent in response to requests from the NHMS 1758. The contents of the update messages sent by a given EPPC 1717 may be analyzed at the NHMS 1758 to generate network health state information for various endpoint pair categories (or for specific pairs of endpoints) as discussed earlier.

In various embodiments, some or all of the messages exchanged between EPPCs to set up, terminate, or change the parameters of network packet tracking sessions and/or for reporting of collected metrics may themselves be contained in encapsulation protocol headers. In some embodiments, encapsulation packets used for such administrative operations may not necessarily contain baseline packets generated by or for the GVMS 1712. Thus, some session management messages may be piggybacked onto encapsulation packets which also carry customer data (baseline packets), while other session management messages may not contain baseline packets. The tracked packets (the ones for which metrics such as corrupted packet counts or dropped packet counts are collected) may typically contain baseline packets containing customer data. At least some communications between the EPPCs and the NHMS may also be implemented using packets formatted according to the encapsulation protocol in various embodiments. By tracking encapsulation packets used for customer data, a more representative measure of the performance being experienced by client applications of the VCS may be obtained than may have been possible if health monitoring agents that use heartbeat messages or pings were the only source of network health information.

Figure 18:
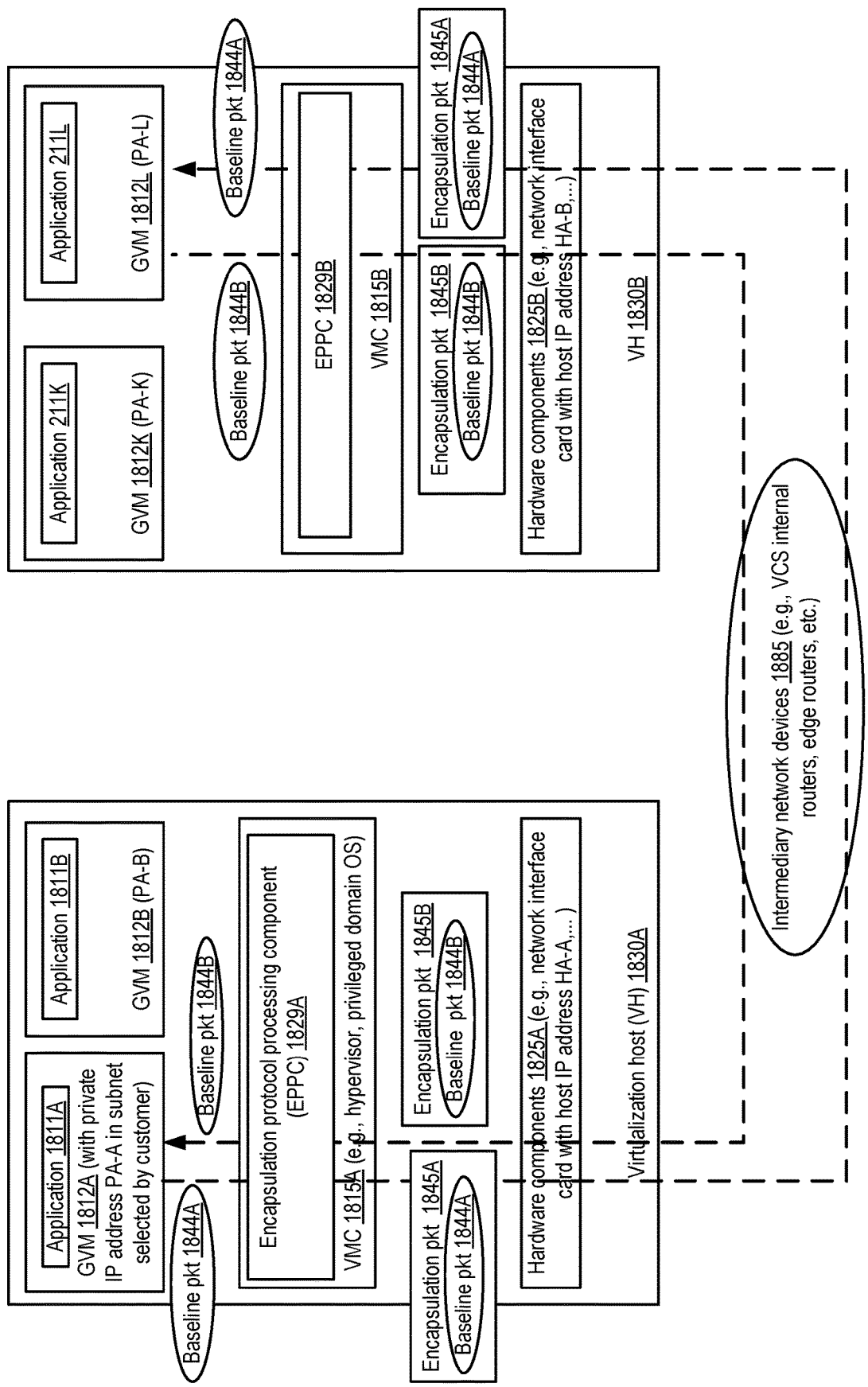
FIG. 18 provides an overview of network packet flow using encapsulation between virtual machines instantiated at different virtualization hosts, according to at least some embodiments.

FIG. 18 provides an overview of network packet flow using encapsulation between virtual machines instantiated at different virtualization hosts, according to at least some embodiments. Two virtualization hosts VH 1830A and VH 1830B of a virtual computing service (VCS) are shown. Both of the VHs 1830 may be used for GVMs of the same isolated virtual network (IVN) in the depicted example, although similar packet flow paths may be used even if the two VHs are used at different IVNs, or if IVNs are not used at all. Each virtualization host may comprise one or more guest virtual machines, such as GVMs 1812A and 1812B at VH 1830A, and GVMs 1812K and 1812L at VH 1830B. In the depicted embodiment, each GVM 1812 may be assigned at least one private IP address (such as PA-A, PA-B, PA-K or PA-L for GVMs 1812A, 1812B, 1812K and 1812L respectively), e.g., from the range of addresses of a subnet previously set up by the customer on whose behalf the IVN containing the GVM is established. For example, if the IP address range (expressed in Classless Inter-Domain Routing or CIDR format) 10.0.0.0/16 is designated for the IVN, and GVMs 1812A and 1812B are set up in a subnet 10.0.1.0/24, then GVM 1812A and 1812B may each be assigned a different address in the range 10.0.1.0-10.0.1.255. The addresses may be designated as "private" in the depicted embodiment because they are not (at least by default) advertised outside the IVN. It is noted that at least in some embodiments, a private IP address (as the term is used in this document) may not necessarily be compliant with some or all of the IETF (Internet Engineering Task Force) standards pertaining to address allocation for private networks, such as RFC (Requests for Comments) 1918 (for IP version 4) or RFC 4193 (for IP version 6).

Each GVM 1812 may comprise one or more application processes 1811 in the depicted embodiment, such as applications 1811A, 1811B, 1811K or 1811L. A given application such as 1811A may generate messages to be sent to other applications, such as 1811L. Such an application message may be incorporated within one or more baseline network packets (such as packet 1844A, in the case of application 1811A) prepared by the networking software stack of the operating system at the GVM where the application runs. The baseline packet may, for example, indicate the private address of the sending GVM (e.g., PA-A) as the source IP address, and the private address of the intended recipient GVM (e.g., PA-L) as the destination IP address. The baseline packet may be transmitted by the low level components of the GVM's networking software stack via a virtual network interface associated with the GVM. The VMC 1815 at the virtualization host where the GVM runs (e.g., VMC 1815A, which may comprise a hypervisor and/or an administrative domain operating system), which acts as the intermediary between the GVM and hardware components 1825A, may intercept such a baseline packet 1844A. The EPPC 1829A of VMC 1815A may include the contents of the baseline packet within an encapsulation packet 1845A. As discussed earlier, an encapsulation protocol may be employed in the VCS because the addresses of the GVMs may have to be mapped to the addresses of the virtualization hosts at which the GVMs are instantiated for the transmission of the packets along the routes needed to reach their destinations. For example, VH 1830A has a network interface card with host IP address HA-A, and VH 1830B has a network interface card with host IP address HA-B, while the respective GVMs established at the hosts 1830 have different IP addresses from the range selected by the customer. The VMC 1815A may determine the route over which the encapsulation packet 1845A should be sent using route tables of the IVN, network mappings and/or other VCS networking configuration metadata (which may comprise identifiers/addresses of gateways and other devices, etc.). The encapsulation packet 1845A may indicate VH 1830A's host IP address HA-A as the source, and the targeted VH 1830B's host IP address HA-B as the destination (although in some cases the destination address indicated in the encapsulation packet may be an address assigned to an intermediary device at which the address of VH 1830B may be available). The encapsulation packet 1845A may be transmitted along the appropriate route towards VH 230B, e.g., a route which may include various intermediary devices 1885 such as routers, tunneling devices, etc.

The encapsulation packet 1845A may eventually be received at the network interface card (one of the hardware components 1825B) of virtualization host 1830B. The encapsulation packet 1845A may be processed by the EPPC 1829B of VMC 1815B. EPPC 1829B may unpack the contents of the encapsulation packet 1845A. The original baseline packet 1844A extracted from encapsulation packet 1845A may be passed on to the GVM 1812L at which the destination application 1811L runs. Packets generated at the application 1811L and intended for application 1811A may follow the reverse path to that used for baseline packet 1844A. For example, a baseline packet 1844B (generated at GVM 1812L) with a source IP address PA-L and destination IP address PA-A may be intercepted and encapsulated by EPPC 1829B, and a corresponding encapsulation packet 1845B may be prepared and transmitted using intermediary devices 1885. That encapsulation packet 1845B, with a HA-B as its source address and HA-A (or an intermediary device address) as its destination address, may eventually reach VH 1830A. At VH 1830A, EPPC 1829A of VMC 1815A may extract baseline packet 1844B from encapsulation packet 1845B and transfer it to GVM 1812A. A number of different encapsulation protocol header values or bit sequences may be set by the EPPCs 1829 for establishing packet tracking sessions, tracking packets during the sessions, obtaining metrics at a TX EPPC of a session from the RX EPPC for the session, and so on. As mentioned earlier, in some embodiments at least a portion of the EPPC functionality discussed in the context of FIG. 18 may be implemented or executed at peripheral networking processing devices of the virtualization hosts, e.g., instead of being implemented within a hypervisor or administrative domain operating system.

Figure 19:
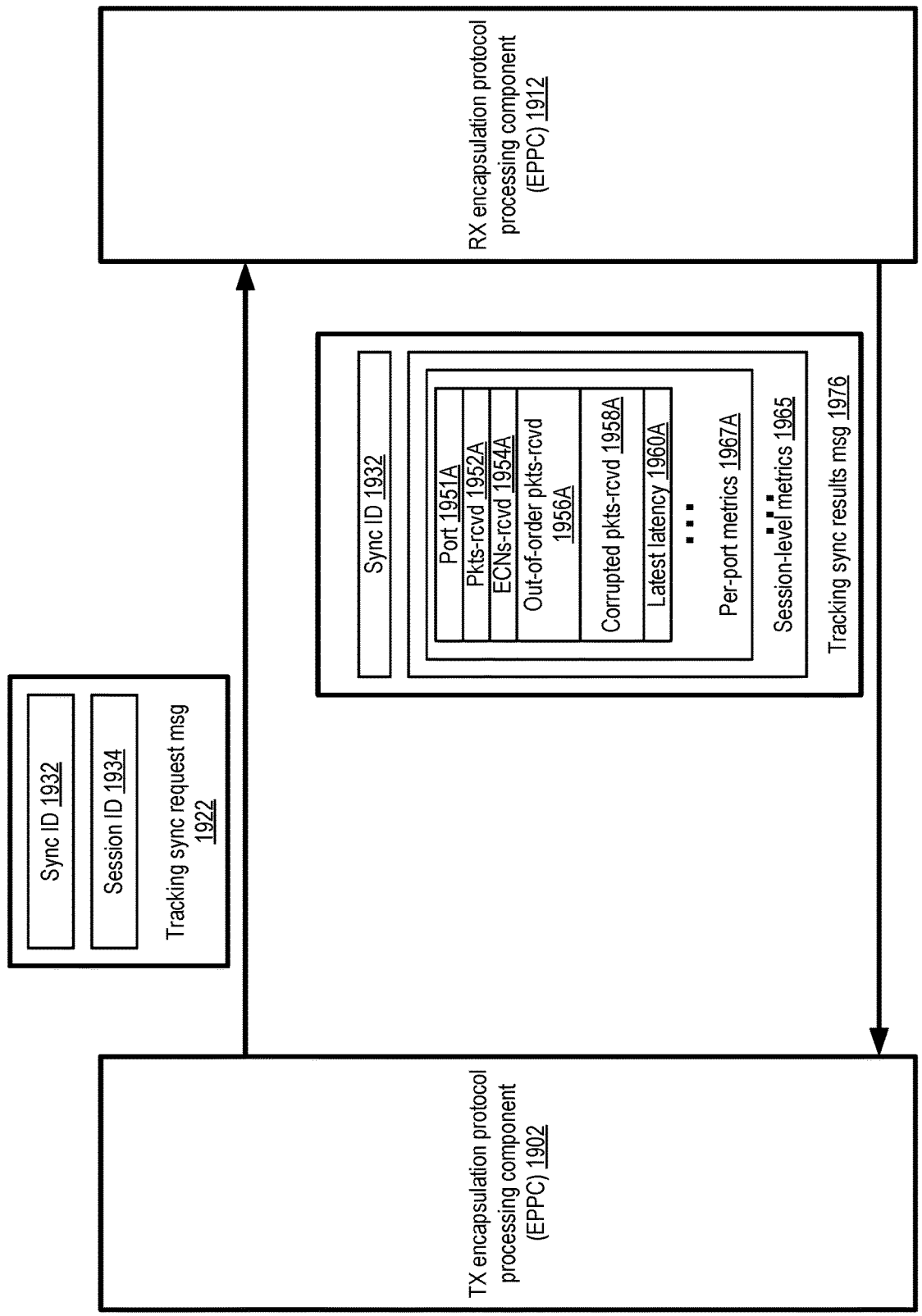
FIG. 19 illustrates example metrics which may be obtained with respect to a network packet tracking session, according to at least some embodiments.

FIG. 19 illustrates example metrics which may be obtained with respect to a network packet tracking session, according to at least some embodiments. The TX EPPC 1902 of the session may transmit a tracking synchronization request message 1922 which includes a session ID 1934 (indicating the session for which metrics collected at the RX EPPC are being requested), and a synchronization identifier 1932 which is used to match tracking synchronization requests with their respective responses. Such tracking synchronization request messages may be sent one or more times during a packet tracking session. The TX EPPC may determine when to send a tracking synchronization message 1922 based on various criteria in different embodiments—e.g., at regular time intervals such as once every T seconds, after a particular number of packets or number of bytes have been sent to the RX EPPC since the previous tracking synchronization message was sent, in response to a request received from the network health management service to report tracking results, etc.

In response to receiving the tracking synchronization request message 1922, the RX EPPC 1912 may first verify that the session ID 1934 in the message corresponds to a session for which the RX EPPC has been collecting metrics. If the session ID does not match a tracked session, a tracking error message may be sent to the TX EPPC. If the session ID is validated, the RX EPPC may prepare a tracking synchronization results message 1976 and transmit it to the TX EPPC 1902 in the depicted embodiment. The results message 1976 may include the synchronization identifier 1932 (corresponding to the request message 1922's synchronization identifier) and session-level network metrics 1965 in the depicted embodiment. In some embodiments, UDP (the User Datagram Protocol) may be used for transmitting packets between VHs, and respective sets of metrics may be collected for different UDP source ports (and corresponding alternate pathways between the TX EPPC and the RX EPPC). In such embodiments, an array of metric sets with one array element for each of the different UDP source ports used during the session may be included in the results message 1976. Any combination of a number of different types of network metrics may be collected for each port (and/or for the session as a whole) in different embodiments. For example, per-port metrics 1967A for a given port 1951A may include the total number of packets received 1952A, the number of ECNs (explicit congestion notifications) received 1954A, the number of out-of-order packets received 1956A, the number of corrupted packets received 1958A, and one or more latency measures such as the latest latency recorded for transmitting encapsulation packets using that port. In some embodiments, estimates of the packet transmission latency may be obtained by the RX EPPC as follows: when a hash change notification message is received, indicating that the next encapsulation packet sent by the TX EPPC will use a different port (and hence a different path), the RX EPPC may start a timer. When the next encapsulation packet is received, the timer may be stopped, and the elapsed time indicated by the timer may be considered a measure of the latency for the new path (e.g., under the assumption that the TX EPPC sent the encapsulation packet immediately after sending the hash change notification message).

Additional metrics, such as one or more route traces available at the RX EPPC, which identify the intermediary routers and links used for the alternate paths between the RX EPPC and the TX EPPC may also be included in the tracking synchronization results messages in some embodiments. Some of the network metrics shown in FIG. 19 may not be collected or provided to the TX EPPC in some embodiments. In embodiments in which per-port metrics are not collected, a single set of metrics may be provided to the TX EPPC for the session as a whole instead of an array which includes one entry per port. In at least some embodiments, identifiers or private IP addresses of the source and destination GVMs may be extracted from the baseline packets, and such identifiers may be included in the collected metrics so that analysis can be performed on the per-GVM level instead of or in addition to at the EPPC level. Detailed metrics of the kind shown in FIG. 19 may enable fine-granularity health state information to be generated at the network health management service. Such information may be used to filter reports of network health impairment in some embodiments, as discussed below in further detail. It is noted that different approaches towards measuring network performance and health state at the encapsulation protocol layer may be used in some embodiments—e.g., pairs of EPPCs may periodically send messages which do not contain customer data to one another.

Filtering Network Health Information Based on Customer Impact

Figure 20:
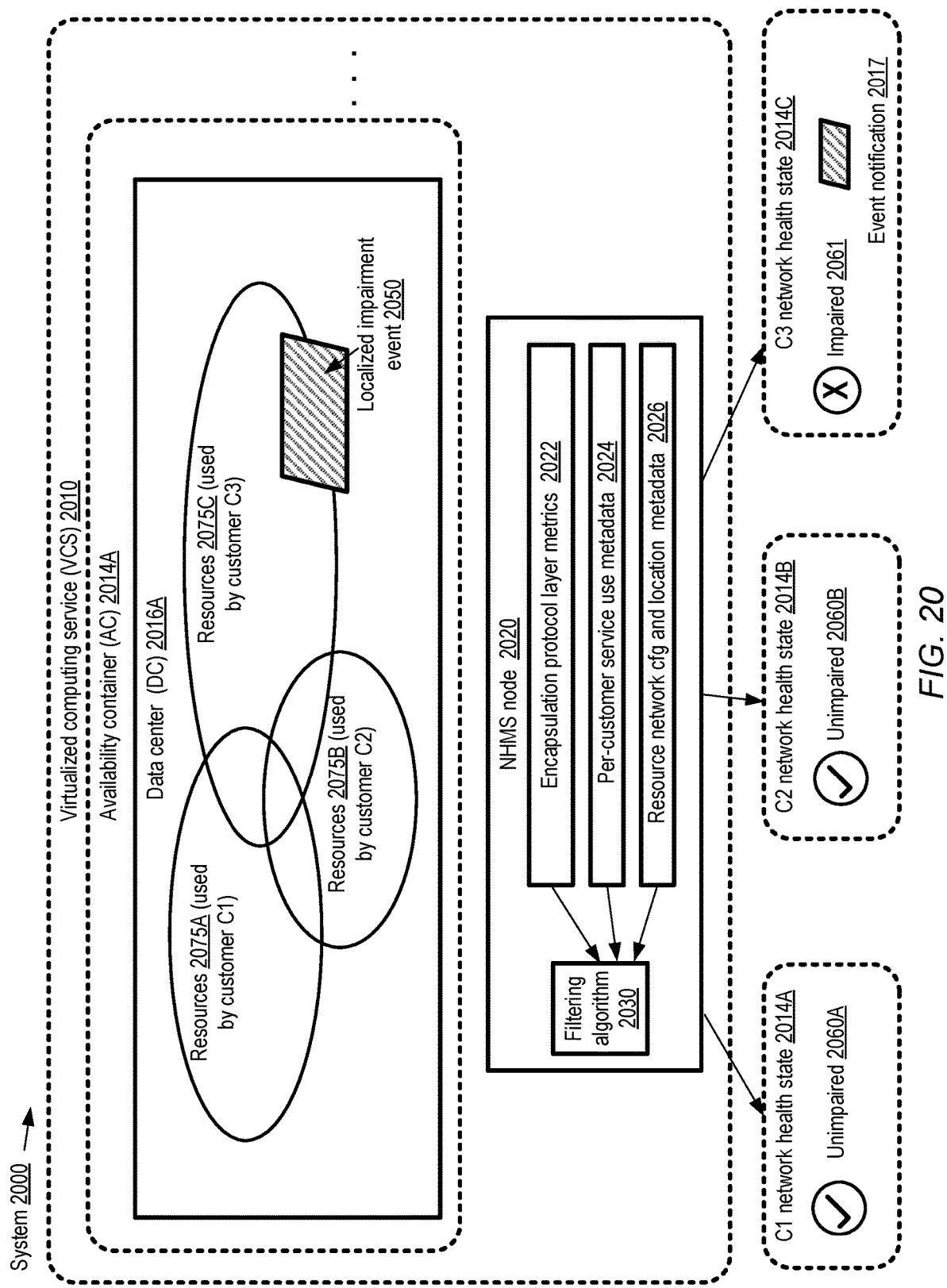
FIG. 20 illustrates an example system environment in which, prior to presentation via a programmatic interface, network health state information may be filtered based on anticipated customer impact of impairment events, according to at least some embodiments.

FIG. 20 illustrates an example system environment in which, prior to presentation via a programmatic interface, network health state information may be filtered based on anticipated customer impact of impairment events, according to at least some embodiments. In system 2000, the resources of a virtualized computing service 2010 may be distributed among several availability containers, including availability container 2014A. Data center 2016A of availability container 2014A comprises resources which are used on behalf of numerous customers, including customers C1, C2 and C3. The respective sets of resources used by different customers may overlap at least partially with one another. For example, as shown, the intersections of resource sets 2075A (used by customer C1), 2075B (used by customer C2) and 2075C (used by customer C3) are non-null. The resources 2075 may include, for example, virtualization hosts at which virtual machines of the customers are instantiated, network links, devices such as routers, gateways and the like, and so on. Some of the resources (such as the network links and networking-specific devices) may be non-public—that is, information about some resources may not be accessible to customers directly, at least by default.

Despite the use of a variety of tools and data sources of the kinds discussed earlier, the number of distinct resources and network pathways between resources in a large provider network may sometimes be too large to permit health state information for all possible endpoints to be captured and maintained on an ongoing basis. For example, the VCS 2010 (and/or other network-accessible services of the provider network) may comprise hundreds of thousands of hosts, individual ones of which may be used to instantiate dozens of guest virtual machines, and large numbers of networking devices may be established to support communications among the GVMs and between GVMs and resources of the other services. In at least some scenarios, therefore, the metrics available to a network health management service (NHMS) may not always be complete enough to make an immediate determination as to whether a given network health impairment event (such as a hardware or software failure at a particular router or switch) is going to impact the applications being run on behalf of a given customer.

In the depicted embodiment, an NHMS node 2020 may detect the occurrence of a network health impairment event 2050 using some of the metrics it has collected from various data sources and tools such as the connectivity verifier, DNS monitors, VPN monitors and the like. The example network health impairment event 2050 shown in FIG. 20 may be localized, in the sense that it affects only a subset of resources of data center 2016A and therefore only a subset of resources of availability container 2014A. However, determining whether any particular application would be affected by the event 2050, even if the application utilizes resources of data center 2016A, may not be straightforward. According to at least one embodiment, the NHMS may estimate or compute probabilities as to whether the event 2050 is going to impact an application based on a number of factors. For example, encapsulation protocol layer metrics 2022 collected using packet tracking sessions between encapsulation protocol processing components (EPPCs) such as those discussed in the context of FIG. 17-FIG. 19, metadata 2024 indicating the particular services and features being used by various customers, and/or resource network configuration and location metadata 2026 may be used to determine the probability of application impact in the depicted embodiment. The network configuration settings information, may, for example, indicate IP addresses, subnets, isolated virtual network identifiers and the like, which in turn may be mapped to physical locations within the data center. The encapsulation protocol layer information may provide metrics pertaining to packet loss, latency and the like for the virtual machines resident at specific virtualization hosts, and may hence be usable to identify the particular customers whose applications run on the virtualization hosts. Service usage information may make it easier to determine whether a given impairment event is going to affect a customer—for example, if the impairment event is a failure of a router used for traffic between the VCS and a storage service SS1, and customer C1 is not using SS1, then the probability of the failure affecting C1 may be estimated to be low.

Depending on the estimated probabilities of impact, information about the impairment event 2050 may be filtered prior to presentation to customers. The filtering algorithm 2030 may, for example, determine that the probability that event 2050 would impact customer C1 is below a threshold, and the NHMS node 2020 may therefore transmit state message 2014A to C1 indicating that one or more endpoint pair categories relevant to C1 are unimpaired (as indicated by the symbol 2060A). Similarly, if the probability that applications of customer C2 are affected be event 2050 is below the threshold, state information 2014B indicating that C2's endpoint pair categories are unimpaired may be provided to C2. In contrast, in the depicted scenario, the probability of a negative impact to C3's application may be estimated to be above a threshold. Consequently, the state information 2014C may indicate an impaired state of one or more endpoint pair categories relevant to C3 (as indicated by symbol 2061). In the depicted embodiment, in addition to the state information itself, a notification 2017 of the impairment event may be provided to customer C3. In some embodiments, an interface which can be used by customer C3 to request repair status corresponding to the impairment event may also be provided (e.g., analogous to the R-S buttons shown in FIG. 10).

In some embodiments, a notification of the impairment event may be provided as part of network health state even to those customers who may not be affected by the event—e.g., customer C1 may be notified that event 2050 has occurred, but that C1's applications remain unaffected. Such notifications may be helpful, for example, in reducing customer uncertainty regarding impairment events. For example, if customer C1 learns (e.g., from social media or other sources) that a failure event has occurred at the provider network, but is unsure as to whether the event affects C1's applications, a message affirming that C1's applications are expected to be unaffected may be helpful. In various embodiments, the state information 2014 may be provided in response to health state requests or queries. In some embodiments, the health state information 2014 may be pushed to customer devices even if no specific health state request has been received. Graphical representations of the customer's networked resources, and the health state of various endpoint pair categories and/or individual endpoint pairs may be provided in at least some embodiments. In different embodiments, combinations of one or more of the techniques and algorithms described in the context of FIG. 1-FIG. 19 may be employed to facilitate the type of information filtering illustrated in FIG. 20. For example, the NHMS may verify, using a plurality of independent data sources, that the impairment event 2050 has occurred, before providing an indication of the event to a customer. Information obtained from a variety of data sources may have to be parsed and correlated before a determination of health state corresponding to a given endpoint pair category is made, and so on.

Methods for Network Health State Determination and Reporting

Figure 21:
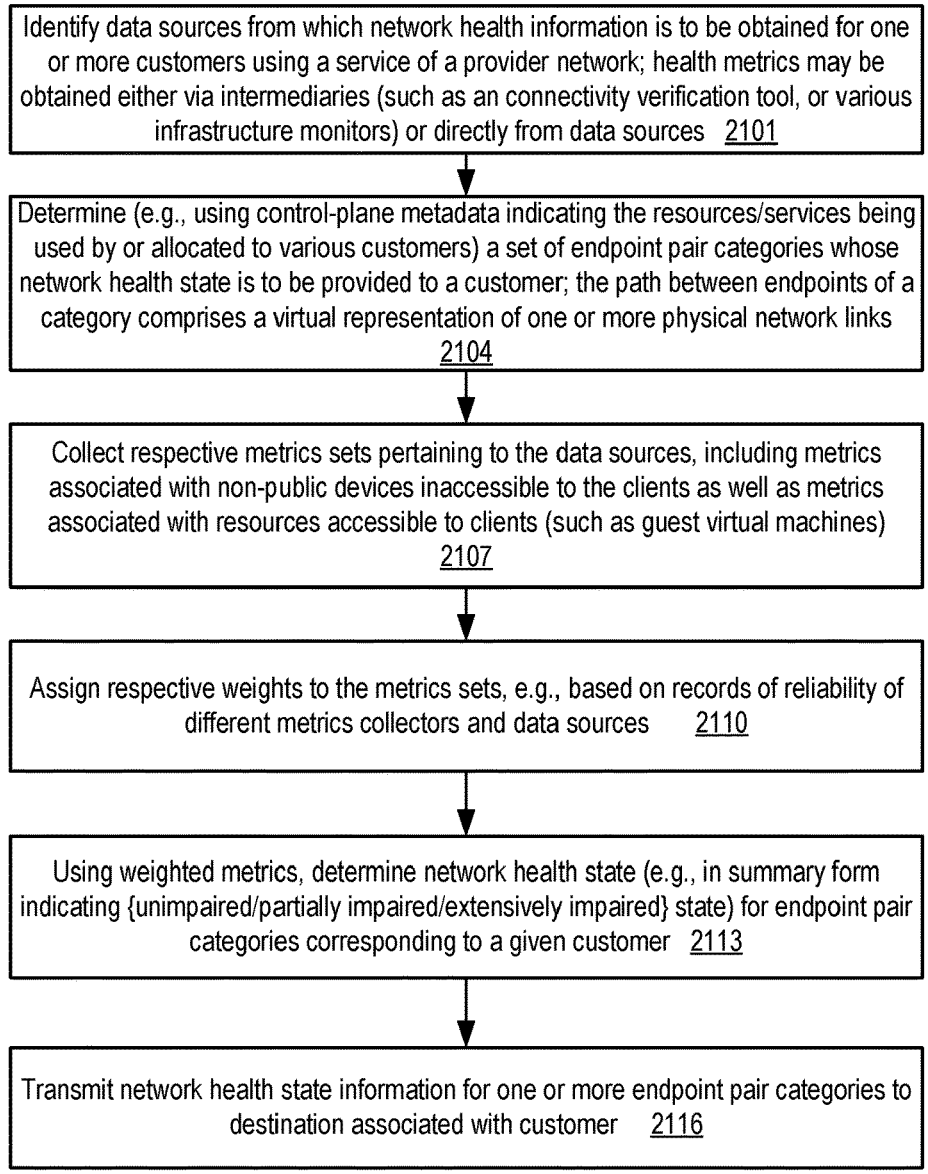
FIG. 21 is a flow diagram illustrating aspects of operations that may be performed at a network health management service, according to at least some embodiments.

FIG. 21 is a flow diagram illustrating aspects of operations that may be performed at a network health management service, according to at least some embodiments. As shown in element 2101, a set of data sources from which network metrics are to be collected to derive network health state information pertinent to various customers or clients of a provider network may be identified. In some cases, intermediary tools may be used to obtain the metrics, while in other cases the metrics may be obtained directly from the underlying data sources such as user-mode applications, operating systems, virtualization management components and the like. A wide variety of intermediate tools may be employed in different embodiments, including for example a connectivity verifier tool with a fleet of nodes which perform request/response tests, or various infrastructure monitors which can access metrics pertaining to non-public resources which are not visible to or accessible to customers. The infrastructure monitors may, for example, execute tests which monitor selected hardware links between various parts of the provider network, tests involving DNS queries, VPN traffic flow, traffic across dedicated direct-to-customer physical links of the kind discussed above, and so on. In some embodiments, packet tracking sessions may be established at an encapsulation protocol layer to obtain metrics associated with packets flowing to/from customer guest virtual machines, and the metrics obtained using such sessions may be examined at the network health management service.

Control-plane metadata from the services of the provider network may be obtained to determine the particular endpoint pair categories for which network health state information may be relevant to various customers (element 2104). For example, in one embodiment, an account identifier of a particular customer may be determined, and the set of isolated virtual networks (IVNs) established for the account identifier may be obtained from a virtualized computing service control-plane component. The list of other services which are being used by the customer from each of the IVNs may be determined, e.g., either based on records of traffic flow across IVN boundaries or from service subscription or billing metadata. Some customers may have thousands of individual guest virtual machines and use a large number of different services, so providing health state at the individual endpoint level may not be practicable or useful. Based on the examination of the metadata and/or traffic flow information, a set of endpoint pair categories which are easy to understand and/or visualize may be derived, so that network health information can be provided on a summarized basis to respective customers. Consider a scenario in which a control-plane component of the virtualized computing service indicates that a particular customer C1 has 100 and 150 guest virtual machines respectively in each of two IVNs (IVN1 and IVN2), and that half of the GVMs in each IVN are part of availability container AC1, while the other half are in a different availability container AC2. Furthermore, the control-plane component also provides metadata indicating that a gateway to access the public Internet has been set up for each IVN, IVN1 and IVN2. Given this information, the NHMS may be able to derive a small set of endpoint pair categories (e.g., corresponding to combinations with one endpoint in each of the four {IVN, AC} combinations and one endpoint representing the public Internet, etc.), which may be used to provide easily understandable summary network health state information to C1. In at least some embodiments, the metadata collected from service control plane components may include physical location information regarding resources allocated to or used by customers, in addition to logical containment information (such as which GVMs of the customer belong to which IVN). The physical location information may be especially useful in matching metrics reported by infrastructure monitors to the endpoint pair categories of the customers. In various embodiments, the endpoint pair categories may be used to generate a virtual view of the network resources being used for a customer. The paths between the endpoints of a category may comprises a virtual representation of one or more physical network links and/or devices, for example.

Respective networking-related metrics sets may be collected, e.g., periodically, from the data sources and/or intermediary tools at the network health managing service (element 2107). In at least some embodiments, metrics sets corresponding to different data sources may be formatted differently and/or may be collected at different rates. The metrics sets may also refer to the same underlying entities using different names or different units in some cases, which may require disambiguation and/or normalization by the network health management service.

In at least some embodiments, respective weights or trust scores may be assigned to the different metrics sets or tools (element 2110). The weights may be assigned based on a variety of factors in different embodiments, including for example a physical location of a resource to which the metric set or tool corresponds, a layer of a networking stack to which the metric set or tool corresponds, or a collection times of the metrics. In one embodiment, a knowledge base entry accessible to the network health management service may indicate how reliable a given tool has been with regard to providing information about network failures or other impairments, for frequently the tool has led to the presentation of false positive reports of network impairment events, and so on. The contents of such knowledge base entries (which may be updated as more evidence becomes available over time) may be used to assign weights in such embodiments.

Using the weights assigned to the collected metrics, network health state may be determined with respect to endpoint pair categories of relevance to a given customer (element 2113). In one embodiment, for example, network pathways between the resources corresponding to each endpoint of an endpoint pair category may be identified, and a subset of the metrics which correspond specifically to the physical and/or logical devices and links forming those pathways may be extracted and analyzed to determine the network health state for that endpoint pair category. As the metrics may be collected at high volumes from large numbers of sources and tools, various techniques to enable efficient indexing and querying of large dynamic data sets (e.g., using in-memory data models or non-relational data models) may be employed in such an embodiment. In some implementations, the collected metrics may be organized and stored in such a way that the efficient elimination of irrelevant metrics is facilitated. For example, metrics may be partitioned or indexed by service in one implementation, so that if a customer's service usage metadata indicates that service S-k is not used by the customer, then all the metrics pertaining to S-k may quickly be designated as irrelevant with respect to the health state of endpoint pair categories of that customer. In some embodiments, the state may be expressed in impairment-related summary form for each endpoint pair category—e.g., the network health of a given endpoint pair category may be deemed to be "unimpaired", "partially impaired", or "extensively impaired". Instead of these particular state summaries, other alternatives for expressing summarized health states indicating respective degrees of impairment may be used in some embodiments. The determination of the summarized state from the weighted network metrics may involve the use of one or more rule-based algorithms in some embodiments. Rules such as the logical equivalent of "if (metric set MS1 from tool T1 indicates impairment of endpoint pair category EPC1 with a probability p1>PA, and p1<PB) and (metric set MS2 from tool T2 indicates impairment of endpoint pair category EPC1 with a probability p2>PC and p2<PD), then the summary state for EPC1 is partially impaired" may be employed in some embodiments. In one implementation, a machine learning algorithm (e.g., a regression algorithm) may be used to determine the summary health state for the various endpoint pair categories. The use of the machine learning algorithm may have the benefit that, as more evidence indicating the accuracy of the conclusions reached at the network health management service is accumulated, the model(s) used may be enhanced, leading to increases in accuracy. The information regarding the health state of the various endpoint pair categories associated with a given customer may be transmitted to one or more destinations (e.g., to a client-side program or console) in the depicted embodiment (element 2116). In at least one embodiment, instead of or in addition to transmitting the information to the one or more destinations, the health state information may be stored in a persistent repository, e.g., for later analysis.

Figure 22:
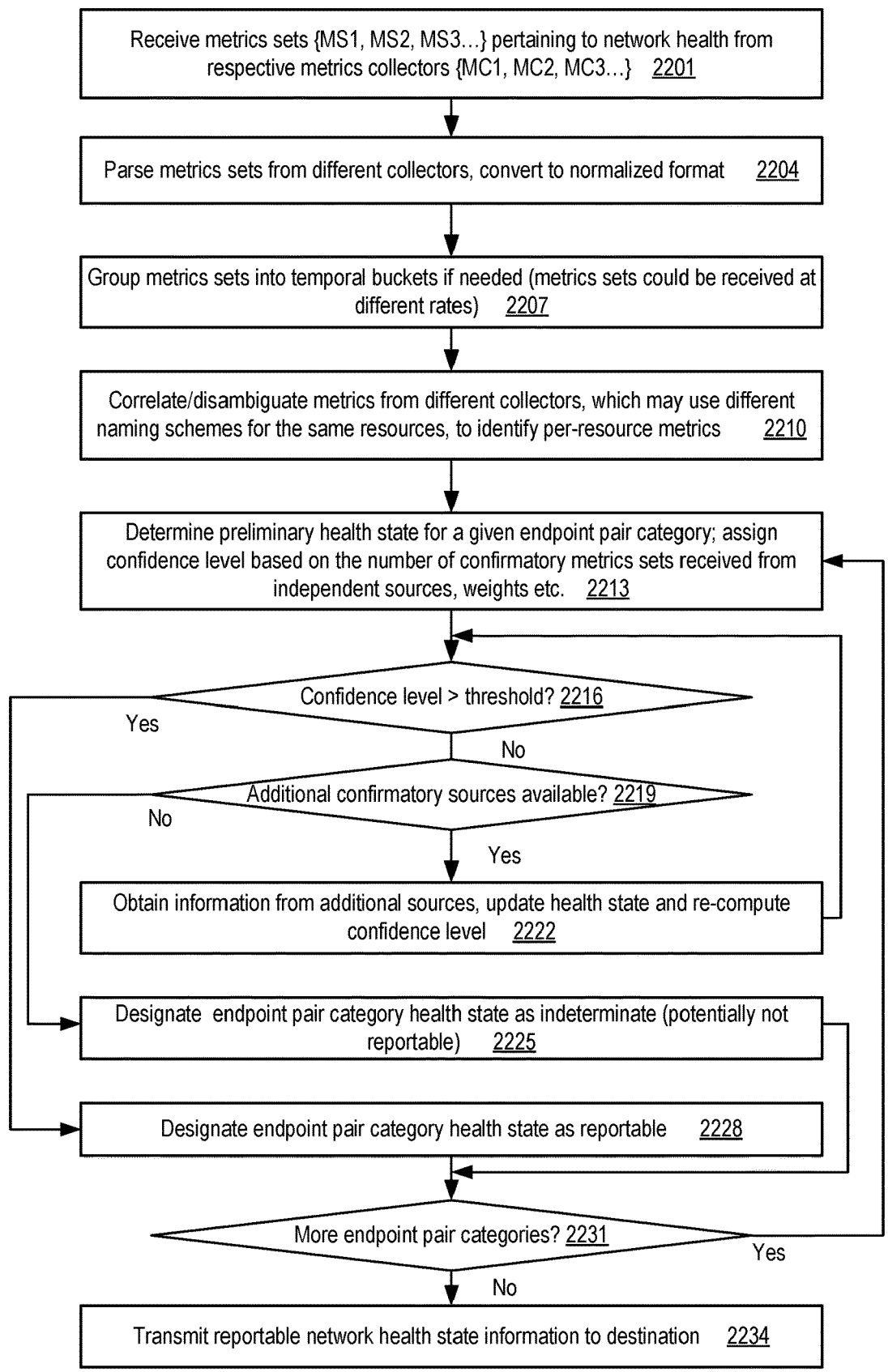
FIG. 22 is a flow diagram illustrating aspects of an algorithm for aggregating and verifying network health information, according to at least some embodiments.

FIG. 22 is a flow diagram illustrating aspects of an algorithm for aggregating and verifying network health information, according to at least some embodiments. As shown in element 2201, respective sets of metrics {MS1, MS2, MS3, . . . } may be obtained from various metrics collectors {MC1, MC2, MC3, . . . } in the depicted embodiment. In some implementations, some or all of the metric sets may comprise time series, with new metrics being collected or reported at selected time intervals. The metric sets may be provided in different formats or notations in different embodiments—e.g., a given metrics collector may use any plain text format, JSON, XML, and/or binary encodings such as BSON (Binary JSON), and so on. Furthermore, even if two tools or metrics collectors use the same format (such as XML), the underlying data model (such as the Document Type Definition or DTD) used may differ from one tool to another. Accordingly, the network health management service may parse the metrics sets received from the different sources and convert them into a standard or normalized format (element 2204).

In at least one embodiment, the metrics may be grouped into temporal buckets (element 2207), e.g., because the rates at which they are received from the different collectors may vary. For example, a connectivity verifier tool may provide reports once every minute, while an infrastructure monitor for a hardware link may report its metrics once every five seconds, and the network health monitoring service may have to assign each set of metrics to a selected interval (e.g., a two-minute interval). Different metric sets may refer to the same underlying entities or quantities using their respective naming schemes, and the network health management service may have to correlate metrics from different sources (element 2210), e.g., using a dictionary or database that maps names used by one tool to names used by another. For example, one tool may refer to a given virtualization host by an IP address "a.b.c.d", while another tool may refer to the virtualization host by an application label (such as "Web-Server1") or a location indicator (e.g., "H04.Rk003.Ro007.DS1" indicating the fourth host in rack 3 in room 7 of data center DS1), and metrics referring to any particular one of those names may be correlated with metrics referring to other names. In some embodiments, the particular resource or entity to which a given metric set applies may not necessarily be immediately evident—e.g., it may be the case that a given host has two NICs with respective IP addresses "a.b.c.d" and "a.b.c.m", and network traffic statistics for the two addresses may be reported separately. In such scenarios, the network health management service may have to examine a configuration database to disambiguate the data—i.e., to determine that both sets of metrics refer to the same host.

As mentioned earlier, a set of endpoint pair categories for which health state information is to be provided to a customer may have been determined, e.g., based on the set of services used by the customer, the set of resources allocated to the customer, etc. At least some of the metrics pertaining to a given endpoint pair category may be collected from a physical network device used for the traffic associated with the category in some embodiments. A preliminary health state with an associated confidence level may be determined for a given endpoint pair category, e.g., using weights assigned to the respective metrics collectors and the reported metrics as discussed above (element 2213). If, for example, there are four metrics sets from four different metrics collectors, all of which appear to indicate a network failure affecting an endpoint pair category, a high confidence level (e.g., 90%) may be assigned to the "substantially impaired" health state for the category. If, in contrast, one of the four metrics collectors indicates an impairment, one indicates no impairment, and the remaining two do not provide any clear-cut conclusions regarding the impairment, a lower confidence level (e.g., 20%) may be assigned to the "substantially impaired" health state for the category and a medium confidence level (e.g., 40%) may be assigned to the "partially impaired" and "unimpaired" states.

If the confidence level associated with one of the health states exceeds a threshold (where the threshold itself may be a parameter which is tuned or adjusted over time), as detected in operations corresponding to element 2216, the health state for the endpoint pair category for the current iteration of analysis may be deemed to be reportable (element 2228). If, however, none of the health states has a confidence level which exceeds the threshold (as also determined in operations corresponding to element 2216), the network health management service may determine whether additional confirmatory sources of metrics are available for the endpoint pair category being considered. If one or more such sources (which may for example comprise additional metrics collectors whose input was not included in the preliminary determination of the health state) are available (as detected in element 2219), new metrics may be obtained from the additional sources (element 2222). Based on an analysis of the new metrics in combination with the previously-examined metrics, the health state and/or the confidence levels for the endpoint pair category may be re-computed or adjusted. The confidence level may be checked again to determine whether it is above the threshold, and the operations corresponding to elements 2216, 2219 and 2222 may be iterated until either a confidence level that exceeds the threshold is obtained, or all the sources of additional information are exhausted. If data sources are exhausted and the threshold confidence level has still not been reached, the endpoint pair category may be designated as unclear or unreportable in the depicted embodiment (element 2225).

If more endpoint pair categories remain to be analyzed (as detected in element 2231), operations corresponding to elements 2213-2225 may be performed for the next endpoint pair category. The reportable health state information may be transmitted to one or more destinations associated with the customer (element 2234). In some embodiments, a decision as to whether an indication of an indeterminate health state (e.g., if the confidence level threshold is not reached) is to be provided may be based at least in part on client-specified preferences—e.g., a client may indicate via a programmatic interface whether only high-confidence results are to be provided or indeterminate results are to be provided as well.

Figure 23:
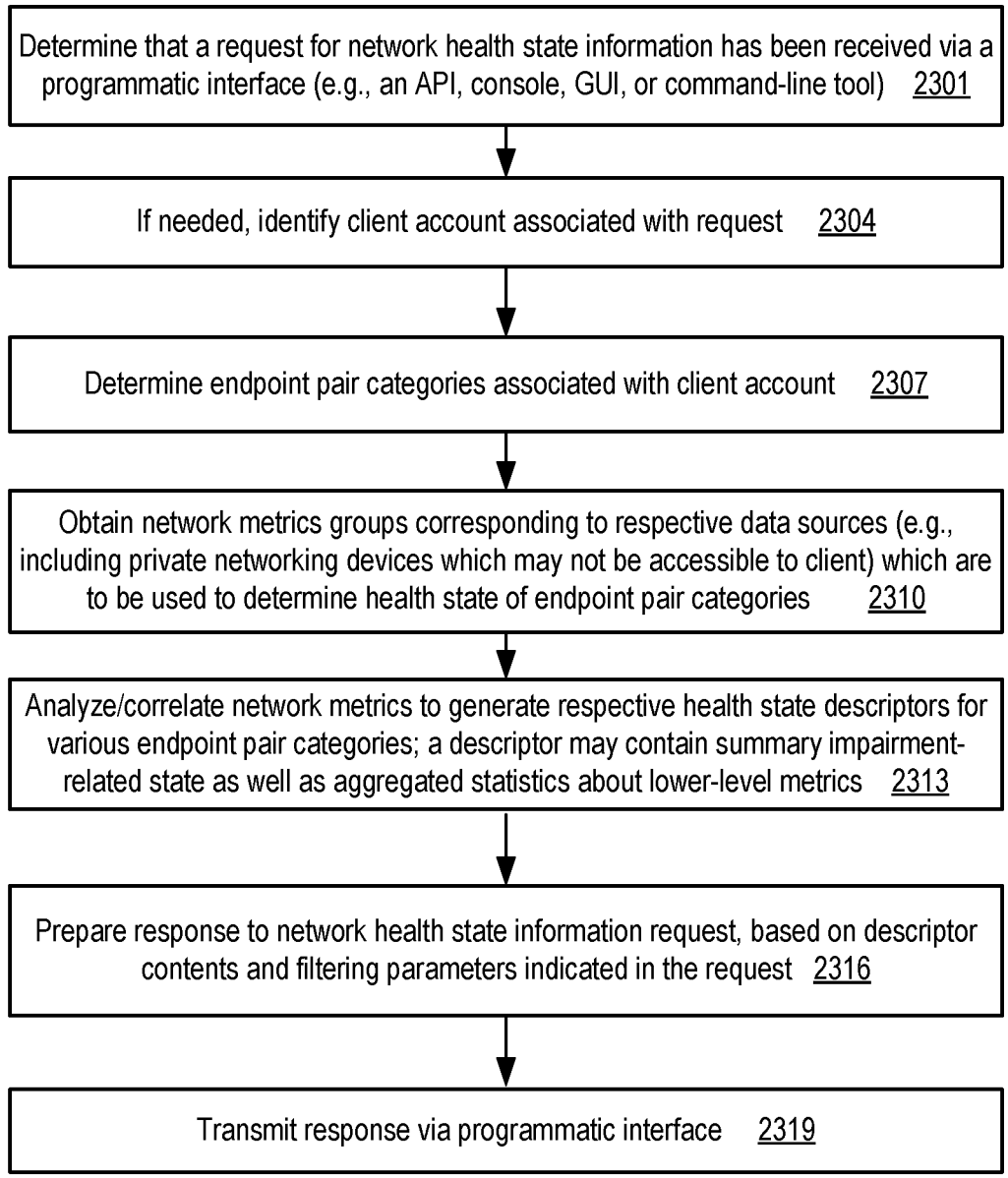
FIG. 23 is a flow diagram illustrating aspects of operations that may be performed at a network health management service which enables clients to request network health state information via programmatic interfaces, according to at least some embodiments.

FIG. 23 is a flow diagram illustrating aspects of operations that may be performed at a network health management service which enables clients to request network health state information via programmatic interfaces, according to at least some embodiments. As shown in element 2301, a determination may be made that a request for network health state information pertaining to a client account has been received via a programmatic interface. Various types of programmatic interfaces may be used in different embodiments, including for example an API, a web-based console, a command-line tool, or a graphical user interface. The request may include one or more parameters corresponding to respective elements of health state request 502 of FIG. 5 in some embodiments such as an identifier of the client account, targeted resources or services, endpoint pair categories of interest, and so on. In at least one embodiment, filtering parameters included in the request may indicate that instead of providing health state information for all endpoint pair categories associated with the client account, the response should provide health state information for a subset, or that only some subsets of aggregated metrics should be provided. In one embodiment, a health state information request may include respective custom definitions of one or more health states—e.g., the client may indicate a rule to be used to designate an endpoint pair category as being in a partially impaired state or an extensively impaired state. In various embodiments, at least some of the parameters of a health state request may be optional, so that the service does not require all clients to provide all the elements indicated in FIG. 5. In some embodiments, the request may indicate that the client wishes to subscribe to updates regarding health state—e.g., that respective health state messages are to be provided periodically or based on detections of threshold events to one or more destinations.

If the client account is not explicitly indicated in the request, the account may be identified, e.g., based on authorization-related session information or headers associated with the use of the programmatic interface (element 2304). The set of endpoint pair categories for which health state information is to be provided in response to the request may be determined (element 2307) if not explicitly indicated in the request, e.g., by communicating with control-plane components of one or more other network-accessible services such as a virtualized computing service. As mentioned above, the path between the endpoints of a category may comprise a virtual representation of one or more physical network links in various embodiments.

Corresponding to each of the identified endpoint pair categories, respective sets of network metrics may be obtained from various data sources (which may in some cases include one or more physical network devices used for the traffic associated with a category) and/or intermediary tools in the depicted embodiment (element 2310). The underlying data sources may correspond to various levels of the hardware/software stacks, such as the kinds of entities shown in FIG. 6, and the corresponding metrics may be collected at various levels of a resource hierarchy similar to that shown in FIG. 7. In various embodiments, respective weights or trust scores may be assigned to the metrics sets and/or intermediary tools as discussed above.

The metrics obtained from the various sources and tools may be correlated and aggregated as discussed earlier (e.g., in the context of FIG. 22) to generate respective health state descriptors for the endpoint pair categories (element 2313). In at least some embodiments, a health state descriptor may contain impairment-related summary state information, as well as supporting aggregated statistics regarding various lower-level metrics such as an average packet drop rate, average and percentiles for latencies, request/response success rates etc. In some embodiments, a given health state descriptor may comprise elements similar to those shown in FIG. 4. Based on the contents of the generated descriptors and/or on the filtering parameters or criteria indicated in the health state request, a response may be generated (element 2316) and transmitted via a programmatic interface to one or more destinations (element 2319). In some embodiments, upon receiving a response to a particular health state request, a client may submit a follow-on request for additional information or evidence. In one such embodiment, the health state descriptor may contain more information than is provided in the first response; for example, statistics regarding individual metrics or information regarding data sources/tools included in the descriptor may not be provided in the first response, but may be used for follow-on requests.

Figure 24:
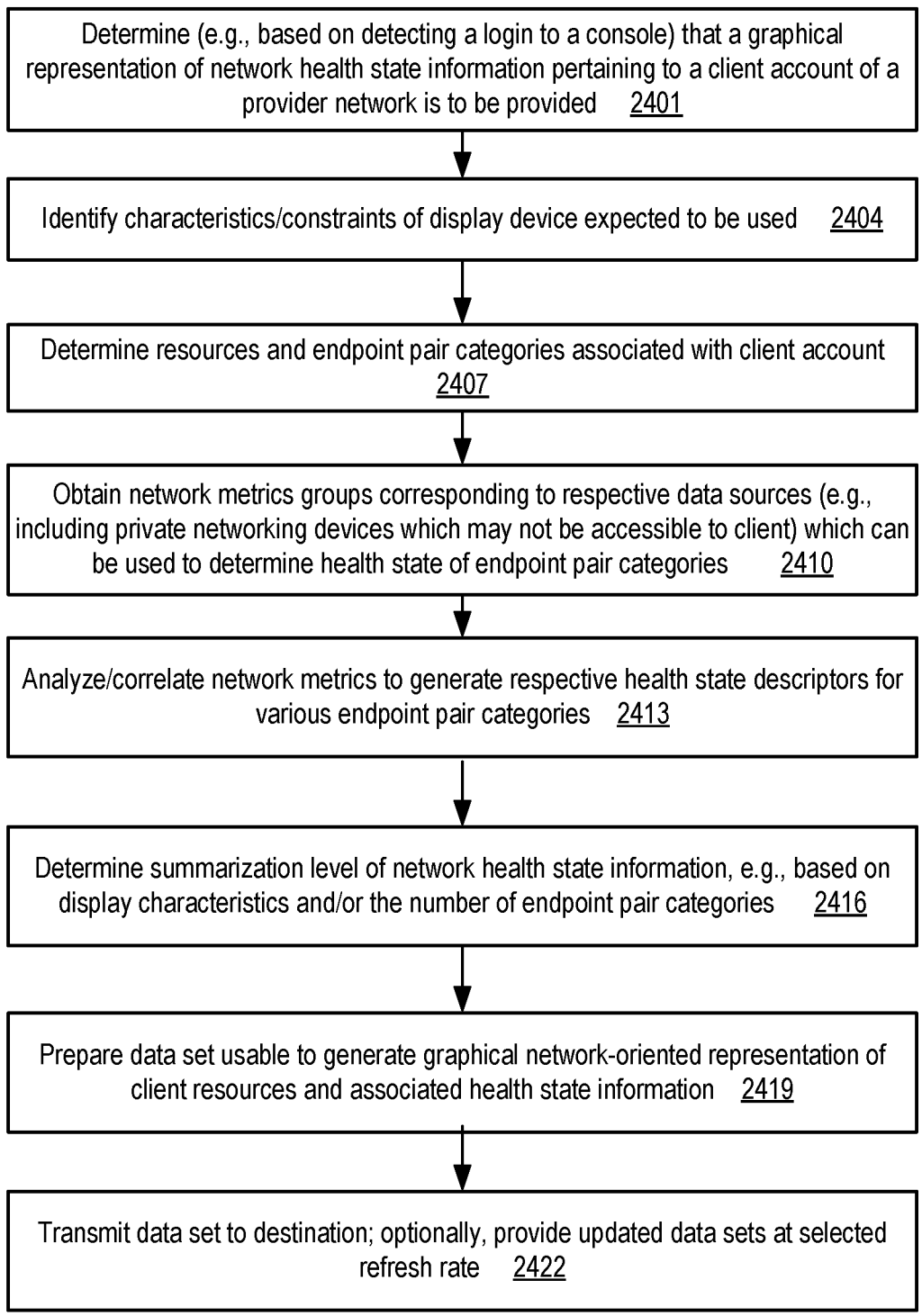
FIG. 24 is a flow diagram illustrating aspects of operations that may be performed at a network health management service which provides customizable graphical representations of network health state information, according to at least some embodiments.

FIG. 24 is a flow diagram illustrating aspects of operations that may be performed at a network health management service which provides customizable graphical representations of network health state information, according to at least some embodiments. As shown in element 2401, a determination may be made that a graphical representation of network health state information for resources associated with a client account is to be prepared. In some cases, the determination may be responsive to an explicit request (e.g., received via an API or via a web-based management console implemented by a network-accessible service of the provide network). In other cases, if and when an entity or user associated with the client account successfully logs in to a management console implemented by a service of the provider network, the successful login may trigger the determination that the graphical representation is to be provided. One or more characteristics or constraints (e.g. size in pixels) of the client-side display device may be determined, e.g., based on network headers or other metadata received from the client (element 2404).

The set of resources associated with the client account, and corresponding endpoint pair categories, may be identified (element 2407), e.g., using information obtained from control-plane components of one or more services as discussed earlier. As mentioned above, the path between the endpoints of a category may comprise a virtual representation of one or more physical network links in various embodiments. Respective network metrics groups/sets corresponding to various data sources of the kind discussed above (which may in at least some cases include physical network devices used for traffic associated with an endpoint pair category) may be obtained (element 2410), including at least some metrics associated with non-public resources.

The metrics may be parsed and correlated using approaches similar to those described earlier, to obtain respective health state descriptors for various endpoint pair categories relevant to the client account (element 2413). Based at least in part on the display characteristics and/or the number of endpoint pair categories for which health state information is available, the summarization level of network health information may be determined (element 2416). For example, if the number of distinct endpoint pair categories is such that showing metrics for all the categories separately may clutter the display, metrics corresponding to several different endpoint pair categories or resources may be combined to produce summarized information for display. In one embodiment, for example, metrics pertaining to traffic flow between the public Internet and several different isolated virtual networks configured on behalf of the customer may be aggregated to a single "IVN-to-Internet" summary metric. Such summarization/combination may require rules for combining health state information—e.g., if any one of N IVNs has a severely-impaired network health status with respect to the public Internet, the summarized information may also indicate sever impairment in one implementation, even if (N−1) of the IVNs are not impacted by the impairment.

A data set usable to display a graphical representation of the resources associated with the client account, as well as the network health states determined for various relevant endpoint pair categories, may be generated (element 2419). The data set may then be transmitted to one or more client-side devices (element 2422) where the display is provided. Optionally, a client may indicate a refresh rate for the display, in which case updated data sets based on received metrics may be transmitted at intervals corresponding to the refresh rate.

Figure 25:
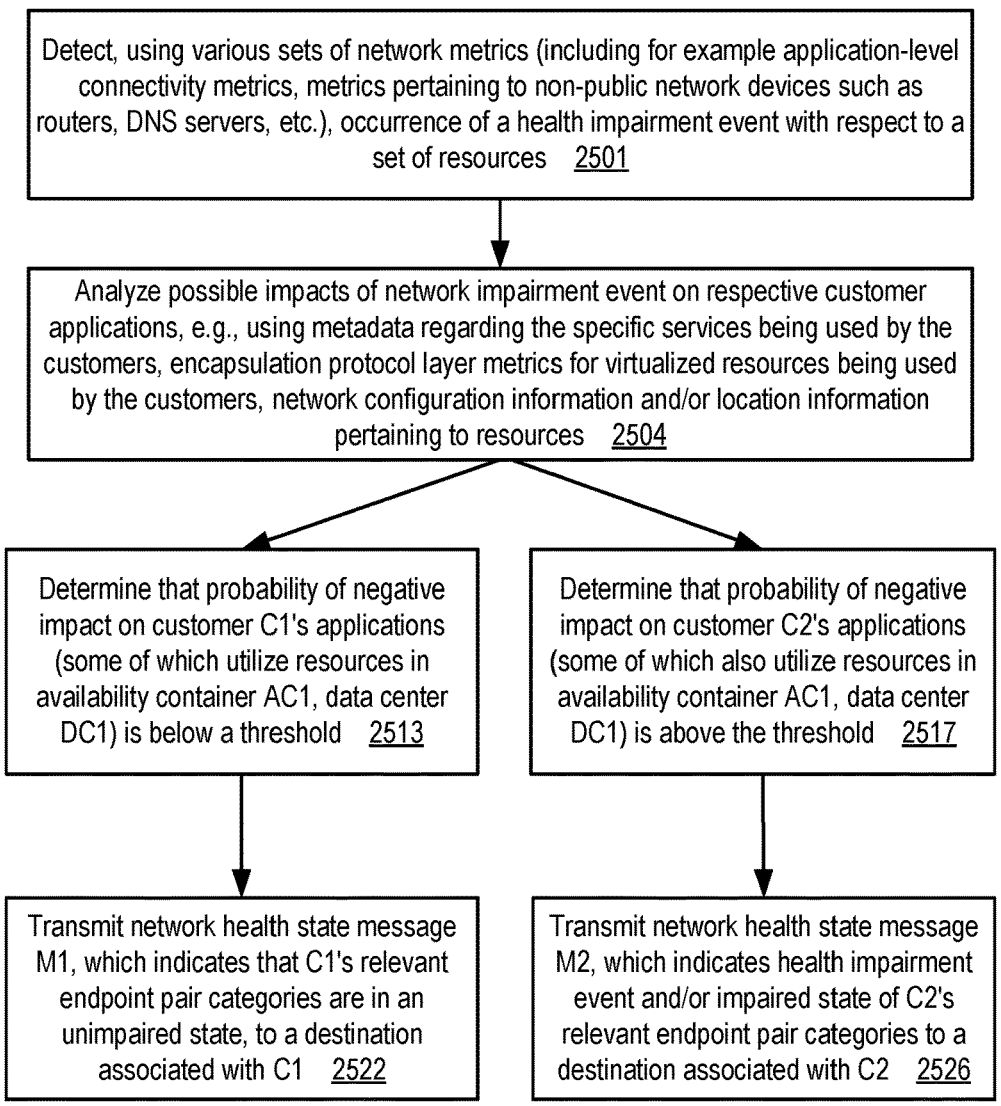
FIG. 25 is a flow diagram illustrating aspects of operations that may be performed at a network health management service which filters network health information based on customer impact, according to at least some embodiments.

FIG. 25 is a flow diagram illustrating aspects of operations that may be performed at a network health management service which filters network health information based on customer impact, according to at least some embodiments. As shown in element 2501, a network health impairment event associated with one or more resources of a provider network may be detected, e.g., using network metrics collected from a variety of tools and/or data sources. Tools similar to those discussed in the context of FIG. 13-FIG. 19 may be used in some embodiments, and the raw metrics may be obtained from data sources illustrated in FIG. 6 at various levels of a resource hierarchy similar to that shown in FIG. 7. The health impairment event may, for example, correspond to a software or hardware failure at one or more devices of the provider network, such as a virtualization host, a physical network link, a router, gateway, switch or the like.

The network health management service may analyze the impact of the impairment event on the applications of various customers (element 2504). For example, a list of the provider network services being used by a customer may be examined, location information pertaining to the impaired/failed devices or modules may be correlated with location information of client resources, metrics captured from packet tracing sessions at the encapsulation protocol processing layer of a virtualized computing service or other services may be analyzed, and so on. In at least some embodiments, aspects of the networking configuration settings pertaining to the impaired resources and/or customer resources may be compared—e.g., subnet information associated with a given virtual machine, host or network device may enable the NHMS to ascertain whether a given customer would be affected by a failure. In one embodiment, an inventory management system of the provider network may contain location information (e.g., at the rack level, room level, data center level, availability container level, or region level) for various resources, and the proximity of the hosts being used for a given customer's applications to the impaired device(s) may be determined to estimate a probability of a negative impact of the impairment on the applications.

With respect to a customer C1, on whose behalf resources are allocated within a particular data center DC1 of an availability container AC1 at which the impairment event occurred, the network health management service may determine that the probability of a negative impact on C1's applications is below a threshold (element 2513). As a consequence, the network health management service may cause a health state message M1 to be transmitted to a destination (e.g., a client device at which a graphical representation of the client's resources can be shown) associated with C1. M1 may indicate that the state of one or more endpoint pair categories relevant to C1 (or specific resources allocated to C1) is unimpaired (element 2522). In effect, despite the fact that the impairment event occurred in a data center where C1 was allocated some resources, the network health state information provided to C1 may be filtered to avoid an indication that C1's applications are impacted.

In contrast, the network health management service may determine that the probability of a negative impact on customer C2's applications, which may also be using resources of DC1 and AC1, exceeds the threshold (element 2517). As a result, a different health state message M2 may be transmitted to a destination affiliated with C2, indicating that the impairment event has occurred and/or indicating that one or more endpoint pair categories relevant to C2 are in an impaired state (element 2526). Similar customer-specific health state messages may be prepared for numerous other customers as well; the discussion of customers C1 and C2 is not intended to indicate that the filtering of network health state information is limited to any particular number of customers. In some embodiments, the threshold probabilities used for deciding whether or not an impairment event is to be reported to a given customer may be customizable— e.g., customers may indicate preferences via programmatic interfaces of the network health management service for the conditions under which they should be informed regarding failures/impairments. In at least one embodiment, an indication of the occurrence of an impairment event may be provided to a customer even if the network health management service determines that the customer's applications are likely to be unaffected. This may be done, for example, to inform or reassure the customer affirmatively that while a failure has been identified (and is being resolved/repaired), the customer's own applications are not going to be impacted.

It is noted that in various embodiments, at least some operations other than those illustrated in the flow diagram of FIG. 21-FIG. 25 may be used to implement the network health management techniques described above. Some of the operations shown may not be implemented in some embodiments or may be implemented in a different order, or in parallel rather than sequentially.

Use Cases

The techniques described above, of providing customizable and verified network health state information at various levels of granularity to clients of services implemented at provider networks may be useful in a number of scenarios. To many customers, the resources of provider network services (such as a virtualized computing service or storage service) may appear to be the equivalent of black boxes, with limited visibility provided into the devices used to implement the services. When a customer application running on provider network resources appears to misbehave or perform poorly, especially with respect to network traffic, it may not be straightforward for the customer to determine whether the apparent problem is a real problem, and if it is a real problem, whether the root cause lies with the application layer or in the infrastructure of the provider network. As such, techniques that collect metrics from multiple independent tools and aggregate the metrics to provide customer-specific health state information via easy-to-use interfaces may reduce the amount of effort wasted by customers in application-level debugging if a problem is caused by impairments at the infrastructure level. Furthermore, by ensuring that reports of network impairments are verified using multiple sources, and by filtering reports of network impairments based on the anticipated or actual impact on applications of specific customers to whom the reports are being provided, false alarms regarding failures which would not affect customers may be reduced.

Illustrative Computer System

Figure 26:
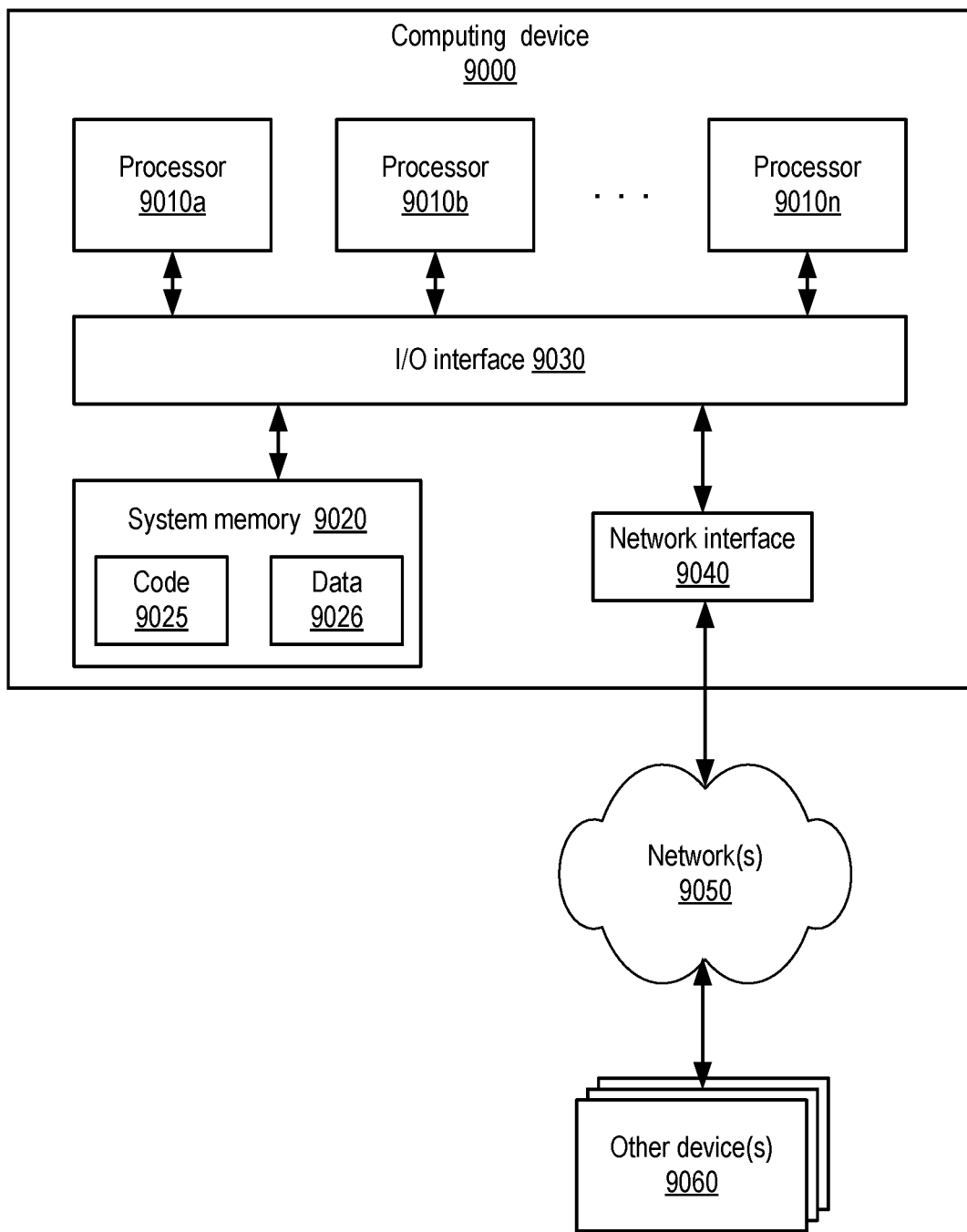
FIG. 26 is a block diagram illustrating an example computing device that may be used in at least some embodiments.

In at least some embodiments, a server that implements a portion or all of one or more of the technologies described herein, including the techniques to implement various components of a network health management service, tools and metrics collectors used by the network health management service, other resources of provider networks involved in network health state management, and the like may include a general-purpose computer system that includes or is configured to access one or more computer-accessible media. FIG. 26 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 25, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 25 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 26 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, by one or more computing devices:
determining that a graphical representation of network health state information pertaining to a particular client account of a plurality of client accounts of a provider network is to be prepared;
generating, using one or more network metrics groups corresponding to respective data sources, a network health state descriptor corresponding to a resource associated with the particular client account of the plurality of client accounts of the provider network, wherein the network health state descriptor is derived from the one or more network metrics groups that include at least a first metric of a particular network metrics group obtained from a non-public networking device that is not directly accessible to obtain the first metric by a customer of the provider network associated with the particular client account, and the non-public networking device is not visible to the customer; and
transmitting a first data set usable to generate a graphical display of network health state information corresponding to at least one resource associated with the particular client account, wherein the first data set is derived at least in part from the network health state descriptor corresponding to the resource associated with the particular client account of the provider network.

2. The method as recited in claim 1, further comprising performing, by the one or more computing devices:
combining, based at least in part on an indication of a property of a display device, metrics pertaining to a plurality of resources associated with the client account; and
including, within the first data set, a summarized metric resulting from said combining.

3. The method as recited in claim 1, further comprising performing, by the one or more computing devices:
determining a targeted update rate of the graphical display; and
transmitting, in accordance with the targeted update rate, one or more updated data sets.

4. The method as recited in claim 1, further comprising performing, by the one or more computing devices:
determining that a zoom-in request to provide network health state information of individual resources of a group of resources has been received; and
transmitting a second data set usable to display the network health state of individual resources of the group of resources.

5. The method as recited in claim 1, wherein the first data set usable to generate the graphical display comprises an indication of a color to be used to indicate a severity of a network health problem.

6. The method as recited in claim 1, wherein the first data set comprises respective networking state information for a particular endpoint pair category comprising one of: (a) a first endpoint within one availability container of a virtualized computing service and a second endpoint within a different availability container of the virtualized computing service, (b) a first endpoint within one geographical region and a second endpoint within a different geographical region, (c) a first endpoint within a virtualized computing service and a second endpoint at a customer data center, (d) a first endpoint within a virtualized computing service and a second endpoint within a public Internet, (e) a first endpoint within a virtualized computing service and a second endpoint within a different network-accessible service, or (f) a first endpoint within a first isolated virtual network and a second endpoint outside the isolated virtual network.

7. The method as recited in claim 1, wherein a first network metrics group of the one or more network metrics groups comprises a particular network metric obtained from one or more of: (a) a user-mode process (b) a privileged process of an operating system (c) a virtualization management component (d) a network interface card (e) a router (f) a switch or (g) an encapsulation protocol processing device.

8. The method as recited in claim 1, wherein the one or more network metrics groups comprise a plurality of network metrics groups, the method further comprising performing, by the one or more computing devices:
assigning respective weights to individual ones of the plurality of network metrics groups;
wherein generating a particular network health state descriptor comprises utilizing the respective weights.

9. The method as recited in claim 8, wherein a particular weight assigned to a particular network metrics group is based at least in part on one or more of: (a) a physical location of a resource to which the particular network metrics group corresponds, (b) a layer of a networking stack to which the particular network metrics group corresponds, or (c) a collection time of at least one metric of the particular network metrics group.

10. The method as recited in claim 1, further comprising performing, by the one or more computing devices:
obtaining a particular network metric from one or more of: (a) a tool configured to issue Domain Name Service (DNS) queries (b) a tool configured to run Virtual Private Network (VPN) tests or (c) a tool configured to run tests which utilize a dedicated physical link established between the provider network and a customer networking device.

11. A system, comprising:
one or more computing devices of a network health manager associated with a virtualized computing service of a provider network;
wherein the one or more computing devices of the network health manager are configured to:
determine that a graphical representation of network health state information pertaining to a particular client account of a plurality of client accounts of the provider network is to be prepared;
identify a first set of resources associated with the particular client account of the plurality of client accounts of the provider network;
generate, using one or more network metrics groups corresponding to respective data sources, a network health state descriptor corresponding to a virtual representation of one or more physical network links utilized for network traffic of at least a subset of resources of the first set of resources associated with the particular client account of the provider network, wherein at least a first metric of a particular network metrics group, of the one or more network metrics groups used to generate the network health state descriptor, is obtained from a non-public networking device and is inaccessible to a customer of the provider network associated with the particular client account, and wherein the network health state descriptor comprises an impairment-related summary state; and
transmit a data set usable to generate a graphical display of (a) a representation of the first set of resources and (b) network health state information corresponding to at least one resource of the first set of resources, wherein the data set is based at least in part on (a) the network health state descriptor corresponding to the virtual representation of the one or more physical network links utilized for network traffic and (b) one or more characteristics of a device to be used for the graphical display.

12. The system as recited in claim 11, wherein the data set comprises respective network health state information for a particular endpoint pair category comprising one of: (a) a first endpoint within one availability container of the virtualized computing service and a second endpoint within a different availability container of the virtualized computing service, (b) a first endpoint within one geographical region and a second endpoint within a different geographical region, (c) a first endpoint within a virtualized computing service and a second endpoint at a customer data center, (d) a first endpoint within a virtualized computing service and a second endpoint within a public Internet, (e) a first endpoint within a virtualized computing service and a second endpoint within a different network-accessible service, or (f) a first endpoint within a first isolated virtual network and a second endpoint outside the isolated virtual network.

13. The system as recited in claim 11, wherein to determine that a graphical representation of network health state information pertaining to the client account is to be prepared, the one or more computing devices are configured to:
detect that a login operation to a management console of the virtualized computing service has succeeded, wherein the login operation was initiated by an entity associated with the client account.

14. The system as recited in claim 11, wherein the one or more network metrics groups comprise a plurality of network metrics groups, wherein the one or more computing devices are configured to:
assign respective weights to individual ones of the plurality of network metrics groups; and
utilize the respective weights to generating the network health state descriptor.

15. The system as recited in claim 14, wherein a particular weight assigned to a particular network metrics group is based at least in part on one or more of: (a) a physical location of a resource to which the particular network metrics group corresponds, (b) a layer of a networking stack to which the particular network metrics group corresponds, or (c) a collection time of at least one metric of the particular network metrics group.

16. A non-transitory computer-accessible storage medium storing program instructions that when executed on one or more processors:
determine that a graphical representation of network health state information pertaining to a particular client account of a plurality of client accounts of a provider network is to be prepared;
generate, using one or more network metrics groups corresponding to respective data sources, a network health state descriptor corresponding to a resource associated with the particular client account of the plurality of client accounts of the provider network, wherein the network health state descriptor is derived from the one or more network metrics groups that include at least a first metric of a particular network metrics group obtained from a non-public networking device of the provider network that is not directly accessible to obtain the first metric by a customer of the provider network associated with the particular client account, and the non-public networking device is not visible to the customer; and
transmit a first data set usable to generate a graphical display of network health state information corresponding to at least one resource associated with the particular client account, wherein the first data set is derived at least in part from the network health state descriptor corresponding to the resource associated with the particular client account of the provider network.

17. The non-transitory computer-accessible storage medium as recited in claim 16, wherein the one or more network metrics groups comprise a plurality of network metrics groups, wherein the instructions when executed on the one or more processors:
assign respective weights to individual ones of the plurality of network metrics groups; and
utilize the respective weights to generate the network health state descriptor.

18. The non-transitory computer-accessible storage medium as recited in claim 17, wherein a particular weight assigned to a particular network metrics group is based at least in part on one or more of: (a) a physical location of a resource to which the particular network metrics group corresponds, (b) a layer of a networking stack to which the particular network metrics group corresponds, or (c) a collection time of at least one metric of the particular network metrics group.

19. The non-transitory computer-accessible storage medium as recited in claim 16, wherein a particular metrics group of the one or more metrics groups is generated at one of: (a) a tool configured to issue Domain Name Service (DNS) queries (b) a tool configured to run Virtual Private Network (VPN) tests or (c) a tool configured to run tests which utilize a dedicated physical link established between the provider network and a customer networking device.

20. The non-transitory computer-accessible storage medium as recited in claim 16, wherein the first data set comprises respective network health state information for a particular endpoint pair category comprising one of: (a) a first endpoint within one availability container of a virtualized computing service and a second endpoint within a different availability container of the virtualized computing service, (b) a first endpoint within one geographical region and a second endpoint within a different geographical region, (c) a first endpoint within a virtualized computing service and a second endpoint at a customer data center, (d) a first endpoint within a virtualized computing service and a second endpoint within a public Internet, (e) a first endpoint within a virtualized computing service and a second endpoint within a different network-accessible service, or (f) a first endpoint within a first isolated virtual network and a second endpoint outside the isolated virtual network.

21. The non-transitory computer-accessible storage medium as recited in claim 20, wherein the first data set comprises a hint pertaining to at least a portion of a layout of the graphical display, wherein the hint includes an indication of a logical or physical relationship between a particular endpoint and another endpoint.

22. The non-transitory computer-accessible storage medium as recited in claim 20, wherein the first data set comprises a representation of a change in a health state of a particular resource, wherein the change in the health state is to be indicated via the graphical display.

23. The non-transitory computer-accessible storage medium as recited in claim 20, wherein the first data set comprises a representation of a time series of network health data records of a particular resource, wherein the time series is to be indicated via the graphical display.

* * * * *